US008654179B2

(12) United States Patent
Kanamori et al.

(10) Patent No.: US 8,654,179 B2
(45) Date of Patent: Feb. 18, 2014

(54) IMAGE PROCESSING DEVICE AND PSEUDO-3D IMAGE CREATION DEVICE

(75) Inventors: Katsuhiro Kanamori, Nara (JP); Ayako Komoto, Osaka (JP); Satoshi Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 618 days.

(21) Appl. No.: 12/935,304

(22) PCT Filed: Dec. 16, 2009

(86) PCT No.: PCT/JP2009/006928
§ 371 (c)(1),
(2), (4) Date: Sep. 29, 2010

(87) PCT Pub. No.: WO2010/073547
PCT Pub. Date: Jul. 1, 2010

(65) Prior Publication Data
US 2011/0050854 A1  Mar. 3, 2011

(30) Foreign Application Priority Data
Dec. 25, 2008  (JP) ................. 2008-331028

(51) Int. Cl.
*H04N 13/02* (2006.01)
(52) U.S. Cl.
USPC ..................... 348/46; 348/E13.074
(58) Field of Classification Search
CPC ............... H04N 13/025; H04N 13/026
USPC .......................................... 348/46
See application file for complete search history.

(56) References Cited

U.S. PATENT DOCUMENTS

2005/0104976 A1* 5/2005 Currans ............. 348/231.5
2009/0279807 A1* 11/2009 Kanamorl et al. ......... 382/274
(Continued)

FOREIGN PATENT DOCUMENTS

JP  11-211433  8/1999
JP  2004-117478  4/2004
(Continued)

OTHER PUBLICATIONS

Authors: Istvan Pomozi, Gabor Horvath, and Rudiger Wehner, titled "How the clear-sky angle of polarization pattern continues underneath clouds: full-sky measurements and implications for animal orientation", Jun. 8, 2001, pp. 2933-2942.*

(Continued)

*Primary Examiner* — Mehrdad Dastouri
*Assistant Examiner* — Nguyen Truong
(74) *Attorney, Agent, or Firm* — Renner, Otto, Boisselle & Sklar, LLP

(57) ABSTRACT

The present invention provides an apparatus that includes a color and polarization image capturing section 201, a whole sky polarization map getting section 202, a weather determining section 203, a fine-weather sky part separating section 204, a cloudy-weather normal estimating section 207, and a pseudo 3D image generating section 208. The apparatus obtains polarization information outdoors with the polarization state of the sky taken into account, and estimates surface normal information at an object's surface on a two-dimensional image, thereby generating a surface normal image. Using that normal image, the apparatus divides the object into multiple ranges, extracts three-dimensional information and generates a viewpoint changed image, thereby generating a pseudo 3D image.

22 Claims, 42 Drawing Sheets

(56) References Cited

U.S. PATENT DOCUMENTS

| | | |
|---|---|---|
| 2009/0290039 A1 | 11/2009 | Kanamori et al. |
| 2009/0304299 A1 | 12/2009 | Motomura et al. |
| 2010/0088021 A1* | 4/2010 | Viner et al. .................. 701/201 |

FOREIGN PATENT DOCUMENTS

| | | |
|---|---|---|
| JP | 2006-186510 | 7/2006 |
| JP | 2007-086720 | 4/2007 |
| WO | 2007/108041 A1 | 9/2007 |
| WO | 2008/026518 A1 | 3/2008 |
| WO | 2008/099589 A1 | 8/2008 |
| WO | 2008/149489 A1 | 12/2008 |

OTHER PUBLICATIONS

Authors: Derek Hoiem, Alexei A. Efros, Martial Hebert; titled "Automatic Photo Pop-up".*

Joshi et al., "Simultaneous estimation of super-resolved depth map and intensity field using photometric cue", Computer Vision and Image Understanding 101 (2006) pp. 31-44.

International Search Report for corresponding International Application No. PCT/JP2009/006928 mailed Mar. 23, 2010.

Form PCT/ISA/237 for corresponding International Application No. PCT/JP2009/006928 mailed Mar. 23, 2010 and partial English translation.

Hoiem et al., "Automatic Pop-up", ACM SIGGRAPH 2005.

Daisuke Miyazaki et al., "Polarization Analysis of the Skylight Caused by Rayleigh Scattering and Sun Orientation Estimation using Fisheye-Lens Camera", Institute of Electronics, Information and Communication Engineers Pattern Recognition and Media Understanding Society, vol. 108, No. 198, pp. 25(1)-32(8), 2008.

Pomozi et al., "How the clear-sky angle of polarization pattern continues underneath clouds: full-sky measurements and implications for animal orientation", The Journal of Experimental Biology 204, pp. 2933-2942 (2001).

Chinese Office Action for corresponding Chinese Application No. 200980130653.9 issued on Jan. 28, 2013.

Yue et al., "3-D Surface Reconstruction Based on Polarization Analysis", Journal of Applied Optics, 2008, 29(6), pp. 844-848.

Zhao et al., "Simulation and Prediction for Rayleigh Skylight Polarization Distribution", Journal of Sichuan University, 2007, vol. 39 extra, pp. 288-291.

* cited by examiner

FIG.3
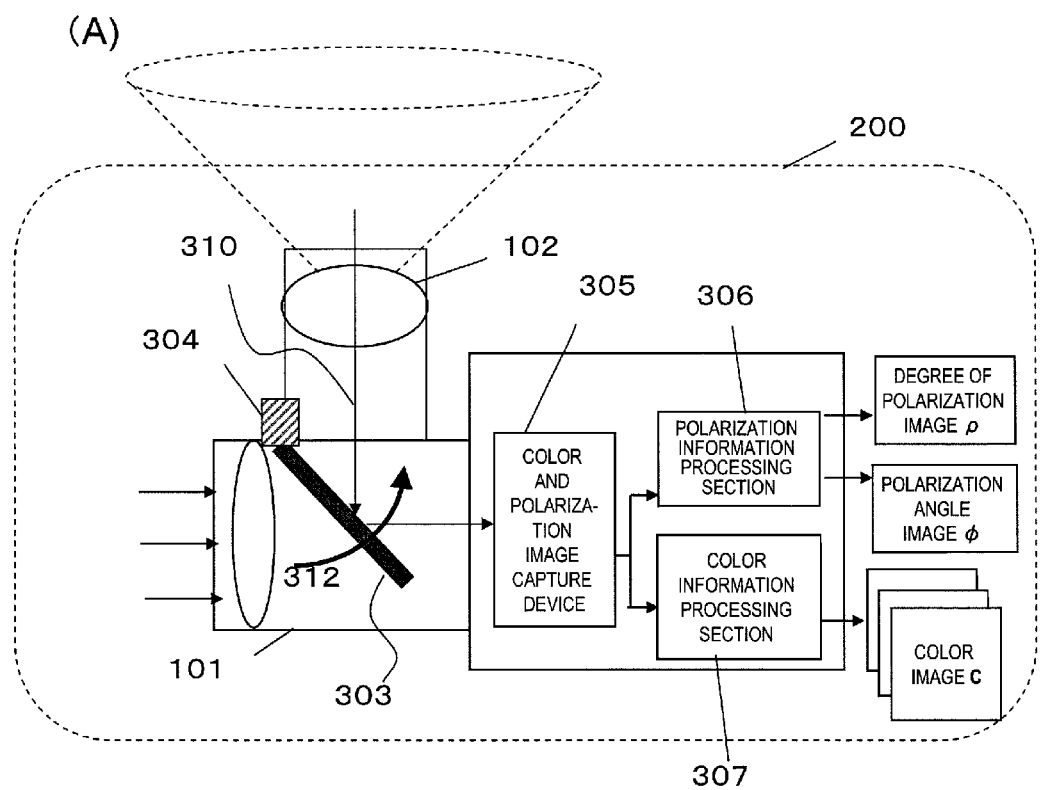
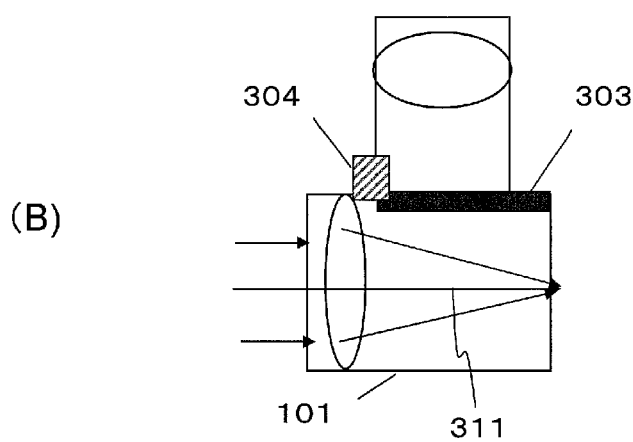

*FIG.4*
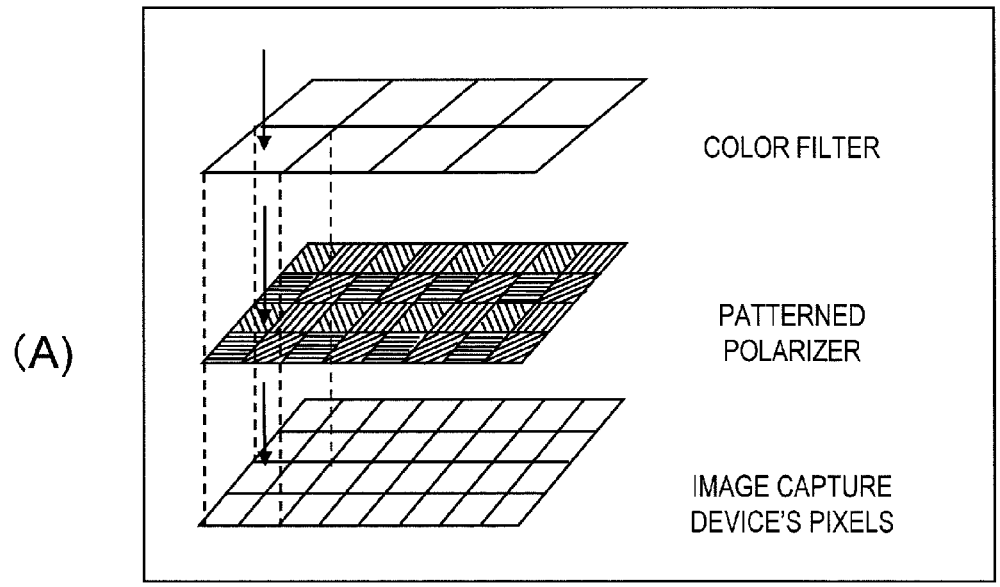
(A)
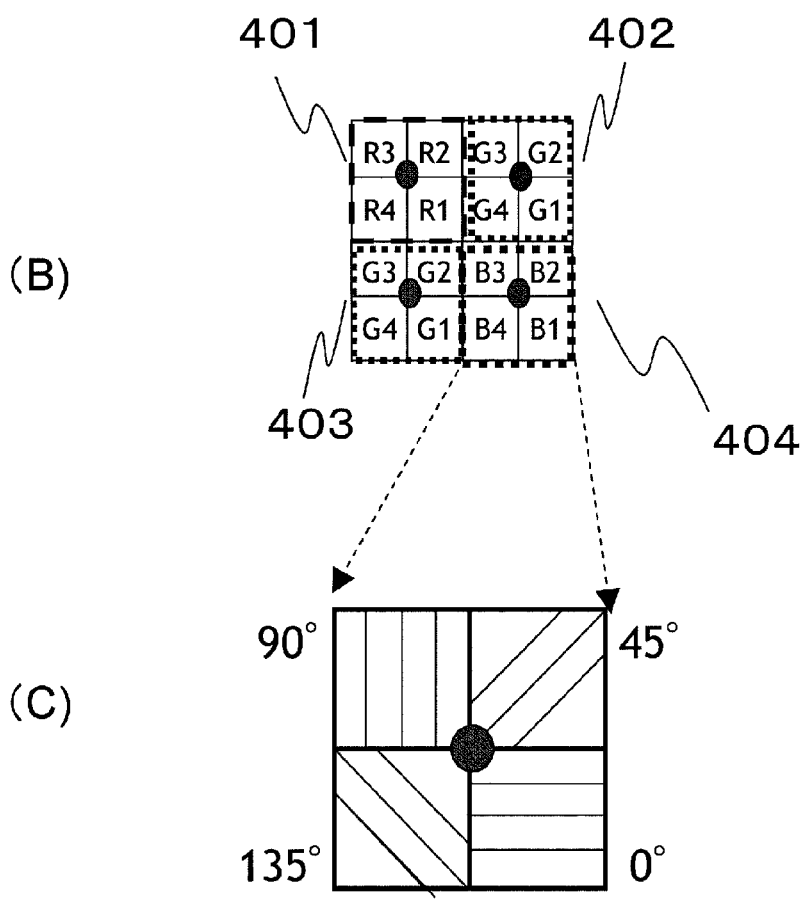
(B)
(C)

*FIG.7*
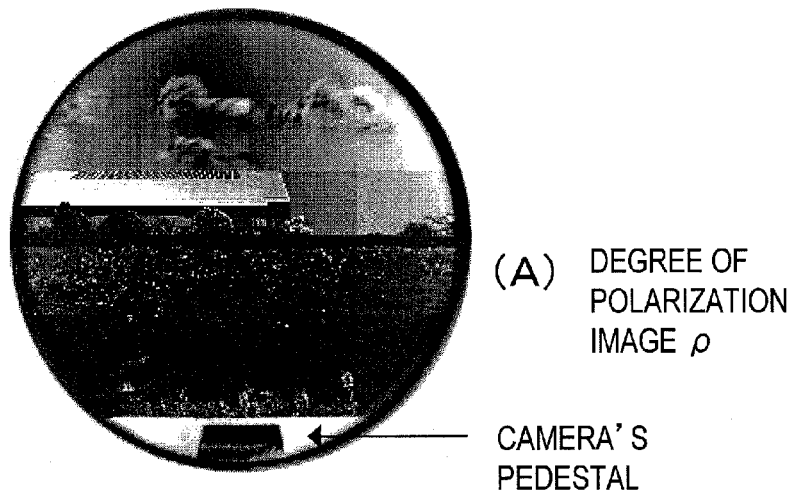
(A) DEGREE OF POLARIZATION IMAGE ρ
CAMERA'S PEDESTAL
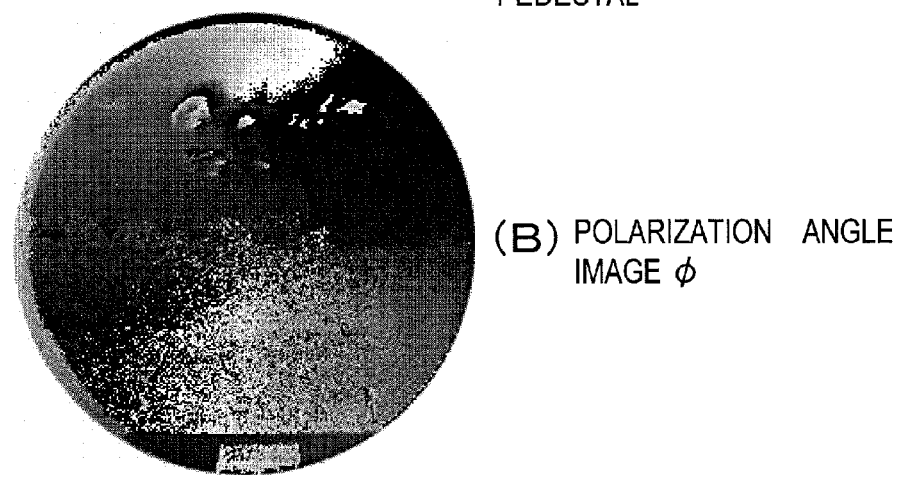
(B) POLARIZATION ANGLE IMAGE φ
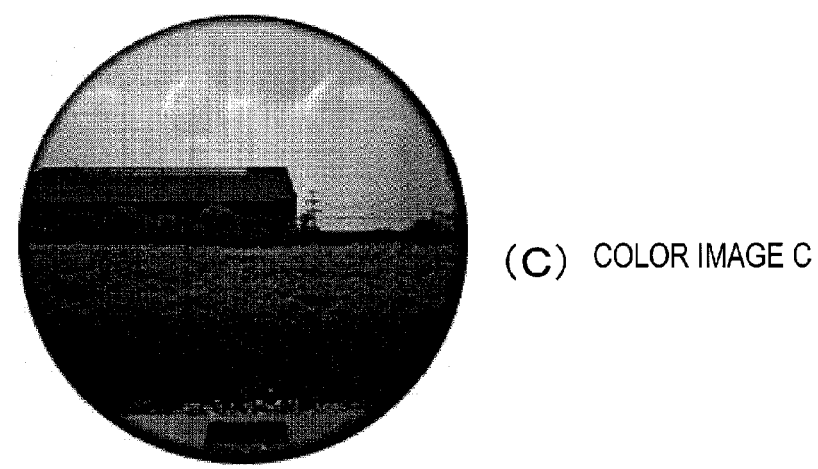
(C) COLOR IMAGE C FIG.9
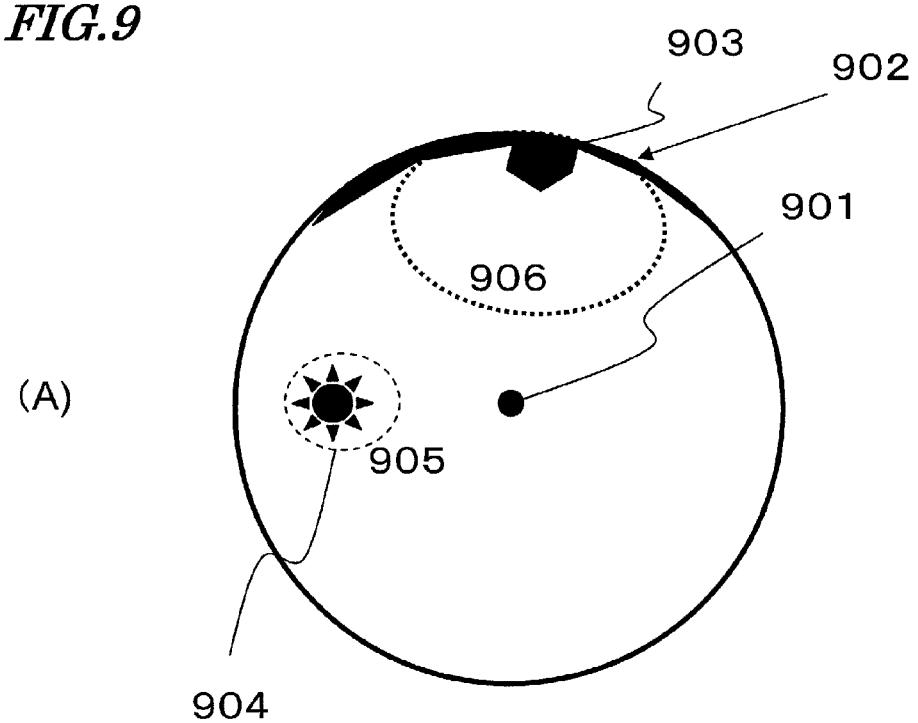
(A) WHOLE SKY DEGREE OF POLARIZATION MAP
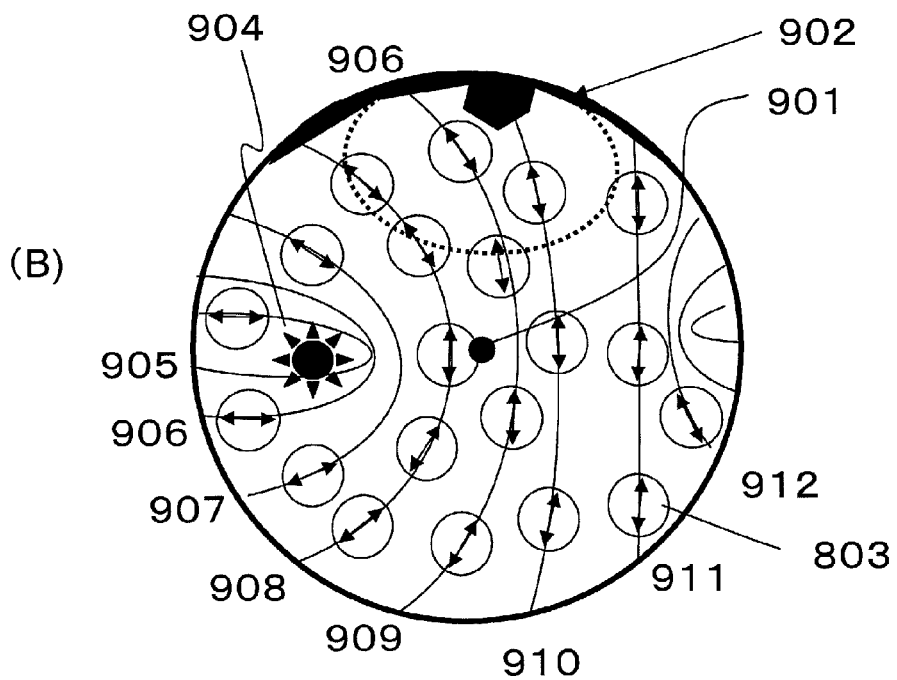
(B) WHOLE SKY POLARIZATION ANGLE MAP

*FIG.13*
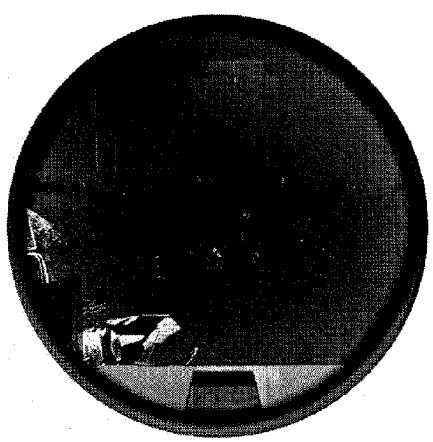
(A)
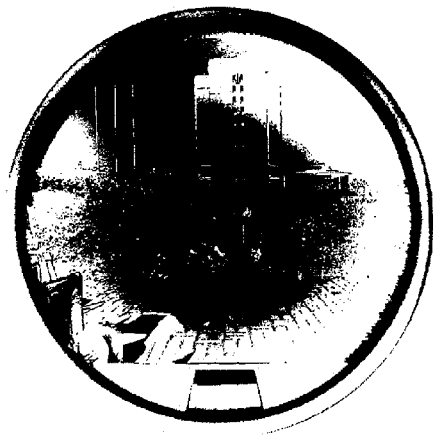
(B)
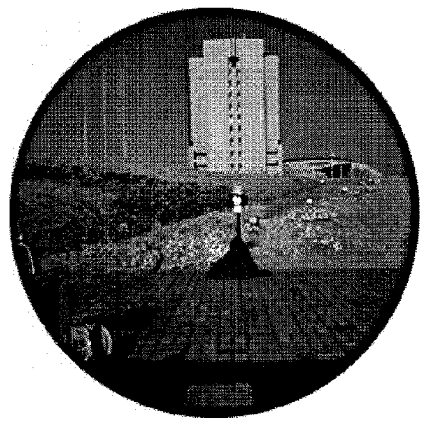
(C)
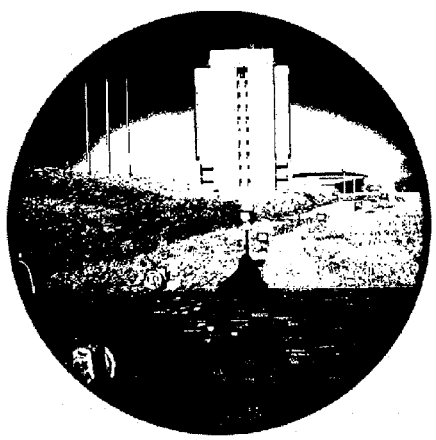
(D)
(E)
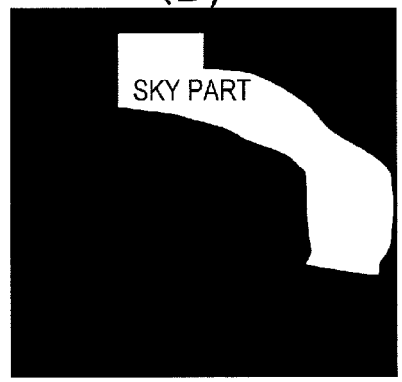
(F)

*FIG.14*
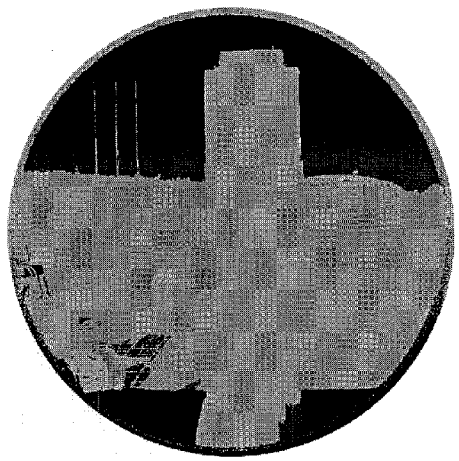
(A)
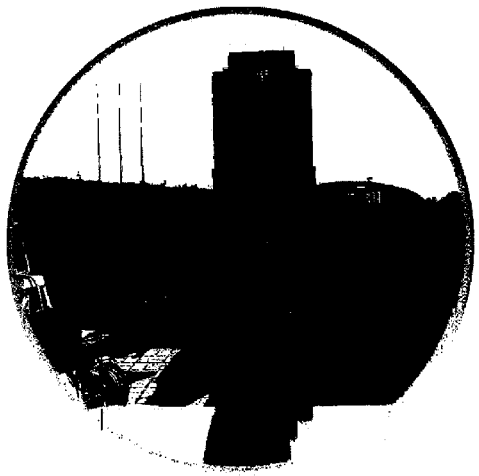
(B)
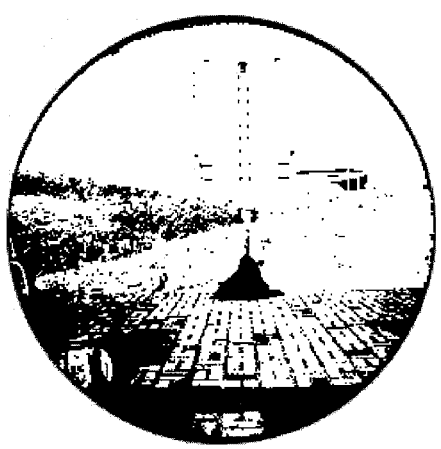
(C)
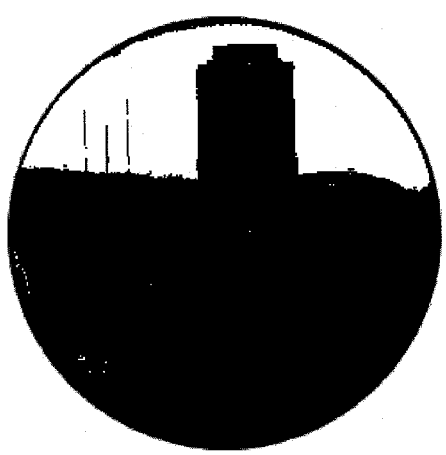
(D)

*FIG.17*
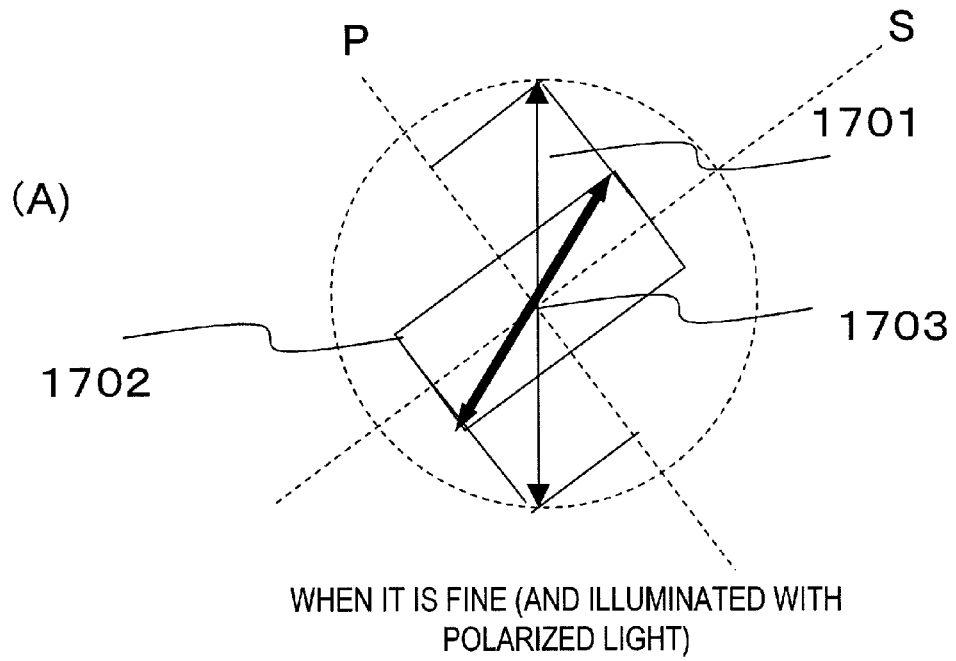
(A) WHEN IT IS FINE (AND ILLUMINATED WITH POLARIZED LIGHT)
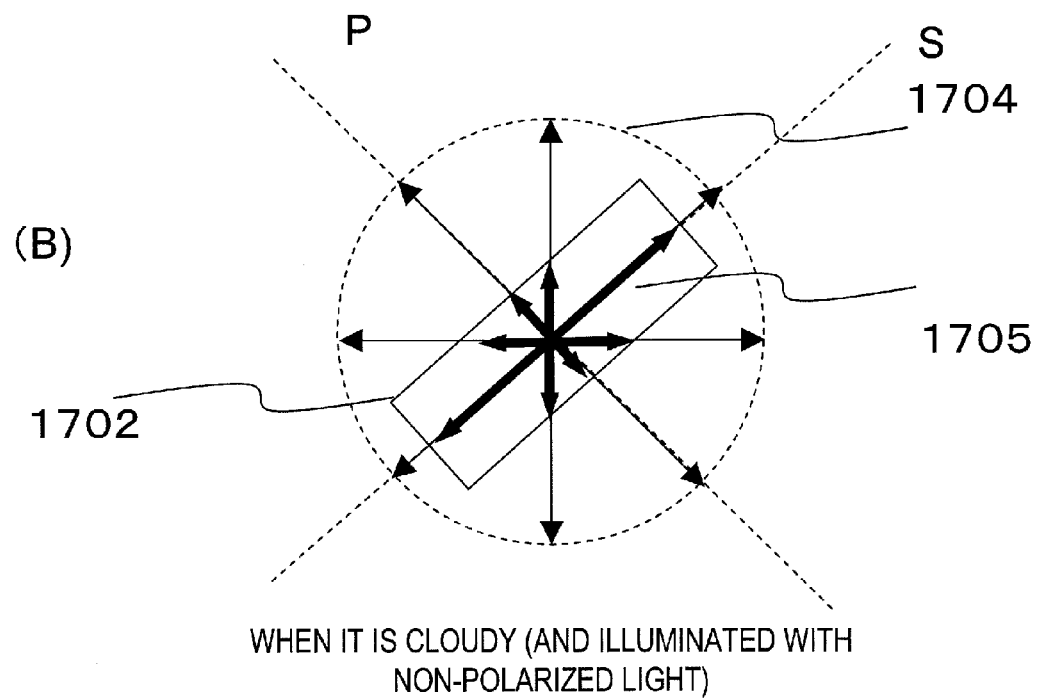
(B) WHEN IT IS CLOUDY (AND ILLUMINATED WITH NON-POLARIZED LIGHT)

*FIG.30*
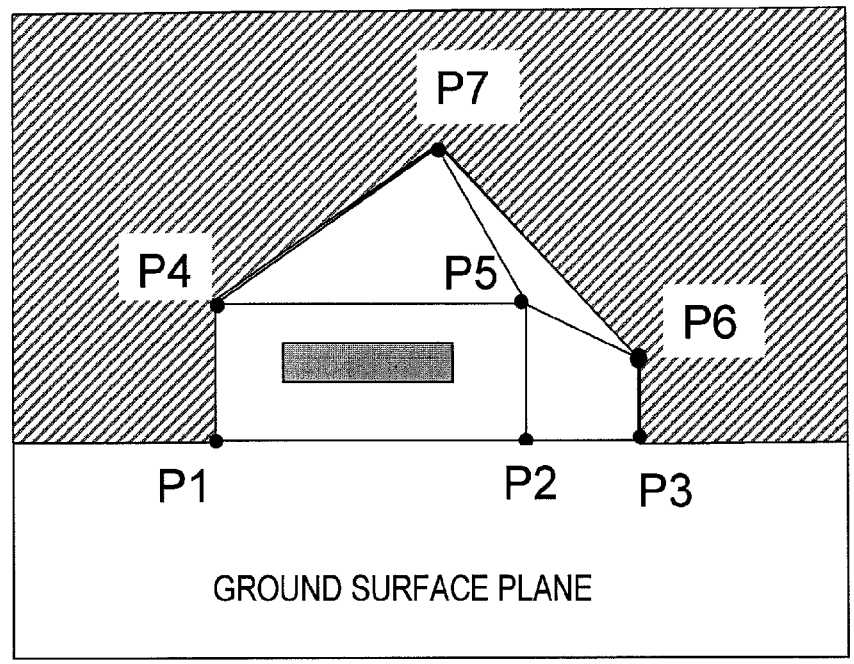
(A)
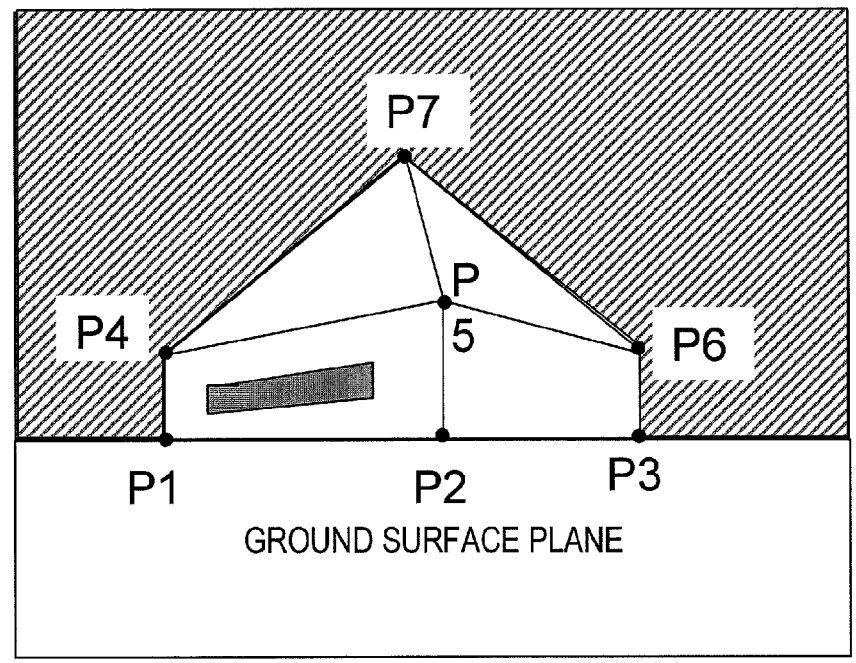
(B)

IMAGE PROCESSING DEVICE AND PSEUDO-3D IMAGE CREATION DEVICE

TECHNICAL FIELD

The present invention relates to an image processor and a pseudo-3D image generator. More particularly, the present invention relates to a pseudo-3D moving picture generator for generating a pseudo 3D image by estimating a 3D shape based on a normal 2D image with no depth information such a 2D still picture or moving picture that has been shot outdoors, for example.

BACKGROUND ART

To make the viewer feel as if a normal 2D still picture were a pseudo 3D image by arbitrary viewpoint changing, depth information representing a normal 3D object needs to be obtained by various methods. To do that, either a special rangefinder or a so-called "active" sensing system in which the light source is supposed to be moved may be used, for example. However, such a device or system is hard to be built in cameras for general consumers.

That is why some people proposed that a 3D object be estimated by making various kinds of assumptions on scene image shots, thereby attempting to get image synthesis done or get the viewpoint moved virtually. According to such an approach, it is impossible to restore every piece of information required to estimate a 3D object from normal scenes just as intended but there are still some chances of generating a pseudo 3D image successfully.

For example, according to the method disclosed in Patent Document No. 1, three basic types of scene structural models are synthesized together with respect to a typical scene with depth such as a road that leads to infinity, thereby turning a 2D photographic image into an image with depth and generating a pseudo-3D image.

On the other hand, the method disclosed in Non-Patent Document No. 1 is applied to more general scenes shot. Specifically, according to that technique, from a single given color image, collected are color information of its pixels, texture information in very small areas of the image, and arrangement information on that image, and vanishing points are estimated based on parallel line edges of the surface of an artificial object to shoot such as a building. Then, based on those pieces of information, the sky, the ground, walls and other surfaces that are perpendicular to the ground, and grass and other uneven surfaces are identified from the scene shot. Thereafter, by reference to information about a normal to the ground detected and a normal to the building surface, the given color image is turned into a 3D image by some simple technique and the photo is given a 3D look as in a so-called "popup picture book", thereby making a synthesis on the image as viewed from an arbitrary viewpoint. According to Non-Patent Document No. 1, such estimation can be done more and more accurately by learning through a lot of typical scene images.

According to the technique disclosed in Patent Document No. 1, however, the 3D information is just selected from basic patterns, rather than extracted from the actual image. That is why such a technique is applicable to only a few limited kinds of scenes, and therefore, should be said to lack in universality and practicability. On the other hand, according to the technique disclosed in Non-Patent Document No. 1, information can be certainly extracted from the given image. Nevertheless, that technique also has the following drawbacks:

1) a normal to a surface that tilts with respect to the ground surface cannot be estimated accurately,
2) unless the side is rectangular, the normal cannot be estimated accurately, and
3) surfaces, of which the color information is close to that of the sky or the ground, will be recognized erroneously.

All of these problems arise because a normal to a given surface cannot be estimated directly based on a 2D image. According to conventional methods for obtaining surface normal information from a 2D image, sometimes a laser rangefinder may be used and sometimes the information is calculated based on a distance by stereoscopic shooting. However, these two techniques are far from being practicable when applied to a huge building located at a great distance outdoors.

To extract a surface normal by some passive technique even from such a great distance, however, polarization information could be used. For instance, according to the technique disclosed in Patent Document No. 2, a given object is illuminated 360 degrees with a total diffusive light and is shot with a camera that can obtain polarization information from that object, thereby collecting information about the shape of the object. If the refractive index of the object is known, the shape of a transparent object, which is usually hard to measure, can also be obtained.

To apply the technique disclosed in Patent Document No. 2 effectively, however, the point is that the object should be specular reflector, that the reflected light should be polarized following the Fresnel's law, and that the whole object should be illuminated with a surrounding surface light so that specular reflection is produced over the entire surface of the object. That technique is also characterized by obtaining surface normals directly without measuring the distance, unlike a technique for estimating the shape by measuring the distance first with a rangefinder or by stereoscope and then estimating the normal.

It is already known that when some object located at a great distance is going to be shot outdoors in the daytime, the whole object is illuminated with surrounding sunlight falling from the sky and that if it is fine, a lot of objects will produce specular reflection on top of that. That is why this is a very similar situation to the one to which the technique of Patent Document No. 2 is supposed to be applied.

It should be noted that a technique for generating a pseudo 3D image based on a 2D image is disclosed in Non-Patent Document No. 1. As for the polarized light coming from the sky, it was already reported in Non-Patent Documents Nos. 2 and 3. And a conventional polarization imaging system is disclosed in Patent Document No. 3.

CITATION LIST

Patent Literature

Patent Document No. 1: Japanese Patent Application Laid-Open Publication No. 2006-186510
Patent Document No. 2: Japanese Patent Application Laid-Open Publication No. 11-211433
Patent Document No. 3: Japanese Patent Application Laid-Open Publication No. 2007-86720

Non-Patent Literature

Non-Patent Document No. 1: "Automatic Photo Pop-up", Derek Hoiem et al., ACM SIGGRPAH 2005
Non-Patent Document No. 2: "Polarization Analysis of the Skylight Caused by Rayleigh Scattering and Sun Orientation Estimation using Fisheye-Lens Camera", Daisuke Miyazaki et al., the Institute of Electronics, Information and Communication Engineers Pattern Recognition and Media Understanding Society, Vol. 108, No. 198, pp. 25-32, 2008

Non-Patent Document No. 3: The Journal of Experimental Biology 204, 2933-2942 (2001)

SUMMARY OF INVENTION

Technical Problem

If the technique disclosed in Patent Document No. 2 is used outdoors, however, the following problems will arise.

Specifically, if the surface normal is estimated based on polarization information of the specular reflected light, the illumination source should not only surround entirely the object to illuminate but also be non-polarized (or randomly polarized). For that reason, Patent Document No. 2 uses a very special device in which the object is completely covered with a total diffusive sphere and illuminated with light coming from outside of the sphere.

On the other hand, if an object is going to be shot outdoors when it is fine, its illumination consists of the sunlight coming directly from the sun (which is parallel light) and surface illumination of the blue sky. The sunlight is non-polarized but the blue sky is polarized. That is why in a normal a situation where the object to shoot avoids receiving the sunlight directly coming from the sun, the specular reflection will be produced when the object is illuminated with surrounding polarized light coming from the blue sky. In that case, the conventional technique cannot be used.

Solution to Problem

An image processor according to the present invention includes: a polarization image capturing section for capturing a polarization image that provides polarization information of multiple pixels; an object normal estimating section for estimating a normal to the surface of an object, which is located outdoors, by reference to the polarization information contained in the polarization image; and a whole sky polarization map getting section for getting a whole sky polarization map indicating a relation between a position on the whole sky and polarization information at that position. The object normal estimating section detects the polarization state of specular reflected light at the object's surface based on the polarization information and by reference to the whole sky polarization map, thereby estimating the normal to the surface of the object.

Another image processor according to the present invention includes: an image capturing section for capturing a luminance image that provides luminance information of multiple pixels and a polarization image that provides polarization information of the pixels; a weather determining section for determining whether the weather is currently cloudy or fine; and an object normal estimating section for detecting the polarization state of specular reflected light at the surface of an object, which is located outdoors, based on the polarization information and estimating a normal to the surface of the object by any of multiple different methods that is selected according to the weather that has been determined by the weather determining section.

In one preferred embodiment, the image capturing section captures the luminance images for multiple different colors.

In another preferred embodiment, the weather determining section determines the weather by the degree of polarization of the sky or the area of a range, of which the degree of polarization is equal to or higher than a reference level.

In this particular preferred embodiment, the weather determining section determines the current weather to be either a cloudy one, in which the degree of polarization of the sky is lower than the predetermined reference level, or a fine one, in which the degree of polarization of the sky is equal to or higher than the reference level.

In another preferred embodiment, even if the sky is partially overcast, the weather determining section also determines the weather to be fine.

In still another preferred embodiment, the weather determining section obtains information about the weather from an external source, thereby determining what the weather is like now.

In yet another preferred embodiment, the image processor further includes a whole sky polarization map getting section for getting a whole sky polarization map indicating a relation between a position on the whole sky and polarization state at that position. If the weather determining section has determined that the weather is fine currently, the normal to the surface of the object is estimated using the whole sky polarization map.

In this particular preferred embodiment, the image processor includes a cloudy weather normal estimating section for estimating the normal based on specular reflected polarized light and a fine weather normal estimating section for estimating the normal either by geometry or based on the specular reflected polarized light. In estimating the normal by geometry, the fine weather normal estimating section refers to the relation between a position on the whole sky and the polarization state at that position as indicated by the whole sky polarization map.

In another preferred embodiment, the whole sky polarization map getting section gets a whole sky polarization image using a wide-angle lens.

In an alternative preferred embodiment, the whole sky polarization map getting section gets data of the whole sky polarization map from an external source.

In yet another preferred embodiment, the image processor includes a fine weather sky part separating section for separating a sky part from the image when the weather is fine, and a cloudy weather sky part separating section for separating a sky part from the image when the weather is cloudy. The fine weather and cloudy weather sky part separating sections have their modes of operation or outputs changed according to the output of the weather determining section.

In yet another preferred embodiment, the image capturing section includes: a color and polarization obtaining section in which a number of polarizers with polarization transmission planes at different angles are arranged adjacent to each other within multiple pixels of the same color of a single-panel color image capture device that has a color mosaic filter; a polarization information processing section for approximating measured intensities, which have been provided by multiple polarizers for the same color, to a sinusoidal function and averaging approximation parameters thus obtained between the colors, thereby obtaining integrated polarization information; and a color information processing section for generating an average color intensity by calculating the average of the measured intensities that have been provided. The image capturing section outputs not only (i) a color image but also (ii) a degree-of-polarization image and polarization angle image that have been generated based on the polarization information.

In yet another preferred embodiment, (i) if the angle of incidence of a light source is smaller than a predetermined value, the normal is estimated by geometry. But (ii) if the degree of polarization of the light source is smaller than a predetermined value, the normal is estimated based on specular reflected polarized light.

In yet another preferred embodiment, if the weather has been determined to be cloudy, the normal is estimated based on the polarization angle and the degree of polarization of the specular reflected light. If there are multiple estimated normal vectors around a viewing vector, then one of those normals, of which the vector is upward with respect to a horizontal plane including the viewing vector, is selected. If there are multiple estimated normal vectors within an incoming light plane including the viewing vector and incident light, then one of those normals, of which the vector defines an angle of incidence that is smaller than a Brewster angle, is selected.

A pseudo 3D image generator according to the present invention includes: a plane extracting section for extracting a plane, which intersects at right angles with the normal to the surface of the object that has been estimated by an image processor according to any of the preferred embodiments of the present invention described above, based on the surface normal, and a pseudo 3D image generating section for generating a scene image from a different viewpoint by subjecting the plane that has been extracted by the plane extracting section to a viewpoint changing.

In one preferred embodiment, the pseudo 3D image generating section estimates the world coordinates of the vertices of the plane that has been extracted by the plane extracting section.

An image processing method according to the present invention includes the steps of: capturing a polarization image of an outdoor scene; getting a whole sky polarization map; and determining what the weather is like now. The method further includes the step of detecting the polarization state of specular reflected light at the surface of an object, which is located outdoors, based on the polarization image and estimating a normal to the surface of the object by any of multiple different methods that is selected according to the weather determined.

In one preferred embodiment, if the weather has been determined to be fine now, the normal is estimated either by geometry or based on the specular reflected polarized light.

In this particular preferred embodiment, if the angle of incidence of a light source is small, the degree of confidence of the normal that has been estimated by geometry is increased. If the degree of polarization of the light source is small, the degree of confidence of the normal that has been estimated based on the specular reflected light is increased. And one of the two normals that has resulted in the higher degree of confidence is adopted.

In another preferred embodiment, if the weather has been determined to be cloudy, the normal is estimated based on the polarization angle and the degree of polarization of the specular reflected light. If there are multiple estimated normal vectors around a viewing vector, then one of those normals, of which the vector is upward with respect to a horizontal plane including the viewing vector, is selected. If there are multiple estimated normal vectors within an incoming light plane including the viewing vector and incident light, then one of those normals, of which the vector defines an angle of incidence that is smaller than a Brewster angle, is selected.

A method for generating a pseudo 3D image according to the present invention includes the steps of: capturing a polarization image of an outdoor scene; estimating a normal to the surface of an object, which is located outdoors, by reference to the polarization information contained in the polarization image; extracting a plane that intersects at right angles with the surface normal based on the estimated normal to the surface of the object; and generating a scene image from a different viewpoint by viewpoint changing.

In one preferred embodiment, the method includes the step of estimating the world coordinates of the vertices of the extracted plane.

Advantageous Effects of Invention

According to the present invention, even if the conventional rangefinder or stereoscope is useless (e.g., in a situation where the 3D shape of a huge building located at a great distance from the camera needs to be estimated outdoors), a normal to the surface of the object can also be estimated by reference to the polarization information of the sky. Also, an image processing method and apparatus for recognizing the sky, ground, walls, roof and so on is provided. On top of that, by carrying out the image processing of the present invention, a pseudo 3D image generator can also be provided.

BRIEF DESCRIPTION OF DRAWINGS

FIG. 3A is a block diagram showing a configuration for a color and polarization image capturing section as a preferred embodiment of the present invention and FIG. 3B shows a configuration for a whole sky polarization map getting section.

Portion (A) of FIG. 4 is a perspective view illustrating a configuration for a color and polarization imager, portion (B) of FIG. 4 illustrates a portion of its image sensing plane as viewed along the optical axis from right over the plane, and portion (C) of FIG. 4 is a partially enlarged view thereof.

Figure 5:
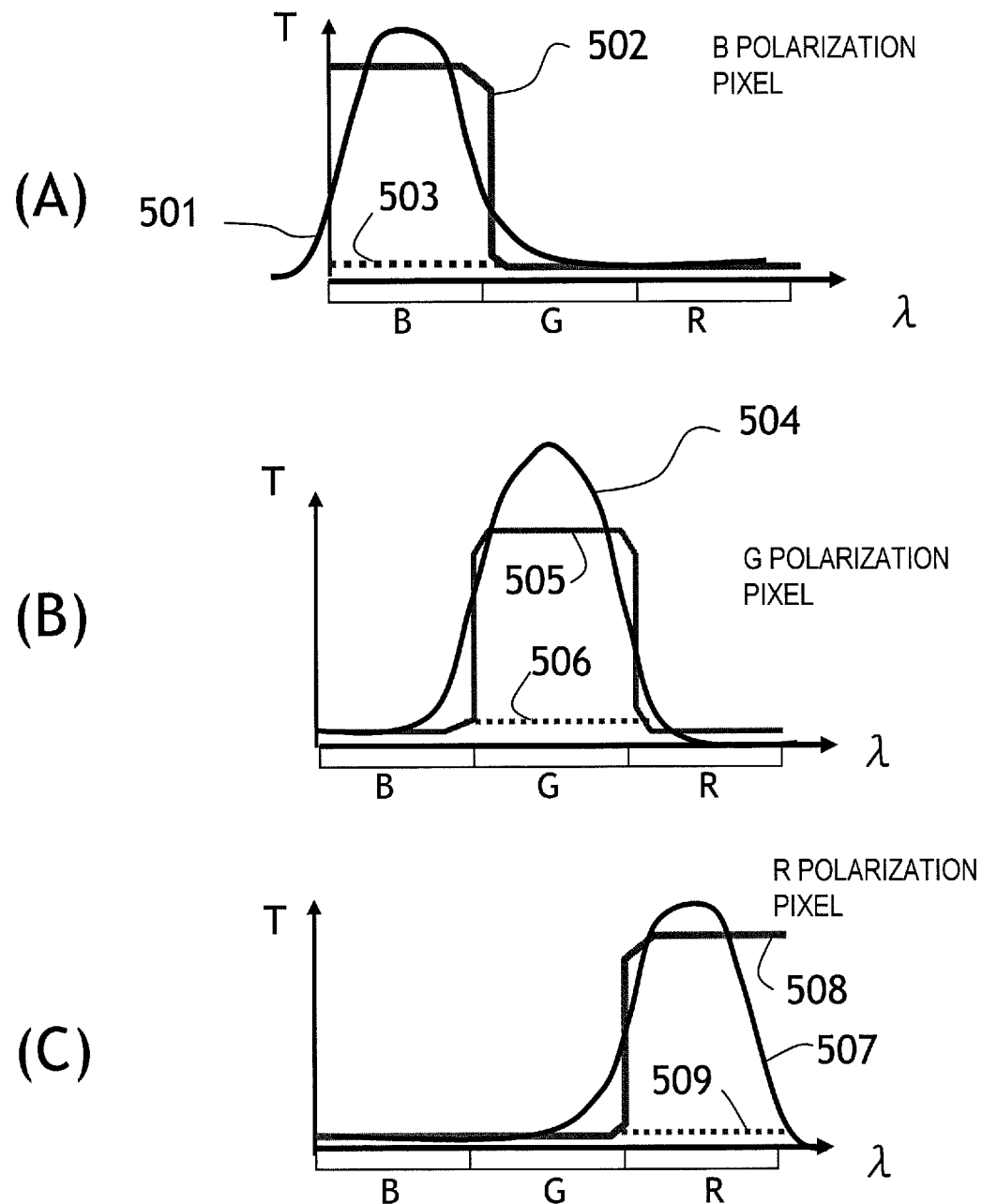

FIGS. 5(A) to 5(C) are graphs schematically showing the wavelength characteristics of B, G and R polarization pixels, respectively.

Figure 6:
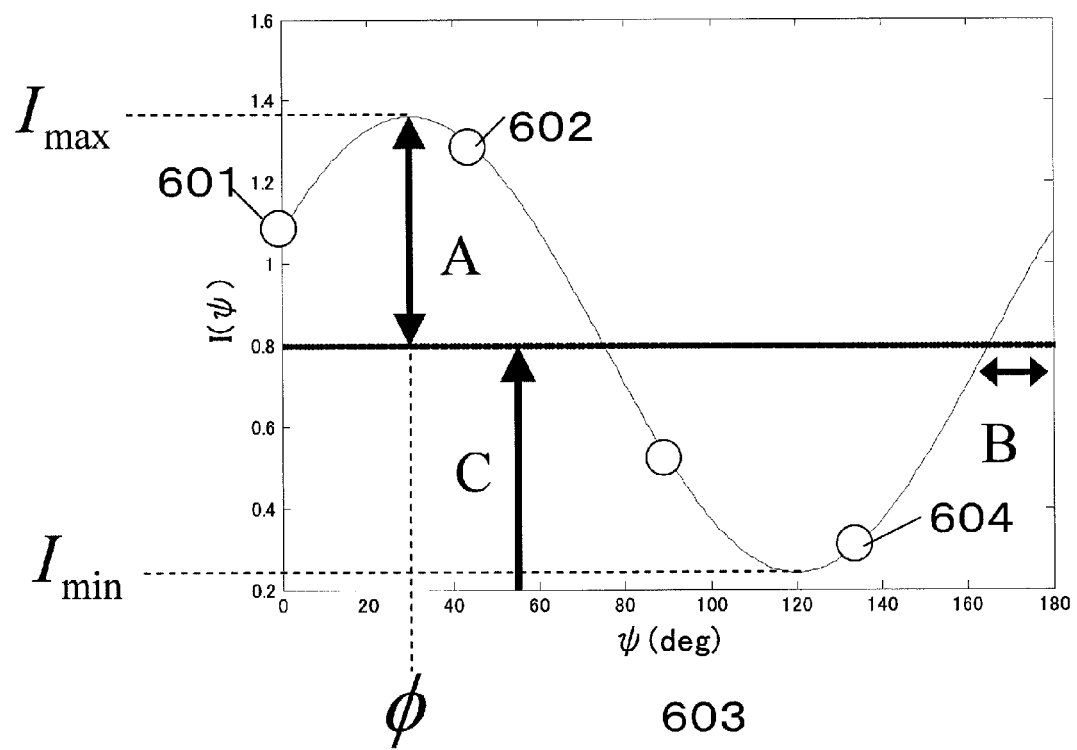

FIG. 6 shows the intensity of the light that has been transmitted through four polarizers with polarization main axes in mutually different directions.

FIGS. 7(A) through 7(C) illustrate three different kinds of images captured by the color and polarization image capturing section when a scene with a building is shot.

FIGS. 8(A) through 8(C) are schematic representations of the images shown in FIGS. 7(A) to 7(C).

FIGS. 9(A) and 9(B) illustrate two kinds of images to be gotten by the whole sky polarization map getting section.

Figure 10A:
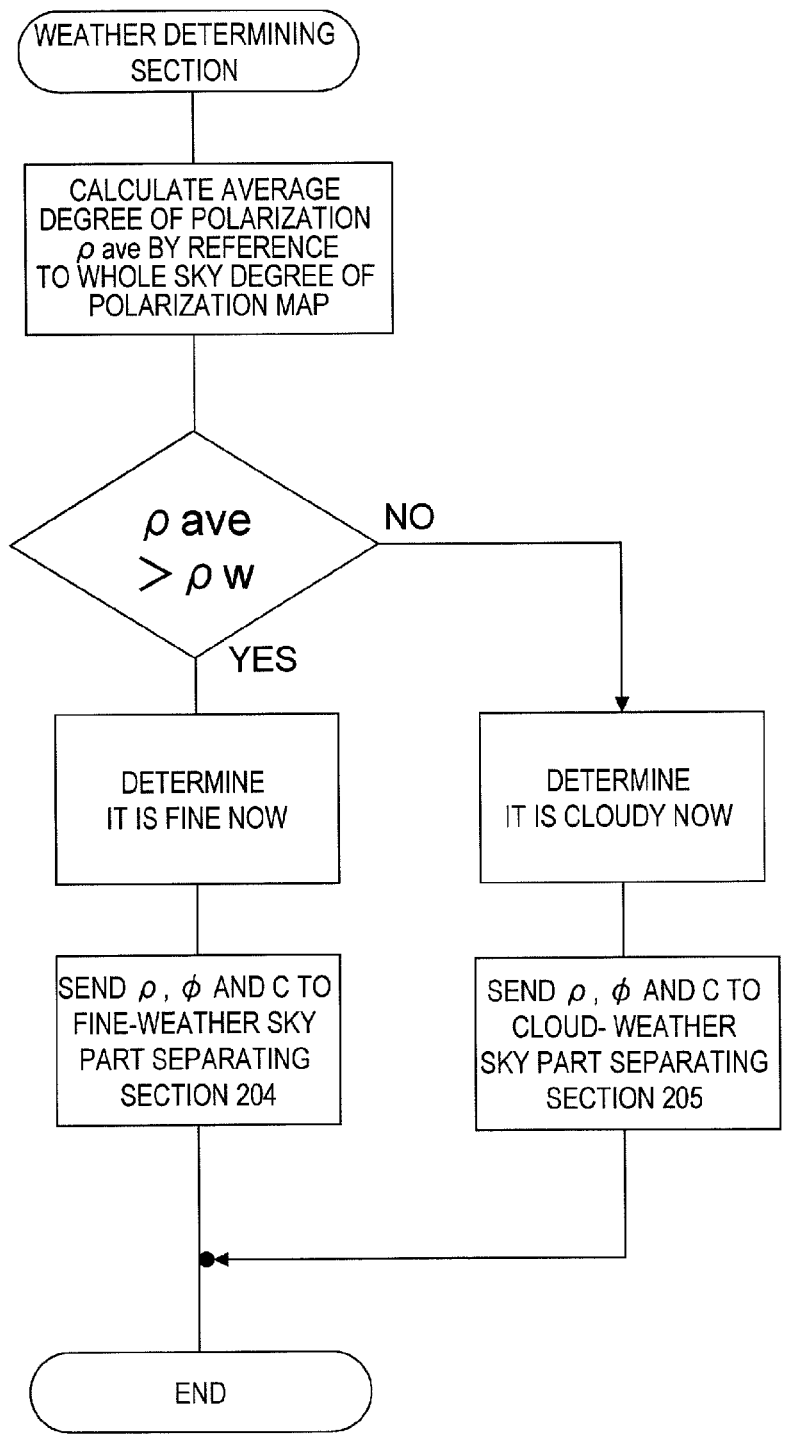

FIG. 10A is a flowchart showing how the weather determining section may operate in one example.

Figure 10B:
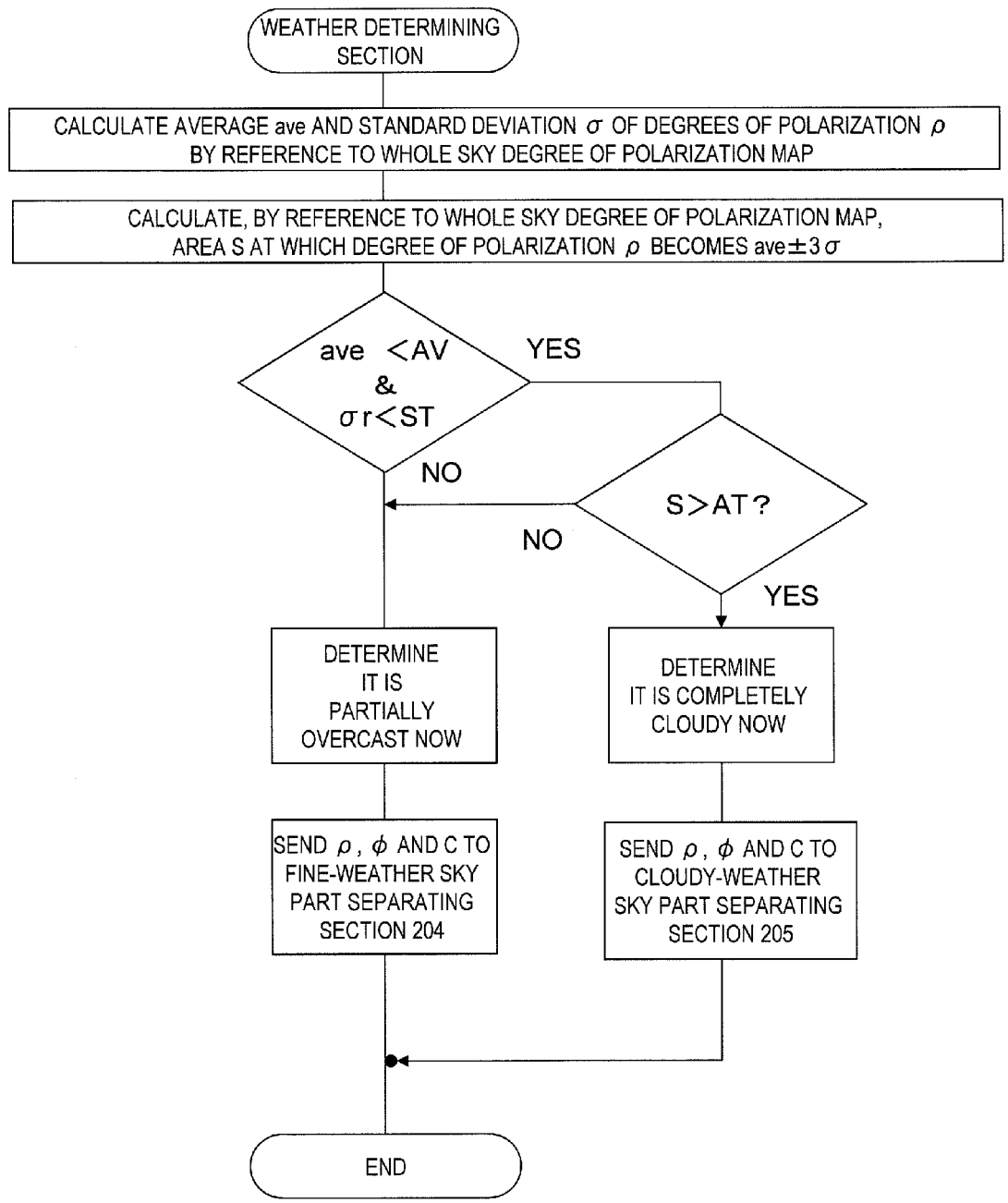

FIG. 10B is a flowchart showing how the weather determining section may operate in another example.

Figure 11:
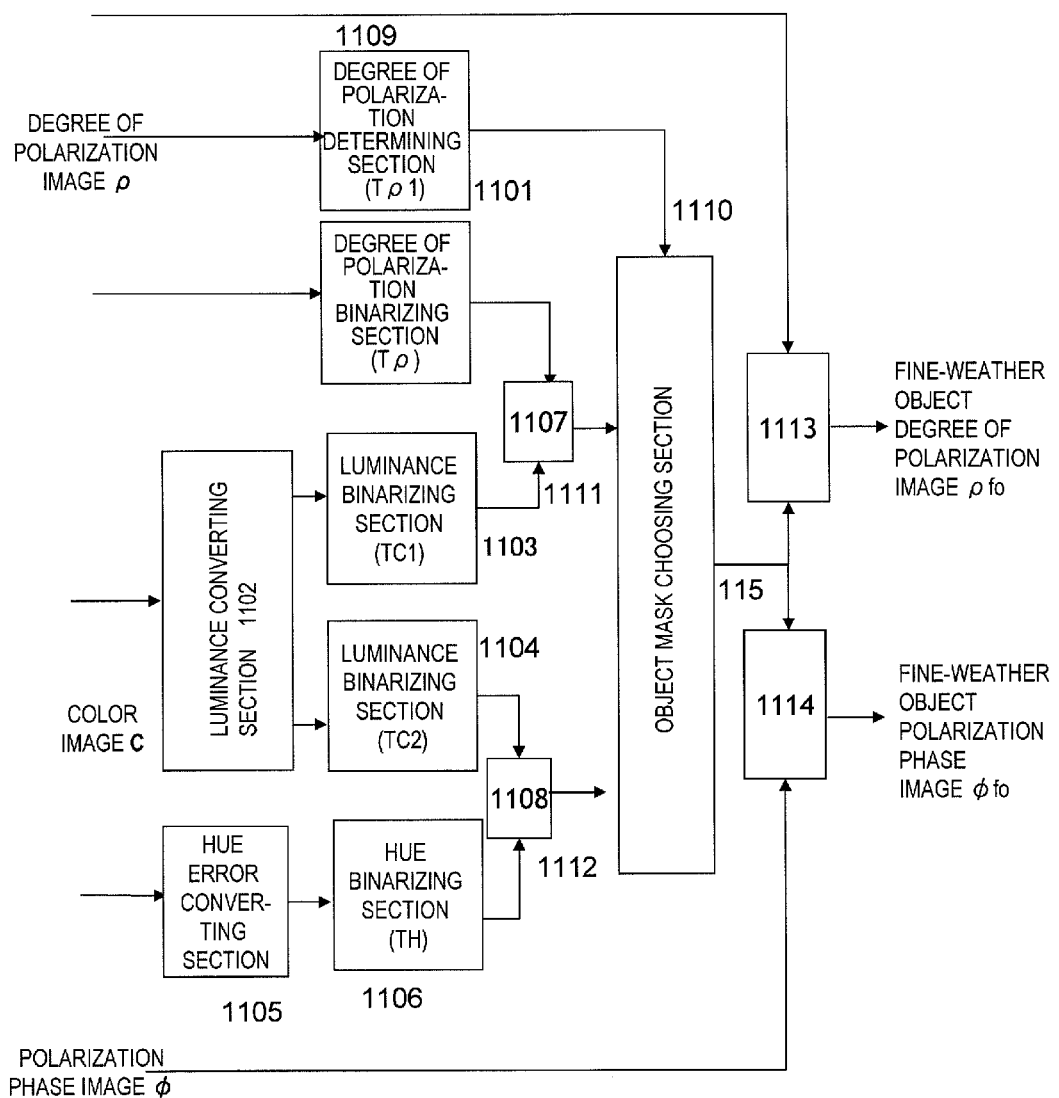

FIG. 11 is a block diagram showing the configuration of a fine weather sky part separating section.

FIGS. 12(A) through 12(H) show an example in which a sky part could be separated successfully from an actual one using polarization and luminance.

FIGS. 13(A) through 13(F) show an example in which a sky part failed to be separated from an actual one using polarization and luminance.

FIGS. 14(A) through 14(D) show an example in which a sky part could be separated successfully from an actual one using hue and luminance.

Figure 15:
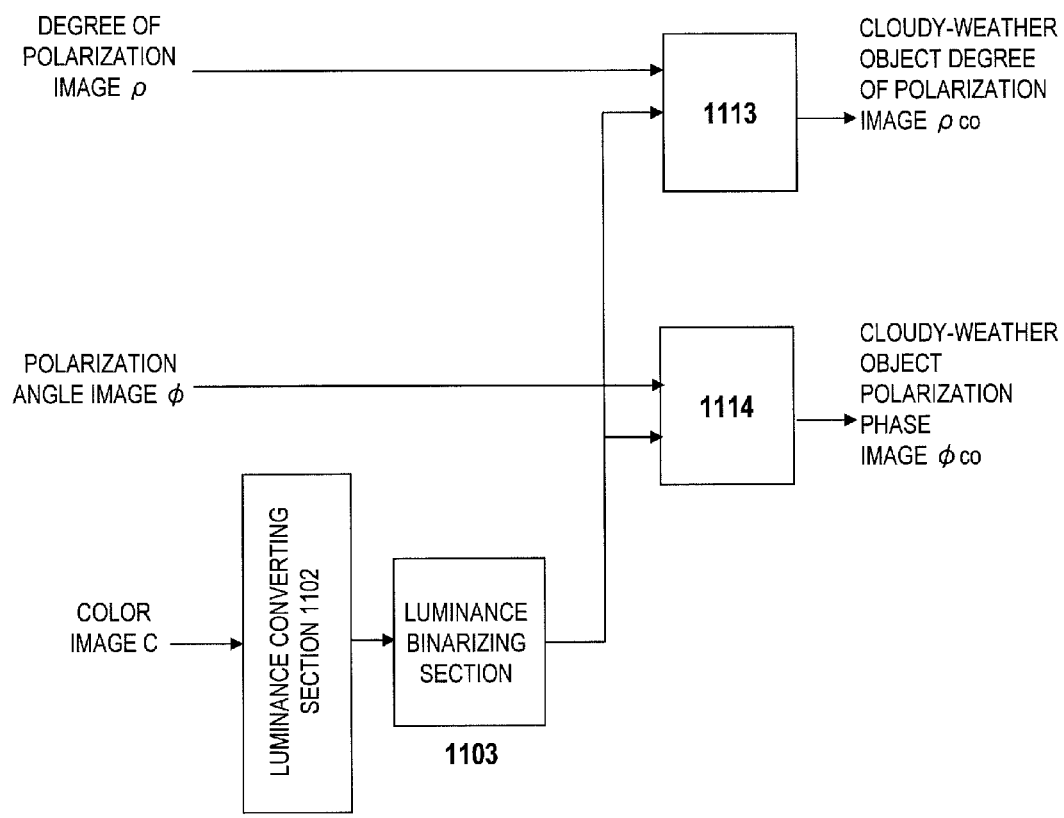

FIG. 15 is a block diagram showing a configuration for a cloudy-weather sky part separating section.

Figure 16:
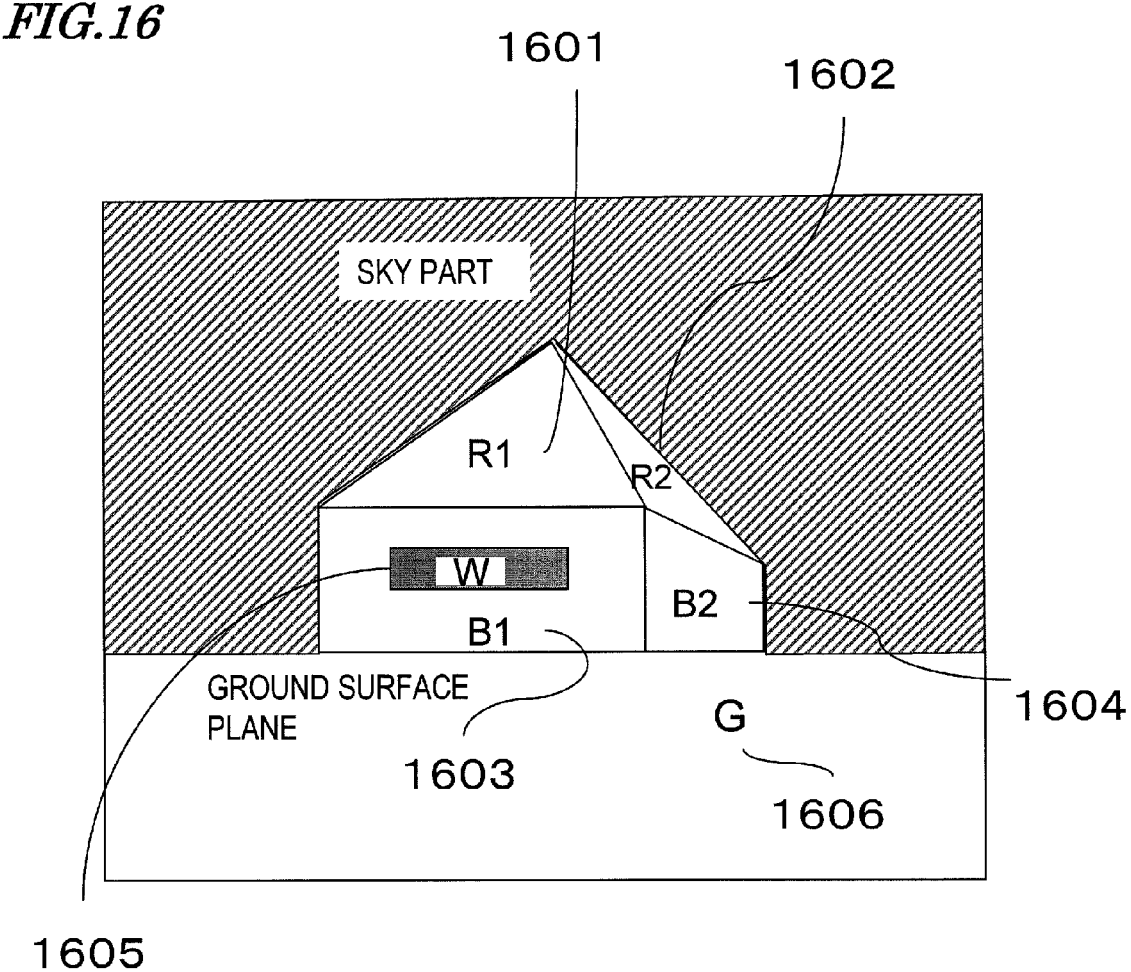

FIG. 16 illustrates a scene image, from which the sky part has been separated when it is fine or cloudy.

FIGS. 17(A) and 17(B) illustrate how the polarization phenomenon produced by the specular reflected light from the object varies depending on whether it is fine or cloudy.

Figure 18:
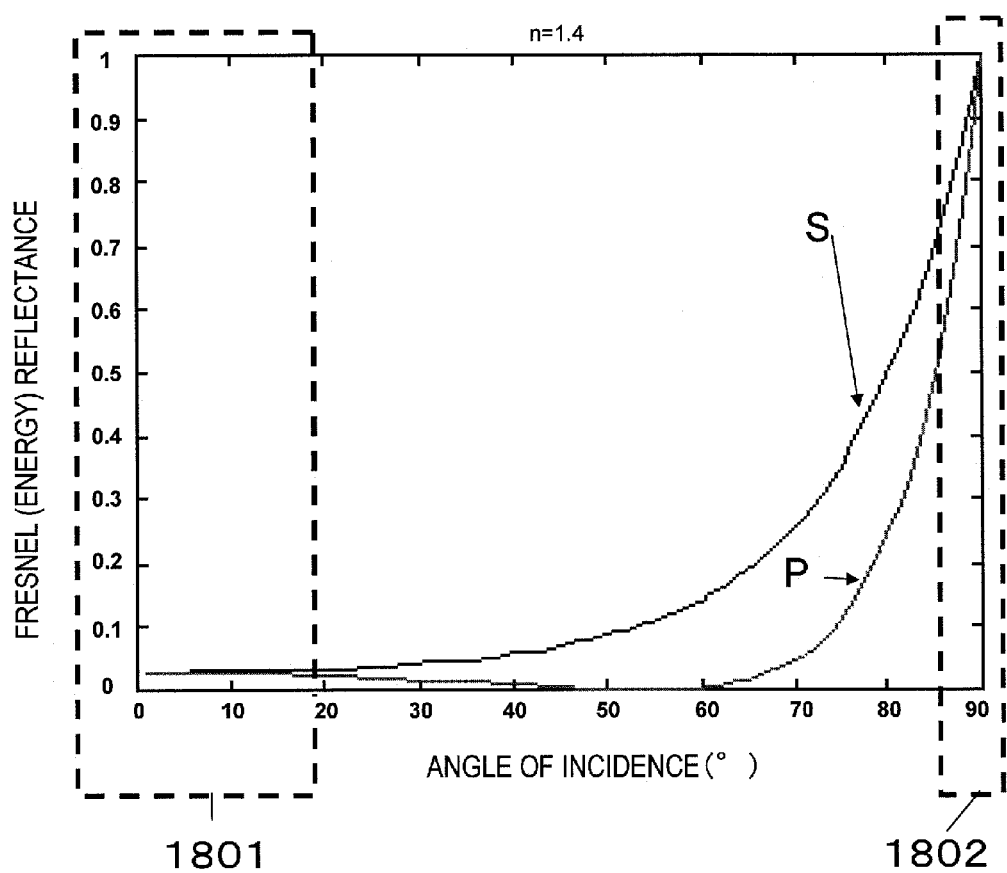

FIG. 18 is a graph showing how the Fresnel reflectance of specular reflected light varies with the angle of incidence.

Figure 19:
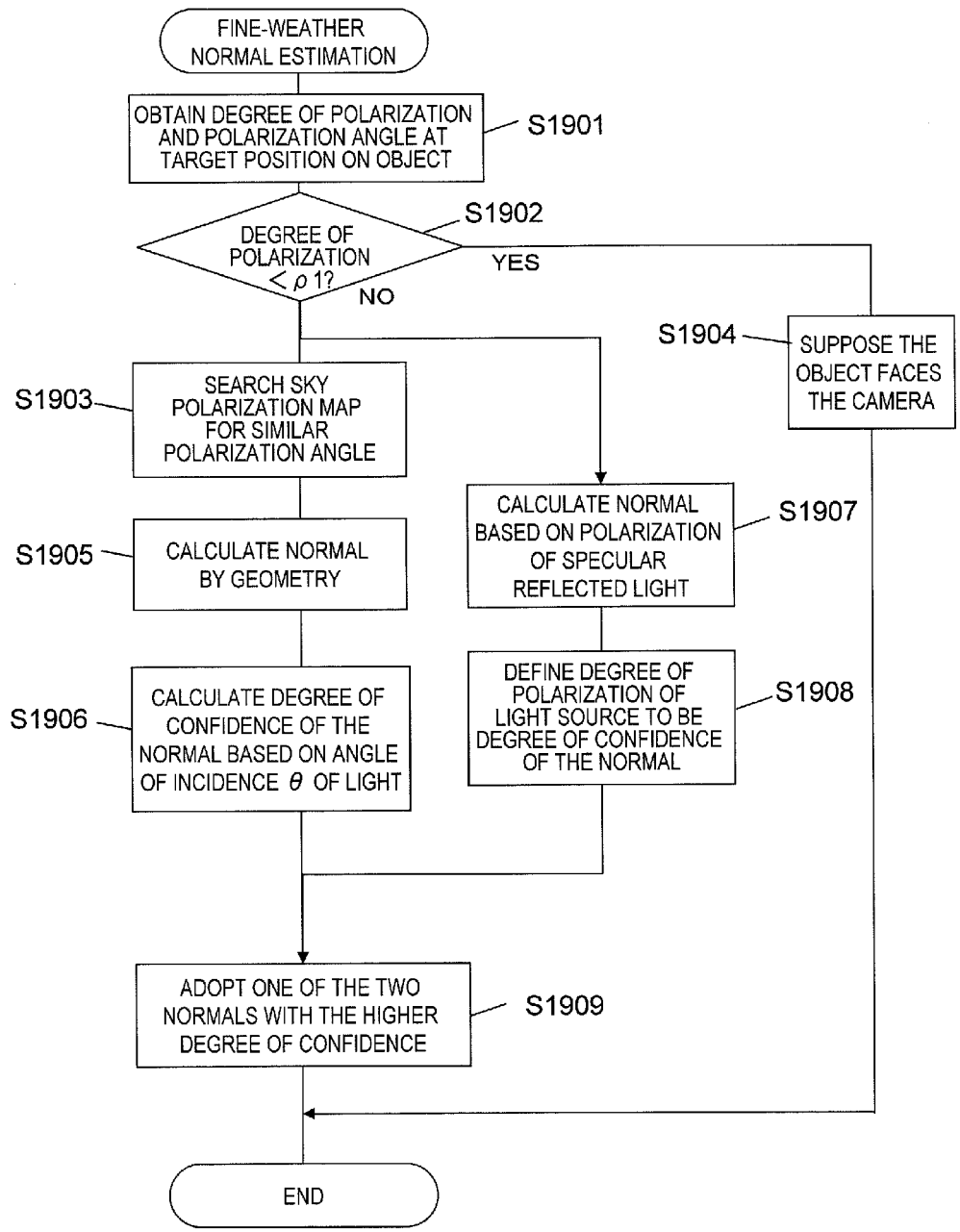

FIG. 19 is a flowchart showing how a fine-weather normal estimating section operates.

Figure 20A:
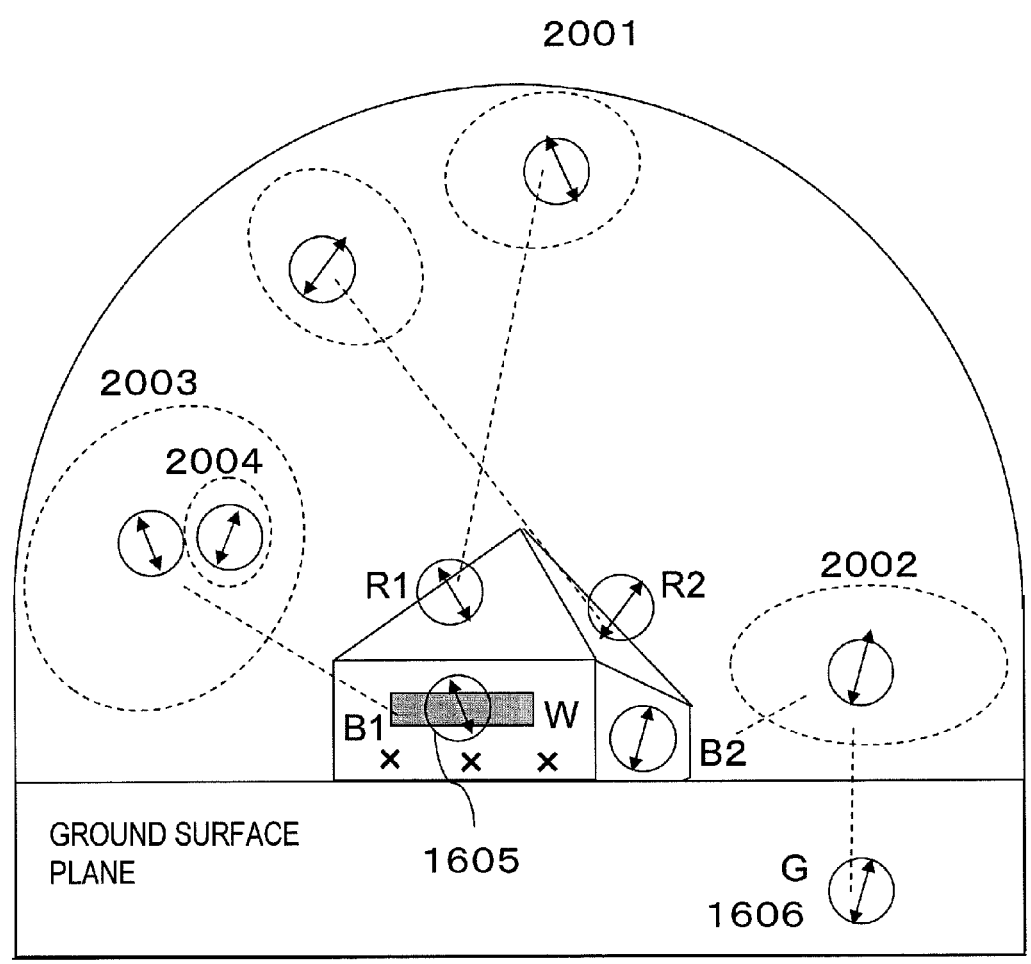

FIG. 20A shows a polarization phase in a situation where normal is estimated by geometry.

Figure 20B:
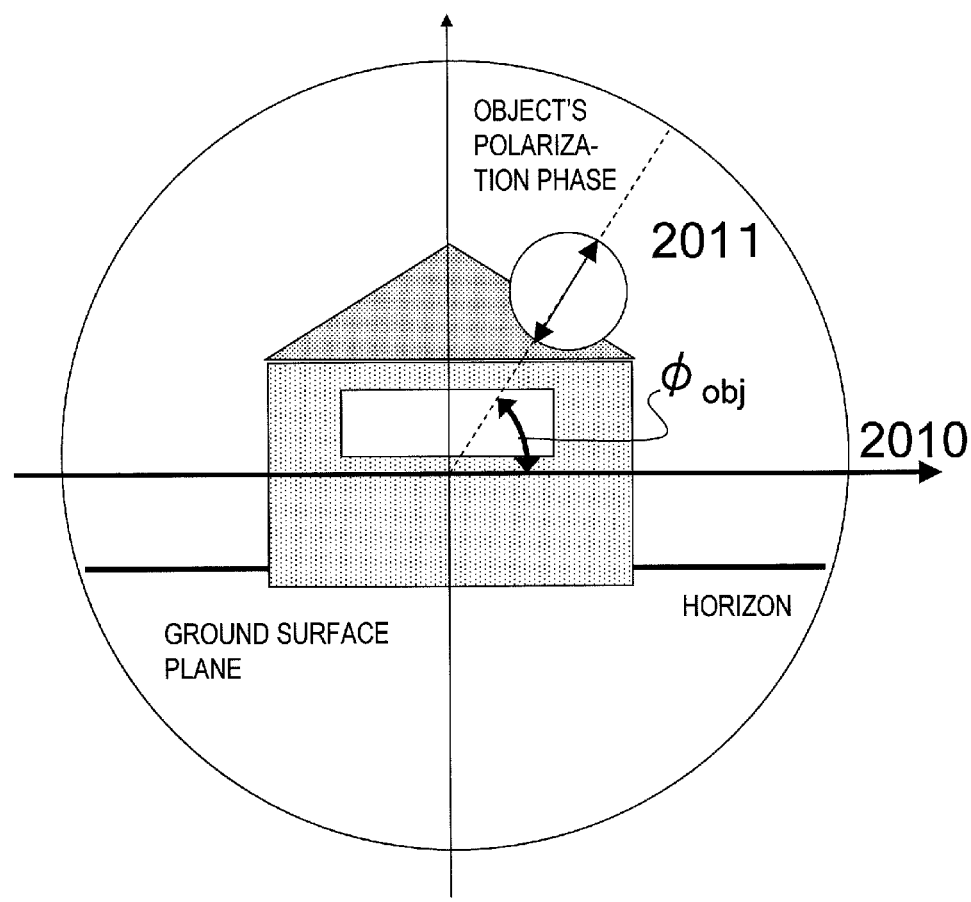

FIG. 20B illustrates an object image that has been shot through an object lens.

Figure 20C:
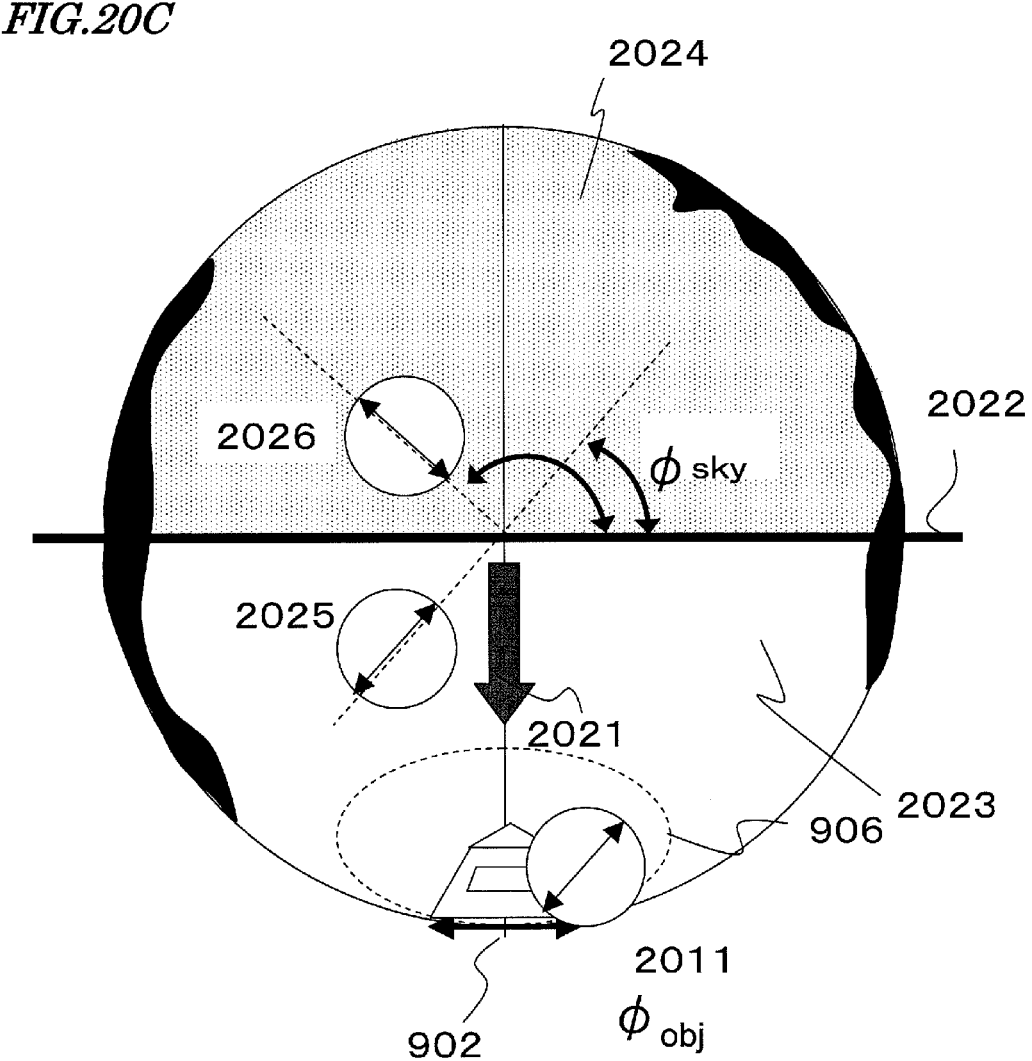

FIG. 20C is a sky image that has been captured through a wide-angle lens, which is used to shoot the sky.

Figure 21:
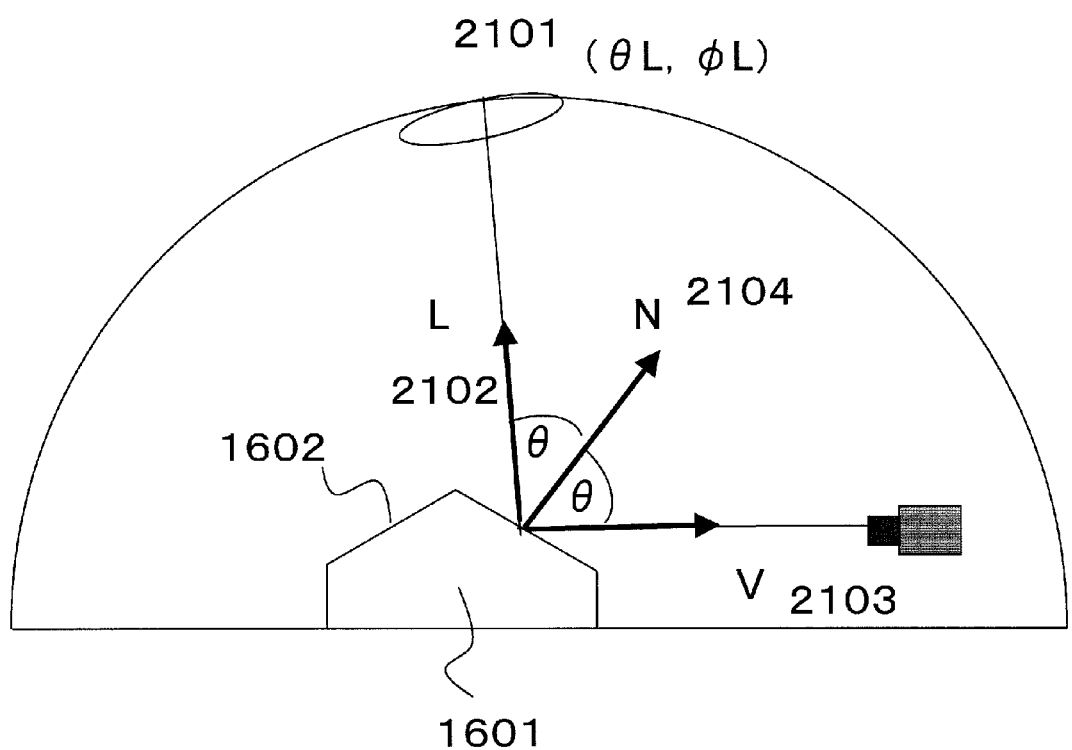

FIG. 21 illustrates how to perform the processing of calculating a normal by geometry.

Figure 22:
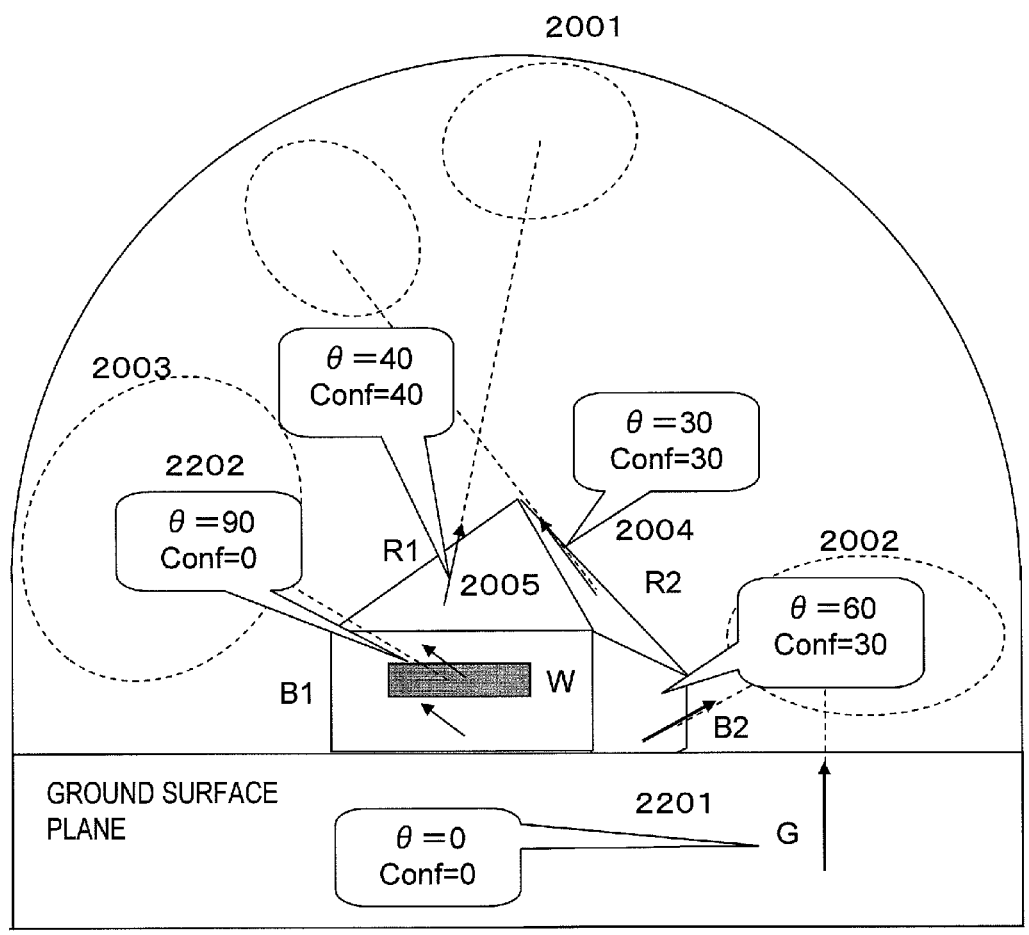

FIG. 22 illustrates how the degree of confidence is associated with the normal estimated by geometry.

Figure 23:
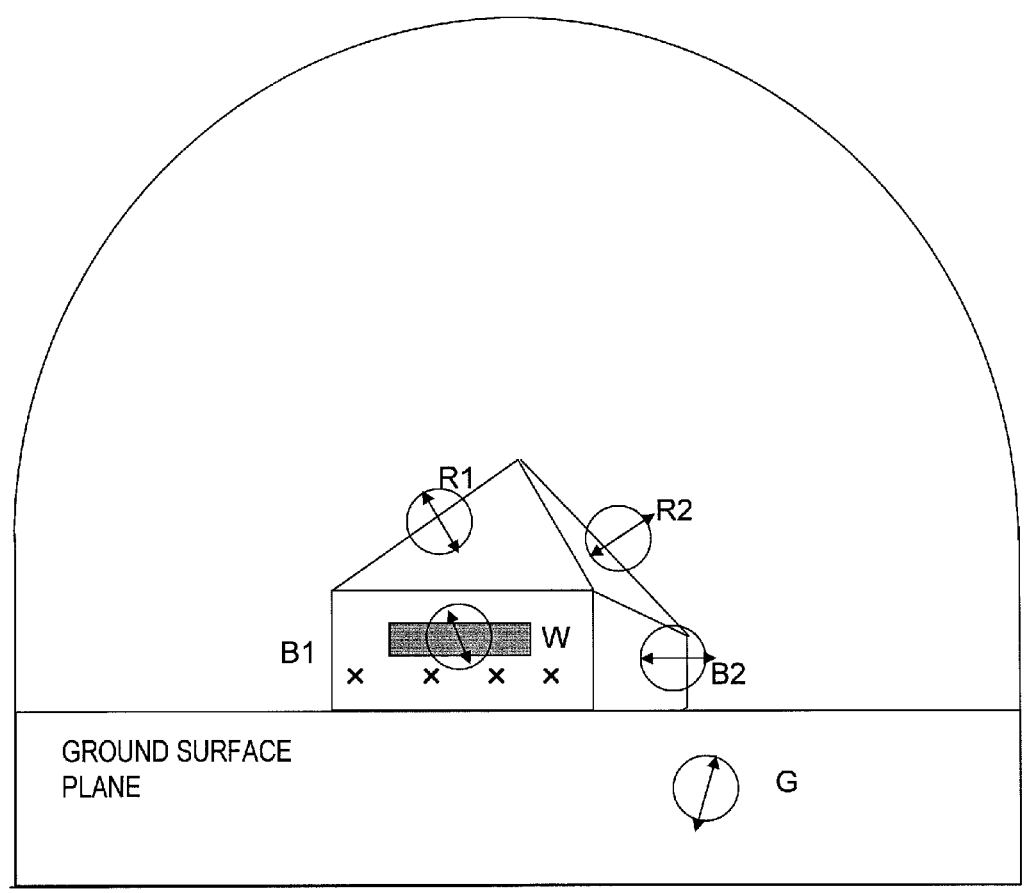

FIG. 23 shows a polarization angle in a situation where a normal is estimated based on specular reflected light.

Figure 24:
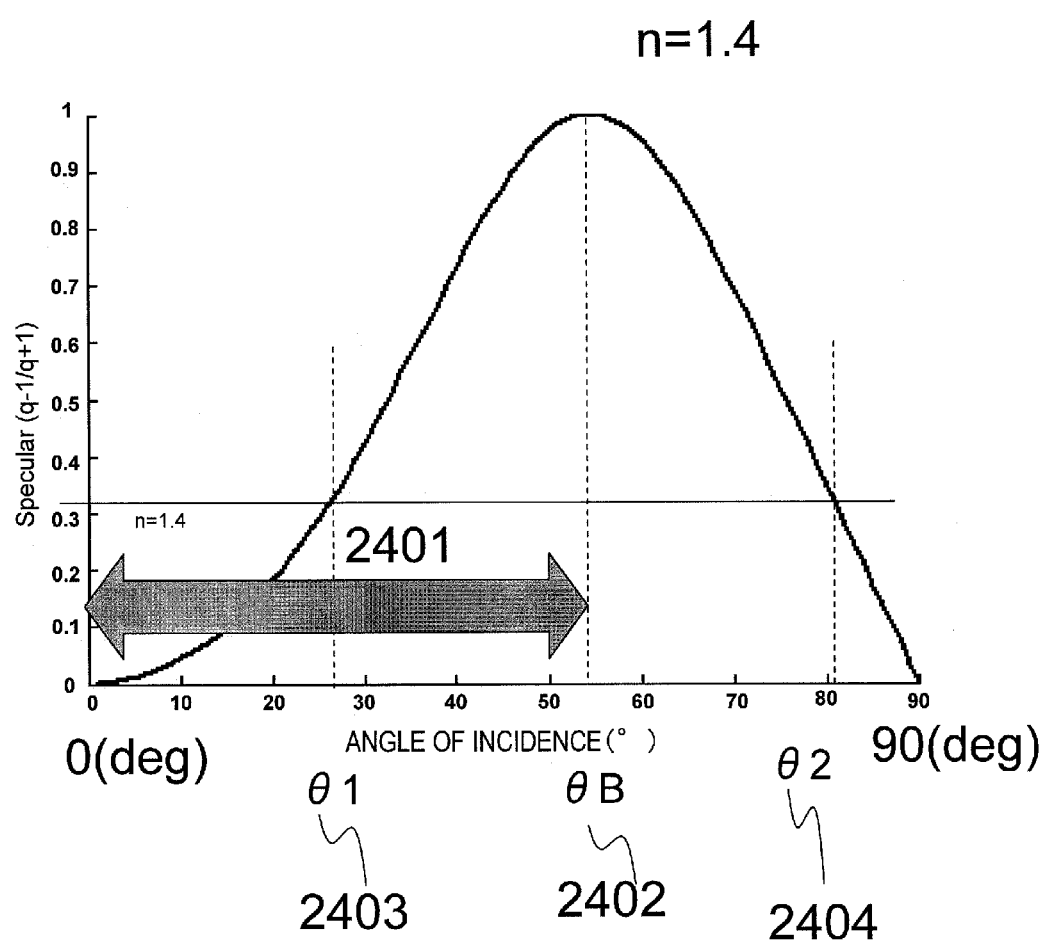

FIG. 24 is a graph showing a relation between the angle of incidence $\theta$ and the degree of polarization $\rho$.

Figure 25:
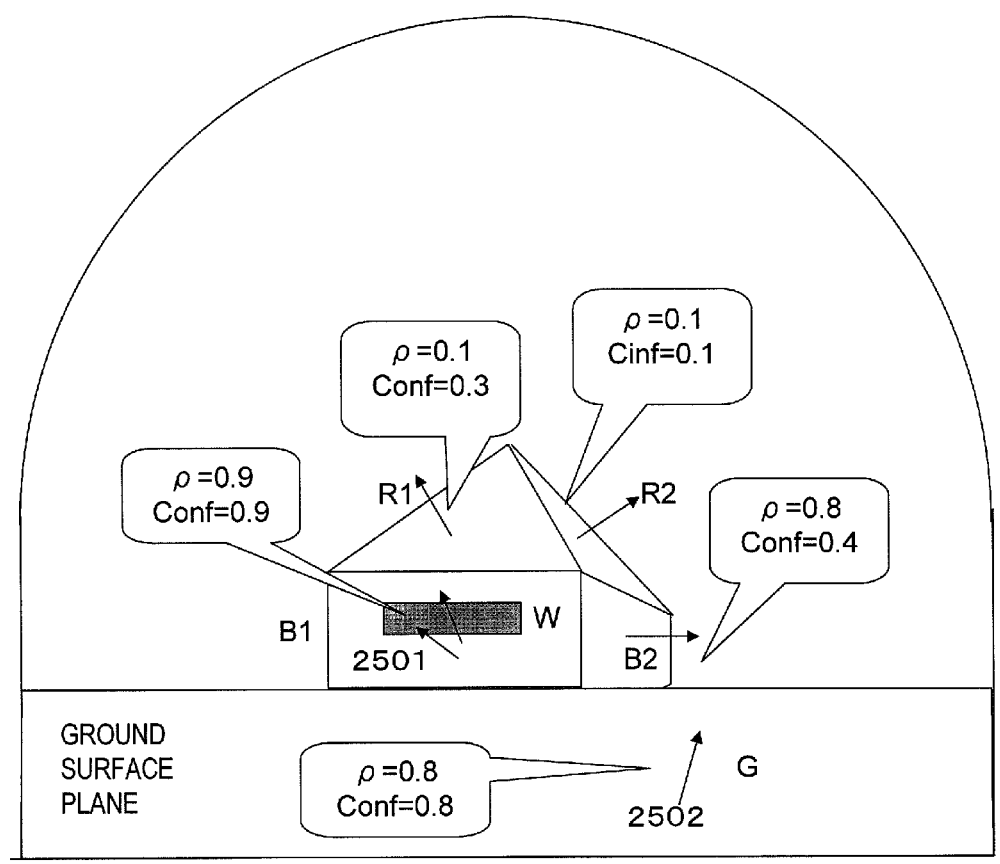

FIG. 25 shows how to estimate a normal based on specular reflected light and what its degree of confidence will be in that case.

Figure 26:
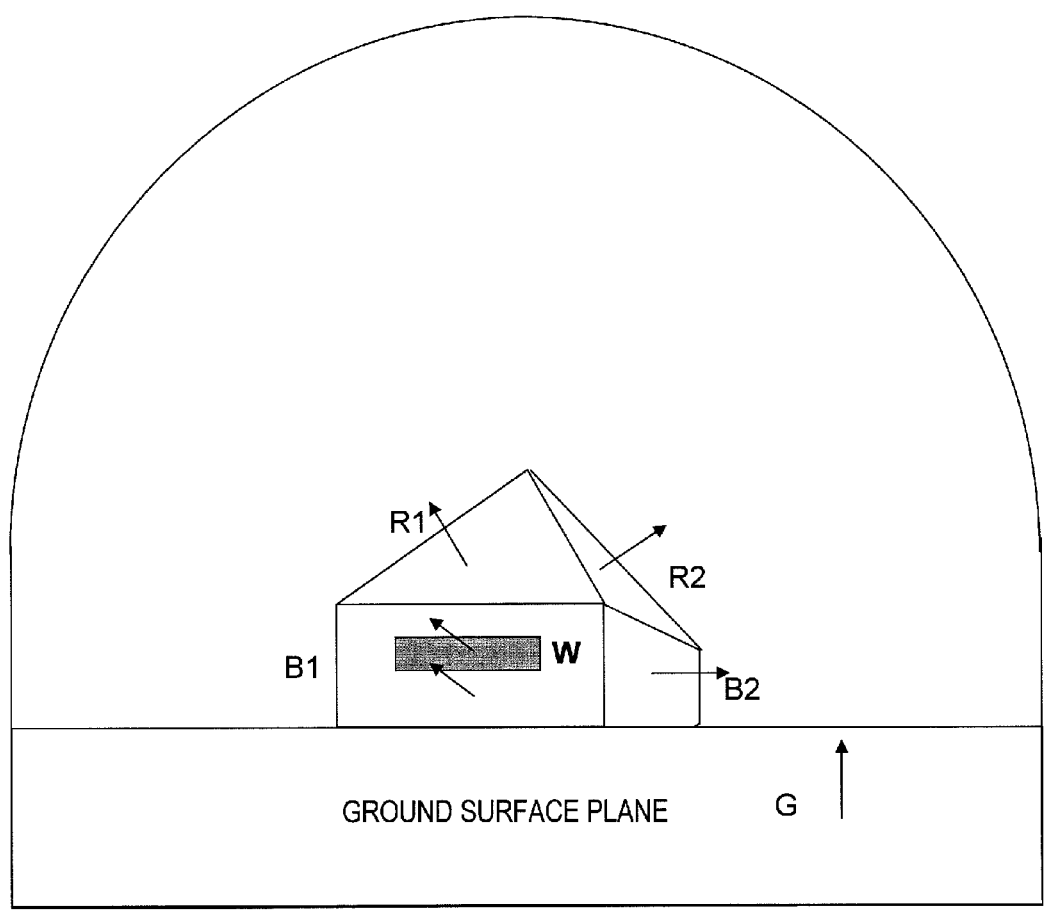

FIG. 26 shows estimated normals, of which the degrees of confidence have been evaluated.

Figure 27:
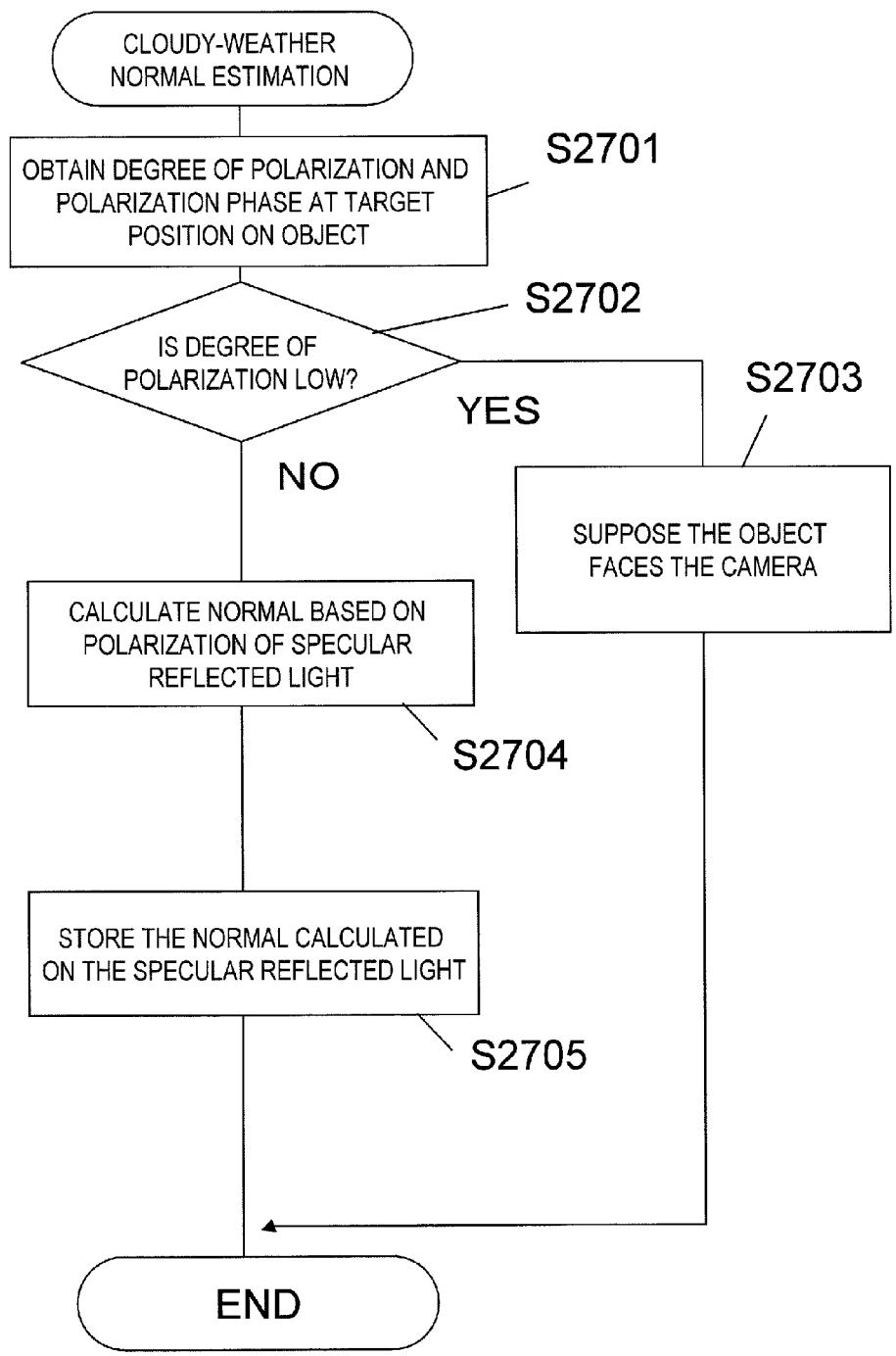

FIG. 27 is a flowchart showing how to estimate a normal when it is cloudy.

Figure 28:
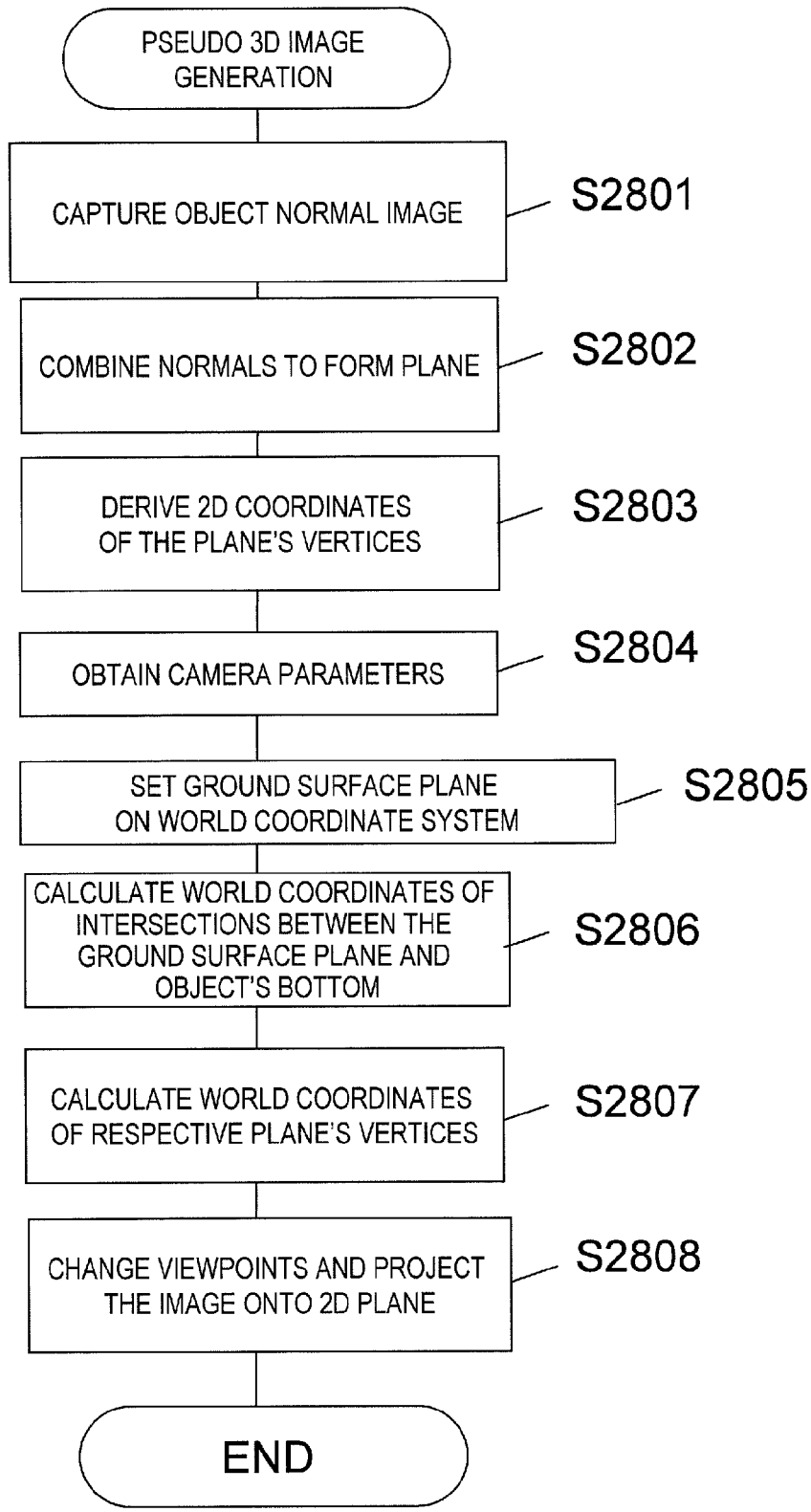

FIG. 28 is a flowchart showing the flow of the processing to get done by a pseudo 3D image generating section.

Figure 29:
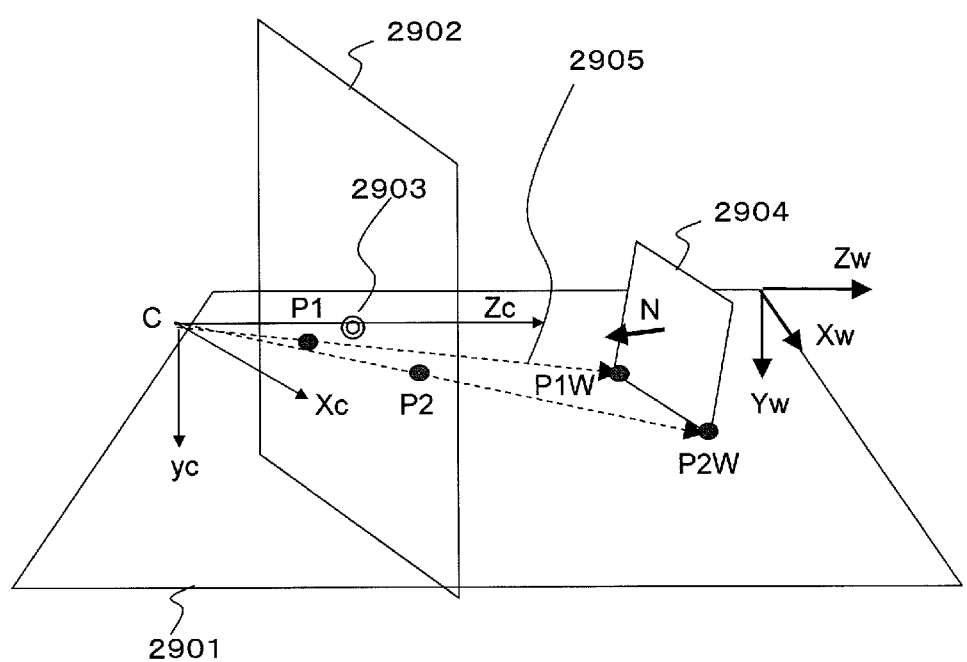

FIG. 29 shows the relation between the world coordinate system and the camera coordinate system.

FIG. 30 shows what effect will be produced by viewpoint changing to give a 3D appearance to a 2D image.

Figure 31:
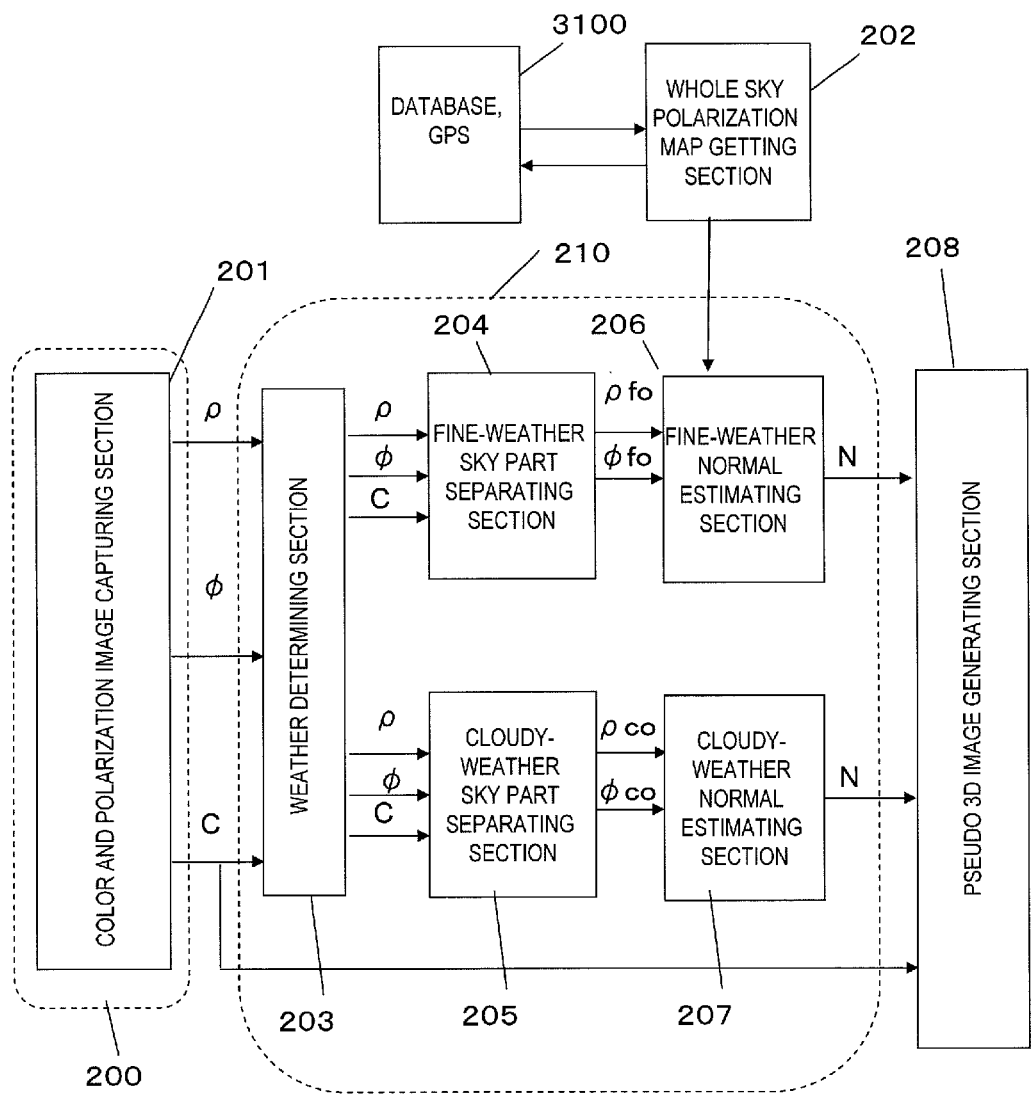

FIG. 31 is a block diagram showing an alternative preferred embodiment of an image processor according to the present invention.

Figure 32:
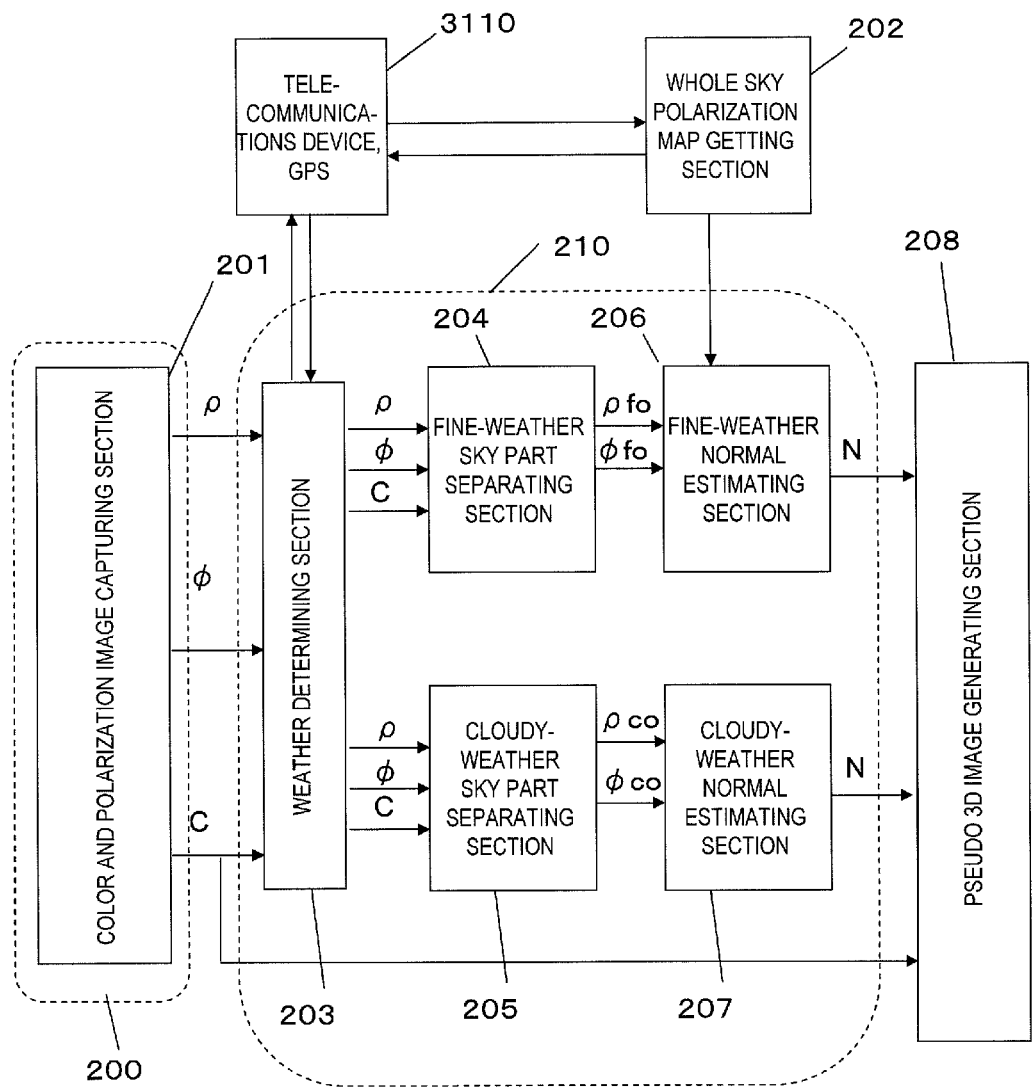

FIG. 32 is a block diagram showing another alternative preferred embodiment of an image processor according to the present invention.

Figure 33:
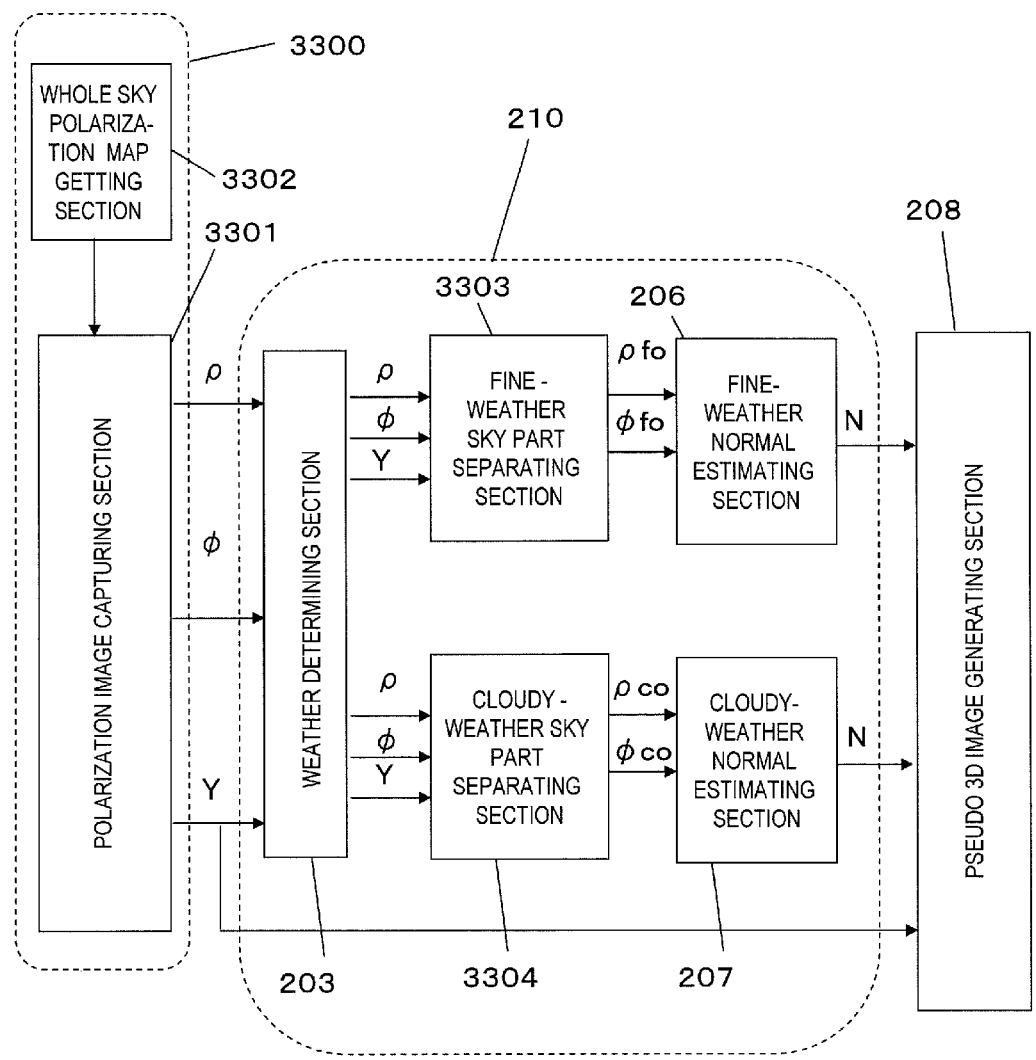

FIG. 33 is a block diagram showing an image processor as a second specific preferred embodiment of the present invention.

Figure 34:
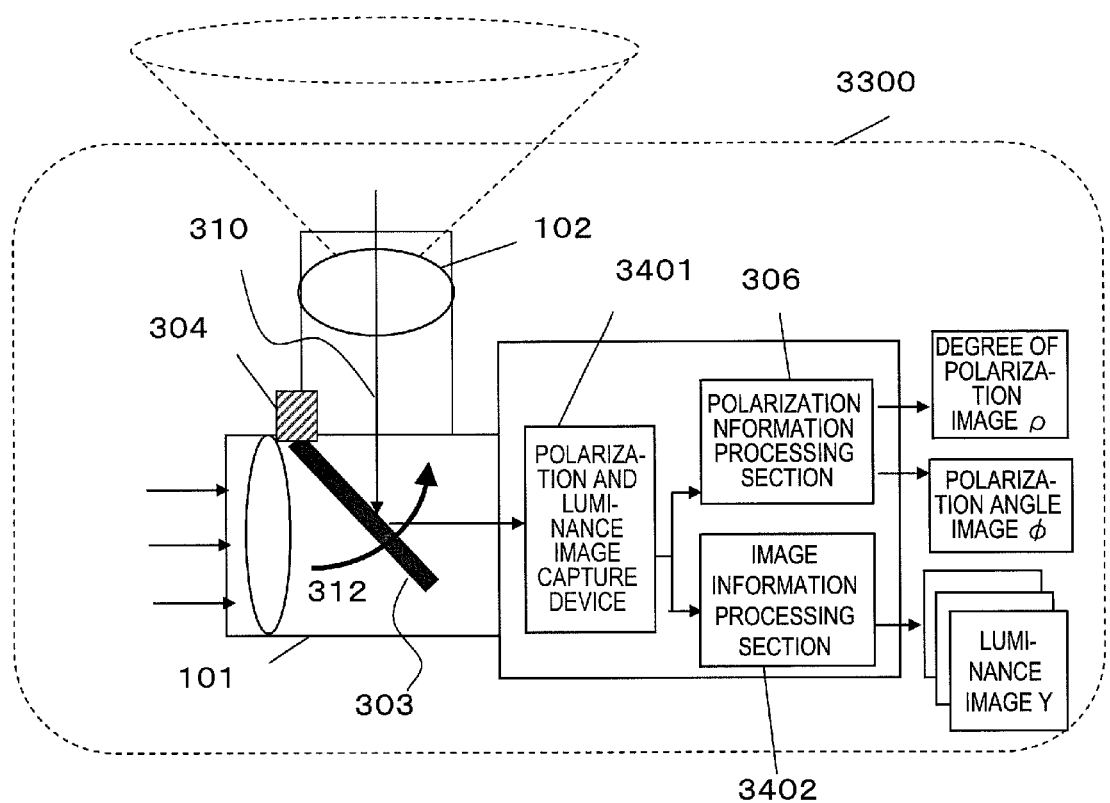

FIG. 34 is a block diagram showing a configuration for a monochrome polarization image capturing section according to the second preferred embodiment of the present invention.

Figure 35:
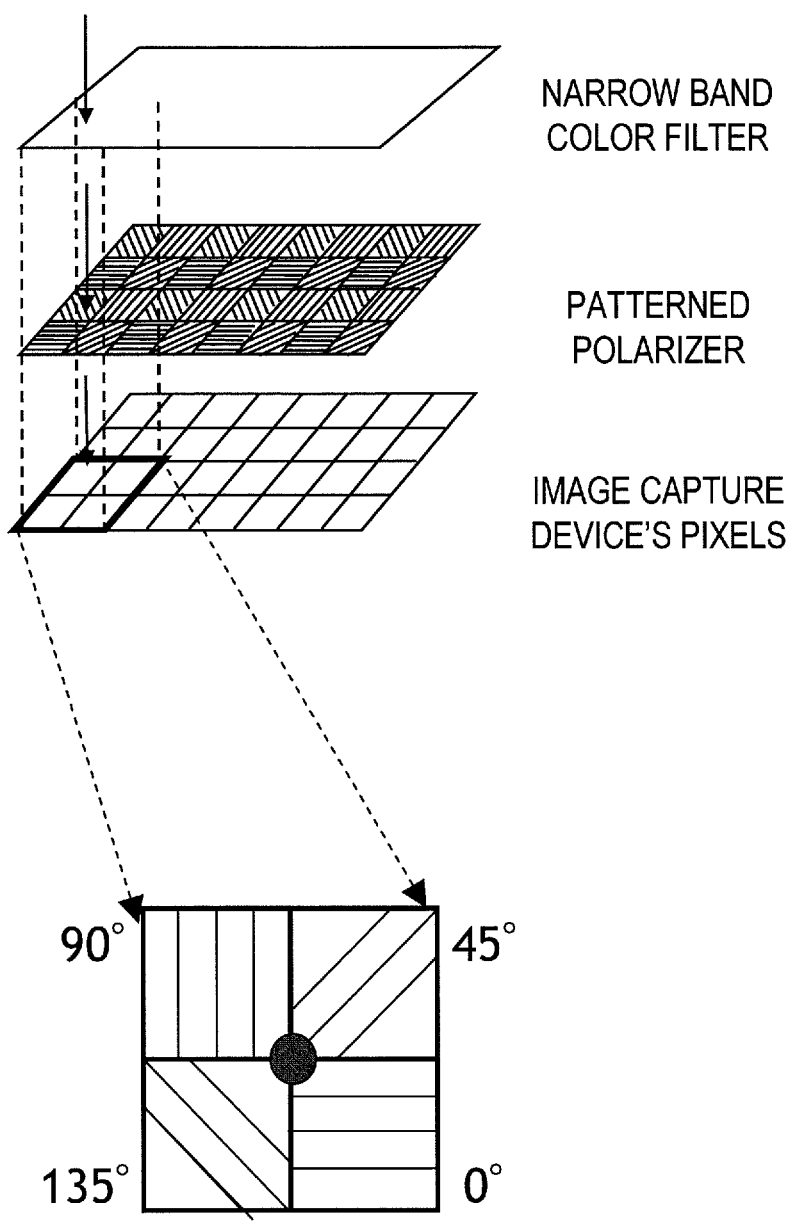

FIG. 35 is a block diagram showing a fine-weather sky part separating section according to the second preferred embodiment of the present invention.

Figure 36:
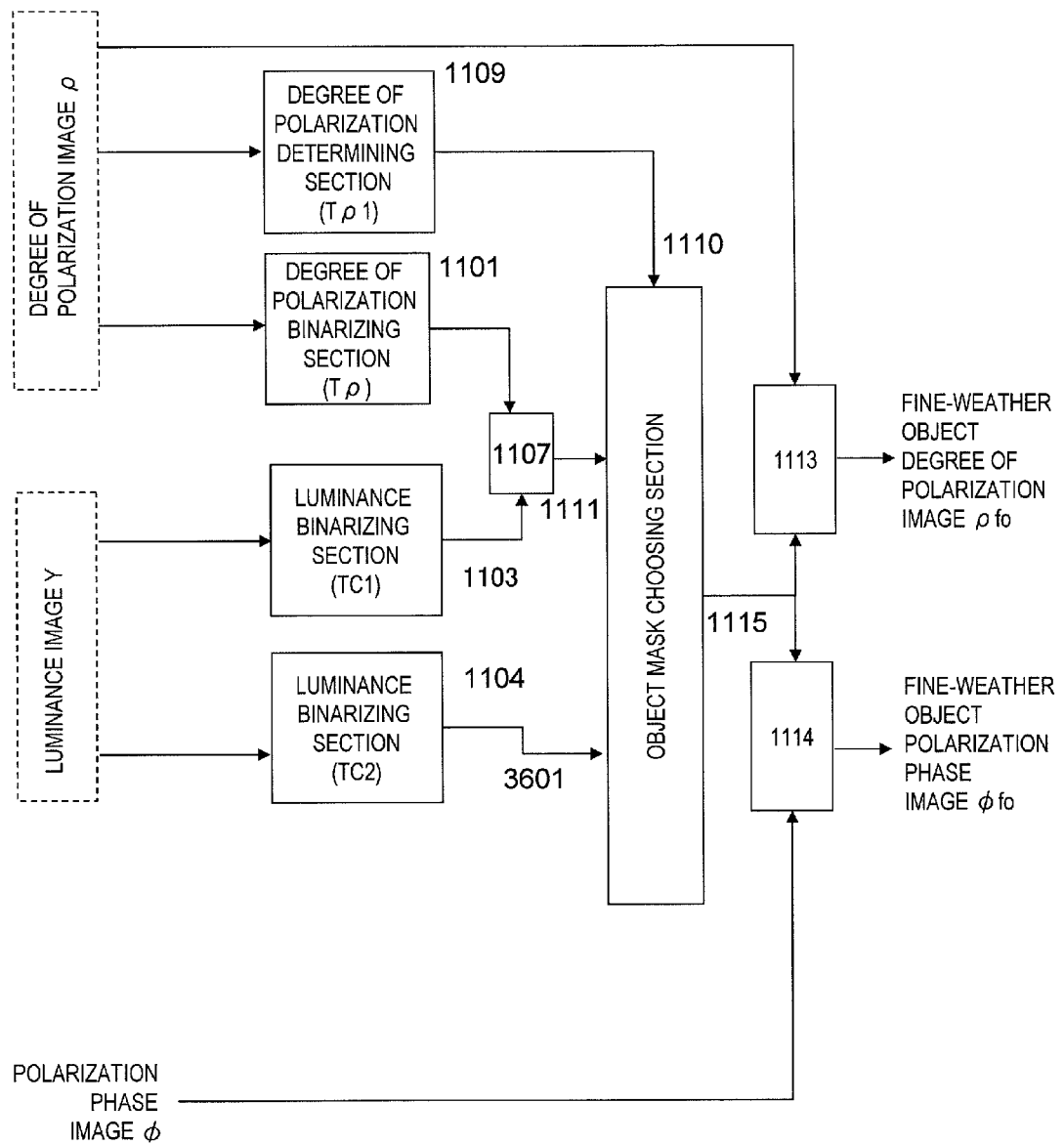

FIG. 36 is a block diagram showing a cloudy-weather sky part separating section according to the second preferred embodiment of the present invention.

Figure 37:
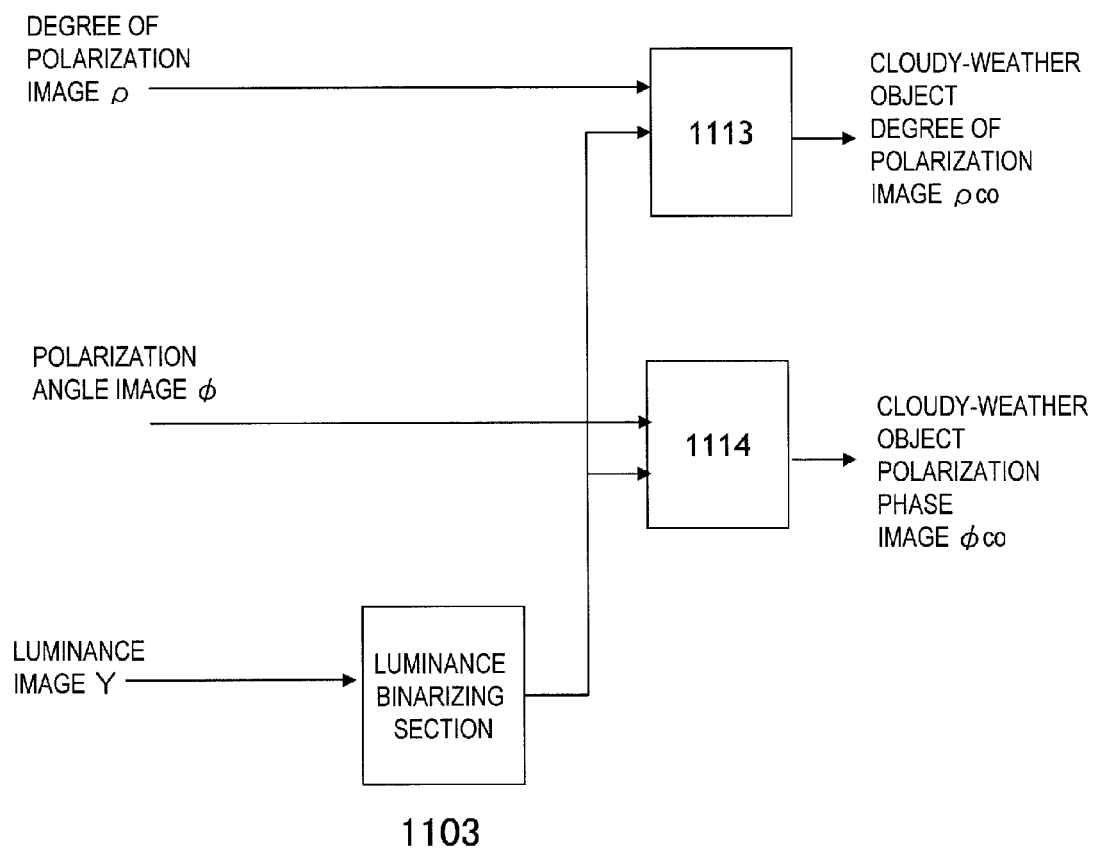

FIG. 37 is a block diagram showing a configuration for the cloudy-weather sky part separating section 3304.

DESCRIPTION OF EMBODIMENTS

It is known that in most cases, a polarization phenomenon is induced outdoors only by specular reflection. According to the present invention, by detecting the polarization state of specular reflected light that has been produced at the surface of an object that is located outdoors and illuminated with the sunlight coming from the sky, a normal to the surface of the object is estimated. However, as the polarization state of the sky varies depending on whether it is fine or cloudy, that processing is carried out separately in those two weathers in a preferred embodiment of the present invention.

Figure 1A:
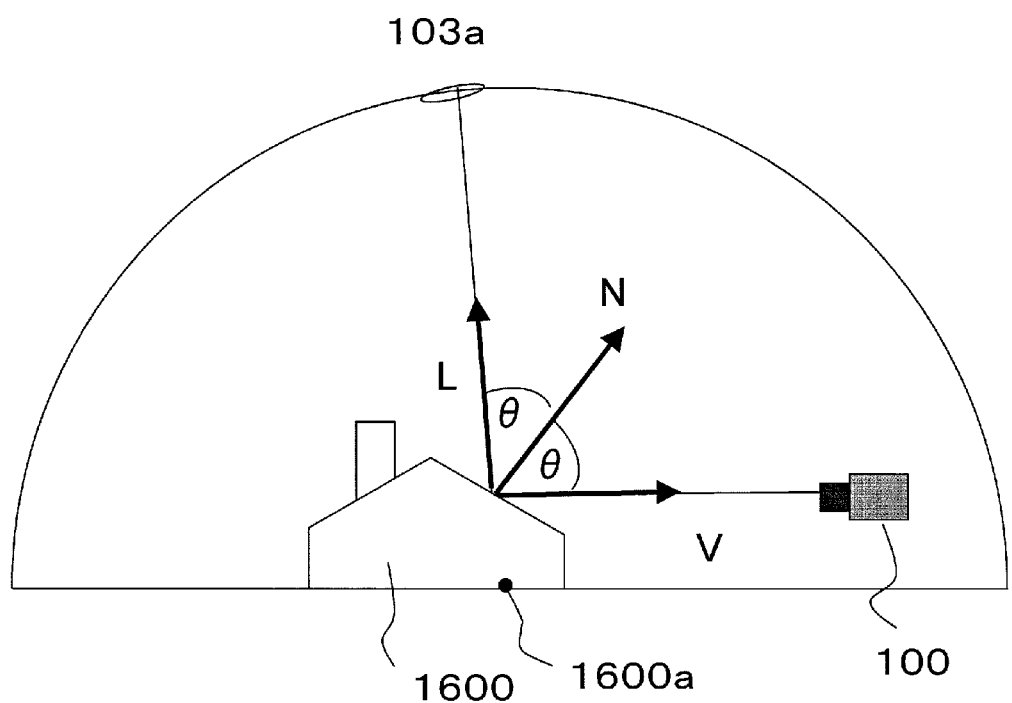
FIG. 1A illustrates how light may be specular reflected from an outdoor object.

FIG. 1A schematically illustrates how the light that has come from a certain position 103a on the sky and has been incident at a certain point 1600a on the surface of an outdoor object 1600 (which may be a house, for example) is specular-reflected and has its directions changed toward a camera 100 eventually. The normal N to that point of incidence 1600a on the surface of the object 1600 is a vector that is obtained by equally dividing a vector L that is directed from that point of incidence 1600a toward the position 103a on the sky and a viewing vector V of the camera 100 into two. For that reason, supposing the angle of incidence of the light is $\theta$, the angle of emittance thereof is also equal to $\theta$ as shown in FIG. 1A.

Figure 1B:
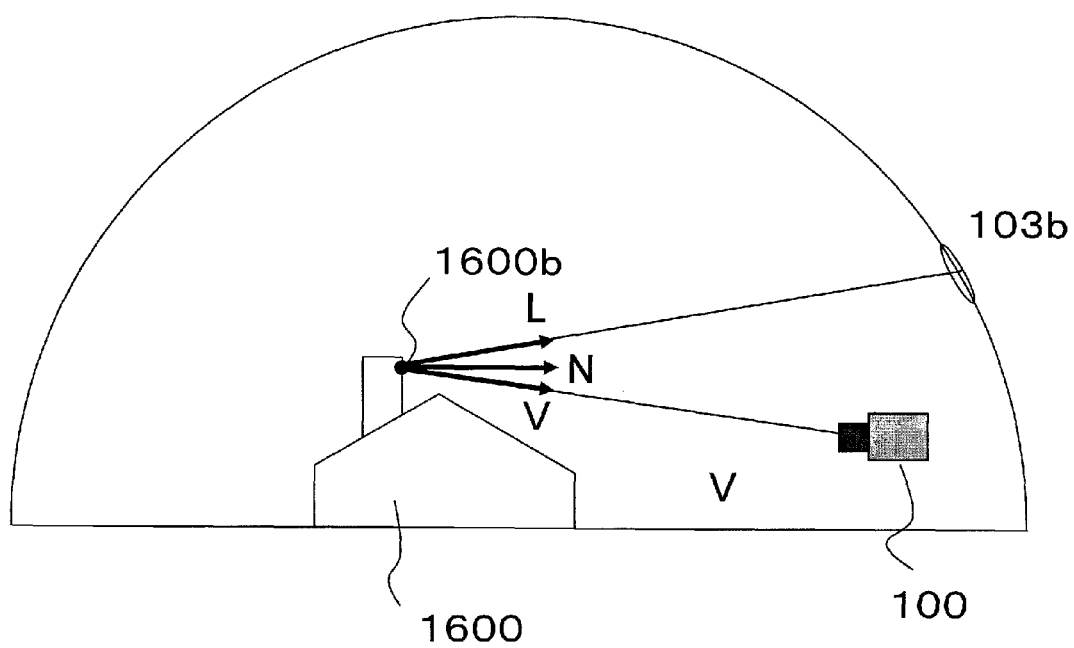
FIG. 1B illustrates how light may also be specular reflected from the outdoor object.

On the other hand, FIG. 1B schematically illustrates how the light that has come from another position 103b on the sky and has been incident at another point 1600b on the surface of the outdoor object 1600 is specular-reflected and has its directions changed toward the camera 100 eventually. In this manner, the normal N to the object's surface changes according to the point of incidence on its surface, so does the position (103a, 103b) on the sky from which the light that has eventually entered the camera came.

In the examples illustrated in FIGS. 1A and 1B, the normal N is supposed to point a direction that is parallel to the paper. However, since the normal N changes according to the surface shape of the object or the point of incidence on that surface, naturally the normal N may point a direction that is not parallel to the paper. For that reason, to define the normal N, not only the angle $\theta$ shown in FIG. 1A but also the angle of rotation $\theta と$ around the viewing vector V of the camera should be determined as well.

When it is fine, the sky is polarized, and therefore, the object's surface normal cannot be estimated by the method disclosed in Patent Document No. 2 (i.e., by using the polarization of specular reflected light produced at the surface of the object). Nevertheless, if the sky is so clear that the specular reflection produced at the object's surface is an ideal one, then the polarization state at a particular position on the sky would be observed as it is at some point on the object. In the example illustrated in FIG. 1B, the polarization state at the sky position 103b could be observed as it is at the point 1600b on the surface of the object 1600. In that case, by reference to the correspondence between the polarization information on a whole sky polarization map to be gotten separately and the polarization information contained in the polarization image, it can be determined exactly where on the sky the light that has entered the camera has come from. And once that position is known, the normal N to the object's surface can be determined geometrically as shown in FIGS. 1A and 1B.

Hereinafter, a "partially fine weather", in which the sky is almost completely clear but is partially overcast, will be described. In a preferred embodiment of the present invention, every partially fine weather of that kind is supposed to be a "fine" one. Although such a simple classification is adopted, it is determined, by the degree of confidence ensured, whether the normal estimated by specular reflected light when it is fine or the normal estimated by geometry when it is cloudy should be used.

On the other hand, if the weather is a completely cloudy one in which the whole sky is uniformly overcast, the sky can be regarded as a non-polarized light (i.e., a hemispherical light). That is why when it is completely cloudy, a normal to the object's surface can be estimated by the same method as what is proposed in Patent Document No. 2.

According to the present invention, by obtaining polarization information from an object that is located outdoors, a normal to the surface of the object on a 2D image can be estimated. And by using information about the normal that has been estimated in that way, 3D information (i.e., depth information) can be extracted from the 2D image and a pseudo 3D image can be generated, too.

It should be noted that the present invention could be carried out as not only an image processing method or a pseudo 3D image generating method but also an image generator including various means for performing the respective processing steps of such methods, a program that has been defined to get those processing steps executed by a computer, or a computer readable storage medium such as a CD-ROM on which that program is stored.

An image processor according to the present invention includes: a polarization image capturing section for obtaining a polarization image; and an object normal estimating section for estimating a normal to the surface of an object, which is located outdoors, by reference to polarization information contained in the polarization image.

As used herein, the "polarization image" refers to an image that contains polarization information of multiple pixels of a 2D image including the object. That is to say, the "polarization image" means an image to be obtained by having the respective pixels that form the image display their own pieces of polarization information. Also, the "polarization information" includes a degree of polarization and a polarization angle (or polarization phase angle). That is why unless stated otherwise, the "polarization image" refers collectively to a "degree-of-polarization image" representing the degrees of polarization of the respective pixels two-dimensionally and a "polarization angle image" representing the polarization phases of the respective pixels two-dimensionally. The degree of polarization and the magnitude (numerical value) of the polarization angle of each pixel can be represented by either the lightness or hue of that pixel. Thus, in the drawings accompanying this application, the degree of polarization and the magnitude of the polarization phase are represented by the magnitude of lightness.

Also, as used herein, the "image" does not always mean what is obtained by arranging pixels two-dimensionally so that the image is sensible to human eyes. That is to say, the arrangement of numerous pieces of numerical values such as light intensities, degrees of polarization or polarization angle of respective constituent pixels of an image (i.e., image data) will also be referred to herein as an "image" in some cases.

The image processor of the present invention includes an object normal estimating section for estimating a normal to the surface of an object, which is located outdoors, by reference to the polarization information obtained from such a polarization image.

Also, in a preferred embodiment, the image processor further includes a whole sky polarization map getting section for getting a whole sky polarization map indicating a relation between a position on the whole sky and polarization information at that position, and estimates the object's surface normal by reference to the whole sky polarization map.

The image processor of the present invention preferably further includes a weather determining section for determining the current weather to be either a cloudy one, in which the degree of polarization is lower than a reference level, or a fine one, in which the degree of polarization of the sky is equal to or higher than the reference level. And the image processor detects the polarization state of specular reflected light at the surface of an object, which is located outdoors, and estimates a normal to the surface of the object by any of multiple different methods that is selected according to the weather that has been determined by the weather determining section.

Hereinafter, specific preferred embodiments of the present invention will be described with reference to the accompanying drawings.

Embodiment 1

First of all, a First Specific Preferred Embodiment of an image processor according to the present invention will be described.

Figure 1C:
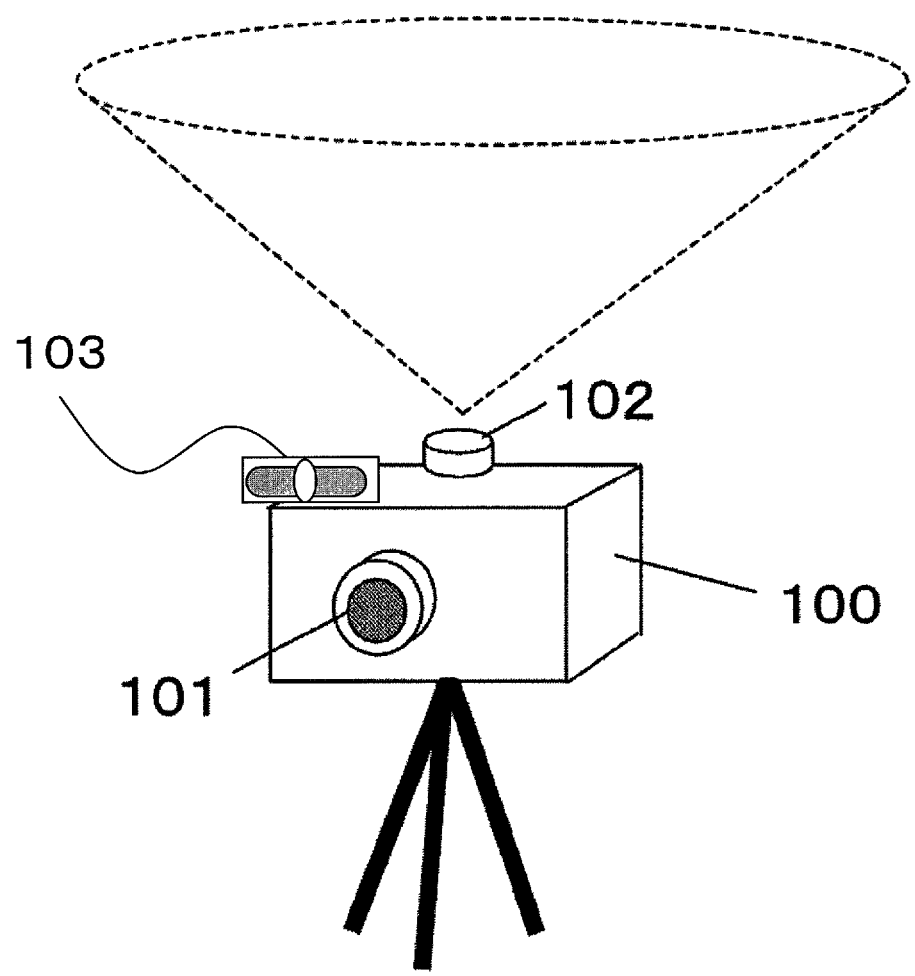
FIG. 1C illustrates the appearance of an image processor as a preferred embodiment of the present invention.

This preferred embodiment is an image processor in the form of a camera and has the appearance shown in FIG. 1C. As shown in FIG. 1C, the image processor (which will be referred to herein as a "camera 100") includes an object lens section 101 for shooting a polarization image and a color image of an object, a wide-angle lens section 102, which is arranged at the top of the camera to get polarization image information of the sky by shooting, and a horizontal situation indicator 103 such as a level. In this case, the object is supposed to be shot with the camera 100 disposed horizontally, the horizontal situation indicator 103 facing straight forward, and the wide-angle lens section 102 facing vertically upward.

Next, the configuration of this preferred embodiment will be described in further detail with reference to FIG. 2, which is a block diagram showing the arrangement of functional blocks in an image processor according to the present invention.

Figure 2:
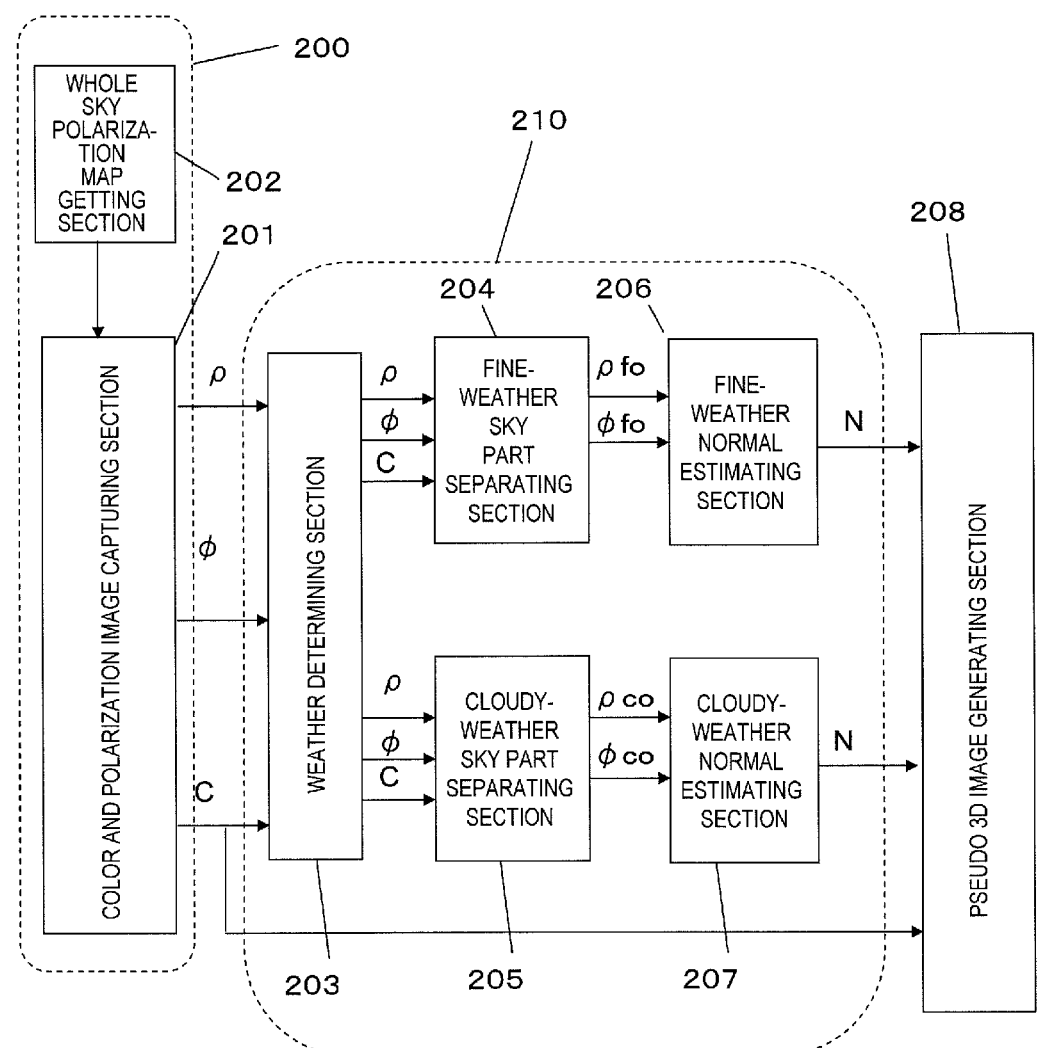
FIG. 2 is a block diagram of an image processor according to the present invention.

The image processor shown in FIG. 2 includes a polarization information obtaining section 200 consisting of a color and polarization image capturing section 201 and a whole sky polarization map getting section 202.

The color polarization image capturing section 201 obtains information about a degree-of-polarization image $\rho$, a polarization angle image $\phi$ and a color image C of the object through the lens section 101 shown in FIG. 1C. The whole sky polarization map getting section 202 is arranged at the top of the camera and gets polarization image information of the sky through the wide-angle lens section 102 shown in FIG. 1C. As used herein, the "whole sky polarization map" is a map providing polarization information of the sky at multiple positions (or points) on the whole sky.

The image processor of this preferred embodiment further includes a normal estimating section 210 and a pseudo 3D image generating section 208. The normal estimating section 210 includes a weather determining section 203, a fine-weather sky part separating section 204, a cloudy-weather sky part separating section 205, a fine-weather normal estimating section 206 and a cloudy-weather normal estimating section 207.

In this preferred embodiment, the polarization state of specular reflected light at the surface of an outdoor object is detected and the object's surface normal is estimated by any of multiple different methods that is selected according to the weather. The weather determining section 203 is a means for determining the weather (i.e., whether it is fine or cloudy while a scene is being shot) by the degree of polarization of the sky. Specifically, if the degree of polarization of the sky is lower than a reference level, the weather determining section determines the weather to be "cloudy". On the other hand, if the degree of polarization of the sky is equal to or higher than the reference level, the weather determining section determines the weather to be "fine".

In this preferred embodiment, the polarization state of specular reflected light at the surface of an outdoor object is detected and the object's surface normal is estimated by any of multiple different methods that is selected according to the weather. The weather determining section 203 is a means for determining the weather (i.e., whether it is fine or cloudy while a scene is being shot) by the degree of polarization of the sky. Specifically, in one example, if the degree of polarization of the sky is lower than a reference level, the weather determining section determines the weather to be "cloudy". On the other hand, if the degree of polarization of the sky is equal to or higher than the reference level, the weather determining section determines the weather to be "fine". In another example, if a sky part, of which the degree of polarization is lower than a reference level, accounts for at least a certain percentage of the whole sky, the weather determining section determines the weather to be "cloudy". Otherwise, the weather determining section determines the weather to be "fine". According to the present invention, if it is "cloudy", then it can be regarded as a completely cloudy-weather in which the whole sky is overcast. That is why if it is "fine", then the sky may be partially overcast.

The fine-weather sky part separating section 204 receives ρ, φ and C. And if it has been determined to be fine, the fine-weather sky part separating section 204 separates a sky part and an object part from the image, and outputs a fine-weather object degree of polarization image ρ fo and a fine-weather object polarization angle image φ fo, from which the sky part has been separated. On the other hand, if it has been determined to be cloudy, the cloudy-weather sky part separating section 205 separates a sky part and an object part from the image, and generates a cloudy-weather object degree of polarization image ρ co and a cloudy-weather object polarization angle image φ co, from which the sky part has also been separated in the same way.

When it is fine, the fine-weather normal estimating section 206 estimates a normal image N based on information about the degree of polarization image and the polarization phase image and by reference to the whole sky polarization map. On the other hand, when it is cloudy, the cloudy-weather normal estimating section 207 estimates a normal image N based on information about the degree of polarization image and the polarization angle image.

And the pseudo 3D image generating section 208 turns the color image C into a pseudo 3D image using the normal image N that has been obtained when it is fine or cloudy.

FIG. 3(A) is a block diagram illustrating the internal configuration of the polarization information obtaining section 200, i.e., the configurations of the color and polarization image capturing section 201 and the whole sky polarization map getting section 202. As shown in FIG. 3(A), the polarization information obtaining section 200 of this preferred embodiment includes the object lens section 101 for capturing the object's image, the wide-angle lens section 102, which is arranged at the top of the camera to face vertically upward, a movable reflector 303, a drive mechanism 304, a color and polarization image capture device (i.e., color and polarization image capturing section) 305, a polarization information processing section 306, and a color information processing section 307.

In the state shown in FIG. 3(A), the light 310 falling from the sky and passing through the wide-angle lens section 102 is reflected by the movable reflector 303 to enter the color and polarization image capture device 305. As a result, in performing a shooting operation, the color and polarization image capture device 305 can shoot the whole sky. A wide sky part can be shot with a fish-eye lens camera, for example, and the polarization state of the whole sky can be observed as a result.

The polarization information processing section 306 gets a whole sky polarization map, representing the polarization state of the sky, based on the output of the color and polarization image capture device 305. A detailed method for getting the whole sky polarization map is disclosed in Non-Patent Document No. 2, in which a fish-eye lens with an F value of 3.5 and a focal length of 8 mm is attached to a digital still camera facing up to the sky and a polarizer is arranged in front of the lens and in which sky polarization patterns are obtained over a 130 degree range of the whole sky by turning manually the polarization transmission axis of the polarizer from 0 degrees to 45 and then 90 degrees. The processing of this preferred embodiment is basically the same as that of Non-Patent Document No. 2 but uses a polarization image capture device without using any rotating polarizer, and therefore, can get the polarization map in real time. For that reason, no artifacts will be produced due to the movement of cloud, for example, during the rotation of the polarizer, which is beneficial.

Next, when the drive mechanism 304 turns the reflector 303 upward (i.e., to the directions indicated by the arrow 312), the light 311 falling from the object lens section 101 enters the color and polarization image capture device 305 as shown in FIG. 3(B). And when the object's image is captured in this manner, the polarization information processing section 306 and the color information processing section 307 operate. Optionally, the object and the whole sky may be shot in reverse order.

Hereinafter, it will be described, as its typical operation, how the color and polarization image capturing section 201 captures an object's image. The whole sky polarization map getting section 202 also operates similarly but performs only processing steps to get the polarization processing done.

When a shooting operation is performed outdoors, a scene image and a scene polarization image are preferably captured either at the same time or at a very short interval. As cloud may move due to the wind, it is preferred that the scene image and the scene polarization image be captured in real time. In capturing a polarization image outdoors, it is impractical to capture multiple images one after another by turning the polarizer. That is why a real time polarization camera is indispensable in such a situation.

A technique for simultaneously capturing a monochrome image and a polarization image in real time is disclosed in Patent Document No. 3. According to that technique, to capture a luminance image and an object's partial polarization image at the same time, a patterned polarizer with multiple different polarization main axes (i.e., polarization transmission axes) is arranged spatially in an image capture device. As the patterned polarizer, either a photonic crystal or a form-birefringent microretarder array is used. Even if such a technique is adopted, however, a color image and a polarization image cannot be obtained at the same time, either.

On the other hand, the configuration shown in FIG. 3(A) can simultaneously obtain both a color image and a polarization image in real time from the object and outputs two different kinds of polarization images (i.e., a degree of polarization image ρ and a polarization angle image φ).

The incoming light is incident on the color and polarization image capture device 305. From this incident light, the color and polarization image capture device 305 can obtain both color moving picture information and polarization image information in real time. The color and polarization image capture device 305 outputs signals representing the color moving picture information and the polarization image information to the polarization information processing section 306 and the color information processing section 307, respectively, which subject those signals to various types of processing and output the color image C, the degree of polarization image ρ and the polarization angle image φ.

Portion (A) of FIG. 4 is a schematic representation illustrating a basic arrangement for the color and polarization imager 305. In the example illustrated in portion (A) of FIG. 4, a color filter and a patterned polarizer are stacked one upon the other in front of image capture device's pixels. The incident light is transmitted through the color filter and the patterned polarizer to reach the image capture device and have its intensity monitored by the image capture device's pixels. Thus, according to this preferred embodiment, color image information and polarization image information can be obtained at the same time using a color mosaic type, single-panel color image capture device.

Portion (B) of FIG. 4 illustrates a portion of the image sensing plane of the color and polarization imager 305 as viewed from right over the plane in the optical axis direction. In portion (B) of FIG. 4, only 16 pixels (i.e., 4×4) on the image sensing plane are illustrated for the sake of simplicity. Each of the four rectangular areas 401 through 404 illustrates an associated portion of a Bayer type color mosaic filter that is arranged over four pixel cells. Specifically, the rectangular area 404 is a B (blue) filter area and covers pixel cells B1 through B4, which B patterned polarizers with mutually different polarization principal axes make close contact with. As used herein, the "polarization principal axis" is an axis that is defined parallel to the polarization plane (i.e., polarization transmission plane) of the light to be transmitted through a polarizer. In this preferred embodiment, a number of polarizer units, of which the polarization transmission planes define mutually different angles (i.e., fine polarizer plates), are arranged adjacent to each other within each set of pixels of the same color. More specifically, four types of polarizer units, of which the polarization transmission planes are defined in mutually different directions, are arranged within each set of pixels of the same color that is R (red), G (green) or B (blue). In this case, one polarizer unit corresponds to one fine polarization pixel. In portion (B) of FIG. 4, the respective polarization pixels are identified by G1 and other reference signs.

Portion (C) of FIG. 4 shows the polarization principal axes that are assigned to the four fine polarization pixels, which the B (blue) patterned polarizers make close contact with. In portion (B) of FIG. 4, the lines drawn in each of these fine polarization pixels schematically indicate the polarization principal axis direction of its associated fine polarizing plate. Specifically, in the example illustrated in portion (C) of FIG. 4, the four fine polarization pixels have their polarization principal axes defined by angles ψi of 0, 45, 90 and 135 degrees, respectively.

Four G (green) patterned polarizers make close contact with the pixels in the rectangular area 402 and four more G patterned polarizers make close contact with the pixels in the rectangular area 403. On the other hand, four R (red) patterned polarizers make close contact with the pixels in the rectangular area 401. In FIG. 4, the location identified by the reference numeral 405 indicates a virtual pixel location representing its associated four pixels collectively in this image capturing system. The patterned polarizer in each of the other rectangular areas 401 through 403 has also been divided into four portions with four different polarization principal axes just as shown in portion (C) of FIG. 4.

As described above, this preferred embodiment is characterized in that each color pixel includes a number of fine polarization pixels with mutually different polarization principal axes. Thus, the color mosaic arrangement itself may be determined arbitrarily. In the following description, those fine polarization pixels will be simply referred to herein as "polarization pixels".

FIGS. 5(A) through 5(C) are graphs schematically showing the wavelength characteristics of the B (blue), G (green), and R (red) polarization pixels, respectively. In these graphs, the ordinate represents the intensity of the transmitted light and the abscissa represents the wavelength. Each of these B, G and R polarization pixels has such a polarization property that transmits a transverse magnetic (TM) wave in the B, G or R wavelength range and reflects (i.e., not transmits) a transverse electric (TE) wave in that wavelength range. The TM wave is a wave in which magnetic field components are transverse to the incident plane, while the TE wave is a wave in which electric field components are transverse to the incident plane.

In FIG. 5(A), shown are the polarization properties 502 and 503 of the B (blue) polarization pixel and the transmission property 501 of a B (blue) color filter. The polarization properties 502 and 503 represent the transmittances of the TM and TE waves, respectively.

In FIG. 5(B), shown are the polarization properties 505 and 506 of the G polarization pixel and the transmission property 504 of a G color filter. The polarization properties 505 and 506 represent the transmittances of the TM and TE waves, respectively.

In FIG. 5(C), shown are the polarization properties 508 and 509 of the R polarization pixel and the transmission property 507 of an R color filter. The polarization properties 508 and 509 represent the transmittances of the TM and TE waves, respectively.

The properties shown in FIGS. 5(A) through 5(C) can be realized by using the photonic crystal disclosed in Patent Document No. 3, for example. When the photonic crystal is used, light, of which the electric field vector oscillating plane is parallel to the groove that has been cut on its surface, becomes a TE wave, and light, of which the electric field vector oscillating plane is perpendicular to the groove on its surface, becomes a TM wave.

What counts in this preferred embodiment is to use a patterned polarizer that exhibits polarization separation property in each of the B, G and R transmission wavelength ranges as shown in FIGS. 5(A) through 5(C).

If the intensity of a monochrome image should be adjusted with polarization filters, there is no need to optimize the wavelength range in which the polarization separation is achieved. On the other hand, to obtain polarization information on a color pixel basis, the color separation property and the polarization separation property should be matched to each other.

In this description, the property of a polarization pixel will be represented by a combination (such as "R1" or "G1") of one of the four numerals "1", "2", "3" and "4" representing the polarization principal axis direction of the polarization pixel and one of the three color codes "R", "G" and "B" representing the color of that polarization pixel. For example, the polarization pixels R1 and G1 have the same numeral, and therefore, their polarization principal axis directions are the same. However, since their RGB codes are different from each other, these are polarization pixels, of which the wavelength ranges of the light to be transmitted are different from each other. In this preferred embodiment, the arrangement of such polarization pixels is realized by the combination of the color filter and the patterned polarizer shown in portion (A) of FIG. 4.

Next, it will be described with reference to FIG. 6 how the polarization information processing section 306 shown in FIG. 3 carries out its processing. FIG. 6 shows the intensities 601 through 604 of light rays that have been transmitted through four types of polarizers, of which the polarization principal axes (with Ψi=0, 45, 90 and 135 degrees, respectively) are defined in four different directions. In this example, if the angle of rotation Ψ of the polarization principal axis is Ψ$_i$, then the intensity measured will be identified by I$_i$, where i is an integer that falls within the range of 1 to N and N is the number of samples. In the example shown in FIG. 6, N=4, and therefore, i=1, 2, 3 or 4. In FIG. 6, the intensities 601 through 604 associated with the four pixel samples Ψ$_i$, Ii) are shown.

The relation between the angle Ψi of the polarization principal axis and the intensities 601 through 604 is represented by a sinusoidal curve. In FIG. 6, all of the four points representing the intensities 601 through 604 are illustrated as being located on a single sinusoidal curve. However, if a sinusoidal curve is plotted based on a greater number of intensities measured, some of those intensities measured may be slightly off the sinusoidal curve in some cases.

As used herein, the "polarization information" means information about the degree of modulation of the amplitude and the phase information of such a sinusoidal curve, representing the degree of dependence of the intensity on the angle of the polarization principal axis.

In actual processing, using the four pixel intensity values in each of the areas 401 to 404 in the same color shown in portion (A) of FIG. 4 as samples, the reflected light intensity I with respect to the principal axis angle Ψ of the patterned polarizer is approximated by the following Equation (1):

$$I(\psi) = A \cdot \sin 2(\psi - B) + C \quad (1)$$

where A, B and C are constants as shown in FIG. 6 and respectively represent the amplitude, phase-angle and average of the curve showing a variation in polarized light intensity. Equation (1) can be expanded as in the following Equation (2):

$$I(\psi) = a \cdot \sin 2\psi + b \cdot \cos 2\psi + C \quad (2)$$

where A and B are given by the following Equations (3) and (4), respectively:

$$A = \sqrt{a^2 + b^2}, \quad \sin(-2B) = \frac{b}{\sqrt{a^2 + b^2}}, \quad \cos(-2B) = \frac{a}{\sqrt{a^2 + b^2}} \quad (3)$$

$$B = -\frac{1}{2}\tan^{-1}\left(\frac{b}{a}\right) \quad (4)$$

The relation between the intensity I and the polarization principal axis angle Ψ can be approximated by the sinusoidal function represented by Equation (1) if A, B and C that will minimize the following Equation (5) can be obtained:

$$f(a, b, C) = \sum_{i=1}^{N} (I_i - a \cdot \sin 2\psi_i - b \cdot \cos 2\psi_i - C)^2 \quad (5)$$

By performing these processing steps, the three parameters A, B and C can be approximated by the sinusoidal function with respect to a single color. In this manner, a degree-of-polarization image representing the degree of polarization ρ and a polarization angle image representing the polarization angle φ are obtained. The degree of polarization ρ represents how much the light on a given pixel has been polarized. The polarization angle φ represents a direction perpendicular to the principal axis of partial polarization of the light on a given pixel, i.e., a phase-angle in which the sinusoidal function intensity of the polarization becomes minimum. According to Fresnel's reflection theory, this is a plane in which a normal to the surface of an object is included in specular reflection (i.e., plane of incidence). It should be noted that the polarization principal axis angles of 0 and 180 degrees (π) are equal to each other. The values ρ and φ (where 0≤φ≤π) are calculated by the following Equations (6) and (7), respectively:

$$\rho = \frac{I_{max} - I_{min}}{I_{max} + I_{min}} = \frac{A}{C} = \frac{A}{\bar{I}} \quad (6)$$

$$\phi = \frac{3\pi}{4} + B \quad (7)$$

In this preferred embodiment, the patterned polarizer may be a photonic crystal, a film type polarizer, a wire grid type polarizer or a polarizer operating on any other principle.

Hereinafter, it will be described how the color information processing section 307 shown in FIG. 3 carries out its processing. The color information processing section 307 calculates a color intensity based on the information that has been provided by the color and polarization imager 305. The intensity of light that has been transmitted through a polarizer is different from the original intensity of the light yet to be incident on the polarizer. Theoretically speaking, under a non-polarized illumination, the average of the intensities measured along all polarization principal axes of polarized light corresponds to the original intensity of the light yet to be incident on the polarizer. Supposing the measured intensity of a polarization pixel R1 is identified by IR1, the color intensity can be calculated by the following Equation (8):

$$\bar{I}_R = (I_{R1} + I_{R2} + I_{R3} + I_{R4})/4$$

$$\bar{I}_G = (I_{G1} + I_{G2} + I_{G3} + I_{G4})/4$$

$$\bar{I}_B = (I_{B1} + I_{B2} + I_{B3} + I_{B4})/4 \quad (8)$$

By obtaining the intensities of respective polarization pixels, a normal color mosaic image can be generated. And by converting the mosaic image into a color image, of which the respective pixels have RGB pixel values, a color image C can be generated. Such a conversion can be done by a known interpolation technique such as a Bayer mosaic interpolation technique.

In each of the color image C, the degree-of-polarization image ρ and the polarization angle image φ, the intensity and polarization information of each pixel can be obtained by using the four polarization pixels shown in portion (B) of FIG. 4. That is why each piece of light intensity and polarization information can be regarded as representing a value at the virtual pixel point 405 that is located at the center of four polarization pixels shown in portion (B) of FIG. 4. Consequently, the resolution of a color image and that of a polarized image both decrease to one fourth (i.e., a half (vertically) by a half (horizontally)) of the original one of the single-panel color image capture device. For that reason, the number of image capture device's pixels is preferably as large as possible.

FIGS. 7(A) through 7(C) illustrate three different kinds of images (i.e., a degree of polarization image ρ, a polarization angle image φ and a color image C) captured by the color and polarization image capturing section 201 when a scene with a building at a distance is shot. Specifically, the degree of polarization image ρ shown in FIG. 7(A) shows the intensity of polarization. In this case, the whiter (i.e., the higher the lightness), the higher the degree of polarization. On the other hand, the polarization angle image φ shown in FIG. 7(B) represents the directions of polarization angle by angles. Specifically, the polarization angles are represented by allocating values of 0 through 180 degrees to the intensities. It should be noted that as one cycle of a polarization angle completes in 180 degrees, white and black parts of the polarization image respectively have phase angles of 0 and 180 degrees, which are actually continuous with each other. And the color image C shown in FIG. 7(C) is an ordinary RGB color intensity image. Actually, three intensity images are obtained for R, G and B, respectively, and synthesized together to make a single color image. In FIG. 7(c), only the intensities of the color image are represented as a monochrome image for convenience sake.

All of the images shown in FIGS. 7(A) to 7(C) have a round periphery because the aperture defining the angle of view is circular. As can be seen from these drawings, every scene is supposed to be shot with the horizon shot horizontally within the frame in the processing to be described in the rest of the description.

FIGS. 8(A) through 8(C) are schematic representations illustrating a similar scene. In the degree of polarization image ρ shown in FIG. 8(A), it is shown that the white roof part 801 has the highest degree of polarization. On the other hand, in the polarization angle image φ shown in FIG. 8(B), the polarization angles are represented by polarization phase vectors 803. And the color image C shown in FIG. 8(C) represents a color intensity value.

FIGS. 9(A) and 9(B) schematically illustrate two kinds of images (i.e., a degree of polarization map and a polarization angle map) to be gotten by the whole sky polarization map getting section 202 during shooting. Specifically, the whole sky degree of polarization map shown in FIG. 9(A) is a whole sky image representing the degree of polarization of the whole sky. In FIG. 9(A), the center 901 represents the zenith, the circumference 902 represents the horizon, the surrounding continuous object 903 represents the object to be shot, and the dashed circle 905 represents a sky part with a low degree of polarization around the sun 904. And the dotted area 906 indicates a shooting range in which the object is going to be shot.

On the other hand, in the polarization angle image shown in FIG. 9(B), the group of curves 905 to 912 each have a polarization angle vector representation 803 for its associated pixel. This whole sky polarization phase image has the same positioning as the one shown in FIG. 9(A). The angles of the polarization angle vectors are defined unequivocally to be angles with respect to the local horizon 902 falling within the shooting range 906. That is why the polarization angles can be compared to each other between the polarization angle vector representations shown in FIGS. 8(B) and 9(B). This is a key property when the polarization angle needs to be searched for afterward.

In the degree of polarization image shown in FIG. 9(A), the range indicated by the dashed circle 905 (i.e., the sun 904 and its surrounding range) has a low degree of polarization and the vicinity of the horizon has a high degree of polarization. That is to say, not the whole sky has a uniform degree of polarization, which is a typical situation in a fine daytime. The degree of polarization of the sky varies according to the altitude of the sun but still always has a non-uniform pattern. That is to say, when it is fine, the sky light functions as a light source in which a non-polarization area and various polarization areas are distributed over the whole sky. That is why with the whole sky polarization maps shown in FIGS. 9(A) and 9(B), if a position on the whole sky is specified, the degree of polarization and the polarization angle of the light falling from that position (i.e., light source position) on the object (i.e., illuminating light) are known. And if the terrestrial object is now producing specular reflection, then the light reaching the viewpoint of the camera as a result of the specular reflection has come from a sky light source position, which is determined geometrically by the viewpoint of the camera and the object's position. That is to say, only polarized light at the sky light source position to be determined geometrically by the viewpoint of the camera and the object's position is incident on the object's position and producing the specular reflection.

If it is cloudy, the degree of polarization of the whole sky polarization map decreases significantly overall. This is because the Rayleigh scattering, which is produced by blue sky oxygen molecules and other particles that cause polarization when it is fine, will change into Mie scattering produced by water vapor when it is cloudy. As a result, when it is cloudy, the whole sky has a very low degree of polarization, which is almost the same anywhere on the sky, unless there is a rather broad blue sky part under the cloud.

FIG. 10A is a flowchart showing how the weather determining section 203 shown in FIG. 2 may operate in one example.

According to this flowchart, if the average ρ ave of the degree of polarization information of the whole sky polarization map is greater than a threshold value ρ w, the weather is determined to be fine. Otherwise, the weather is determined to be cloudy. Since the whole sky is observed instead of just a scene image that has been shot from a certain angle of view, the weather can be determined even more accurately. Then, the result of the decision on the weather that has been made on each of the ρ, φ and C images is sent to the fine weather sky part separating section 204 and the cloudy weather sky part separating section 205.

FIG. 10B is a flowchart showing how the weather determining section 203 shown in FIG. 2 may operate in another example.

According to this flowchart, first of all, the average ave and standard deviation σ of the degree of polarization information of the whole sky polarization map are calculated. Next, an area S, at which the degree of polarization ρ becomes equal to ave±3σ, is calculated on the whole sky polarization map. Then, it is determined whether the average ave and standard deviation σ of the degree of polarization information are smaller than threshold values AV and ST.

If the average ave and standard deviation σ of the degree of polarization information are both smaller than the threshold values AV and ST and if the area S, at which the degree of polarization ρ becomes equal to ave±3ρ, is smaller than a particular value AT, then the weather is determined to be (completely) cloudy. Otherwise, the weather is determined to be fine.

According to this determining method, the weather is determined to be cloudy under stricter conditions. And if the weather is determined to be cloudy, the whole sky is almost completely overcast and has uniform brightness, which is comparable to a situation where the object is covered with a totally diffusing sphere in the prior art. Since the whole sky is observed instead of shooting just a scene image from a certain angle of view, the weather can be determined more accurately. Then, the result of the decision on the weather that has been made on each of the ρ, ϕ and C images is sent to the fine weather sky part separating section 204 and the cloudy-weather sky part separating section 205.

Next, the fine-weather sky part separating section 204 and cloudy-weather sky part separating section 205 shown in FIG. 2 will be described.

Figure 8:
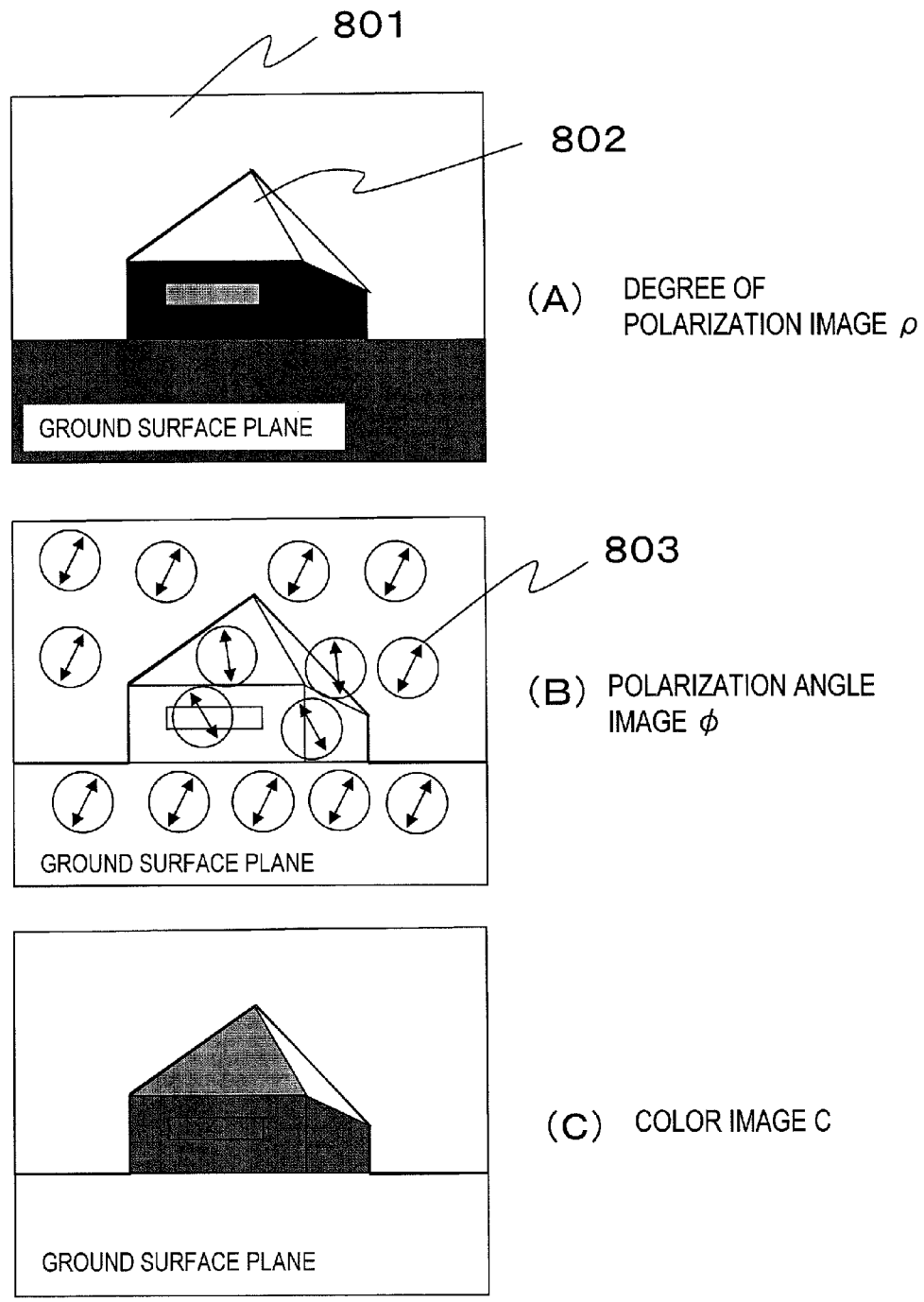

If the sky is included in the scene image, these two kinds of sky part separating sections 204 and 205 separate the sky part from the scene images shown in FIGS. 7 and 8 in order to process only the object, of which a pseudo 3D image needs to be generated.

FIG. 11 is a block diagram showing the configuration of the fine-weather sky part separating section 204.

The fine-weather sky part separating section 204 receives the degree of polarization image ρ and the color image C, separates the sky part from the scene, and outputs an object degree of polarization image ρ fo and an object polarization angle image ϕfo.

A degree of polarization binarizing section 1101 binarizes the degree of polarization image ρ with a threshold value Tρ. A luminance converting section 1102 converts the color image C into a luminance image Y. Luminance binarizing sections 1103 and 1104 binarize the luminance image that has been generated by the luminance converting section 1102 with threshold values TC1 and TC2, respectively. A hue error converting section 1105 subjects the color image C to an HSV conversion, thereby generating a hue error image that represents the degree of deviation from the sky blue hue. A hue binarizing section 1106 subjects the hue error image to threshold value processing, thereby extracting only a sky blue hue part. A computing section 1107 executes the AND (logical product) of the degree of polarization image that has been binarized by the degree of polarization binarizing section 1101 and the luminance image that has been binarized by the luminance binarizing section 1103. And a computing section 1108 calculates the AND (logical product) of the luminance that has been binarized by the luminance binarizing section 1104 and the particular hue that has been binarized by the hue binarizing section 1106 using a threshold value TH.

An object mask choosing section 1110 determines, according to the decision made by the degree of polarization determining section 1109, whether (i) a first blue sky part mask 1111 that has been generated based on the degree of polarization and the luminance or (ii) a second blue sky part mask 1112 that has been generated based on the degree of hue similarity and the luminance should be chosen.

Computing sections 1113 and 1114 execute the AND of the object mask image 1115, the degree of polarization image ρ and polarization angle image ϕ provided, thereby generating a fine-weather object degree of polarization image ρfo and a fine-weather object polarization angle image ϕfo.

According to a conventional technique, the blue sky part is detected by searching a given color image for a flat image area, of which the color hue resembles that of the color blue. With the color information, however, it would be impossible to distinguish the blue sky part from the real sky or cloud (i) if color hue information varied significantly from blue to magenta or red as in the red sky or (ii) if the terrestrial building is blue or white.

That is why the sky is preferably detected by reference to only the luminance information without using color information that would vary significantly according to physical factors of the sky. And to detect such a sky part, a part of a scene image that has been highest luminance could be assumed to be the sky. According to such an assumption-based technique, however, the results of experiments showed that reasonably good results were achieved when the sky was cloudy or red but the results were not satisfactory when it was fine because the luminance of the specular reflected light from the terrestrial building was higher than that of the sky more often than not. This is also because not the regular reflection of the sunlight but the specular reflection from an artificial smooth surface, which is illuminated entirely with the sunlight falling from the blue sky, is stronger than expected.

For these reasons, according to this preferred embodiment, the blue sky part is detected by using not only the scene's luminance but also the degree of polarization of the scene as well. This is a technique that takes advantage of the fact that the sky has a very high degree of polarization in the vicinity of the horizon when it is fine in the daytime.

Non-Patent Document No. 3 reports the polarization states of the whole sky that were recorded every hour from morning (sunrise) through early in the evening (sunset) over twelve hours. According to this document, the sky almost always has a high degree of polarization in the vicinity of the horizon except the western sky in the morning and the eastern sky in the evening. Also, the results of experiments reveal that the degree of polarization of the sky is even higher in many cases than that of a terrestrial mountain at a distance or that of an artificial structure such as a building. That is why it would be effective to detect the sky part based on the degree of polarization. Even though the roof or glass of a terrestrial building also produces a very intense polarization, a mask that uses the threshold values of the degree of polarization and luminance may be generated and the sky part may be detected in order to remove such intense polarization caused by the building. Nevertheless, the western sky in the morning and the eastern sky early in the evening have not only a low degree of polarization but also a low luminance as well, and this technique is not applicable to them. In that case, the blue sky part needs to be detected using the color hue and the luminance.

Hereinafter, it will be described with reference to FIGS. 12(A) through 12(H), representing an actual scene image, how the fine-weather sky part separating section 204 works. In the following description, when the scene is shot, the image capturing area is supposed to be circular. However, this is due to mechanical vignetting of an actual camera device and the image could essentially be regarded as a rectangular one.

Figure 12:
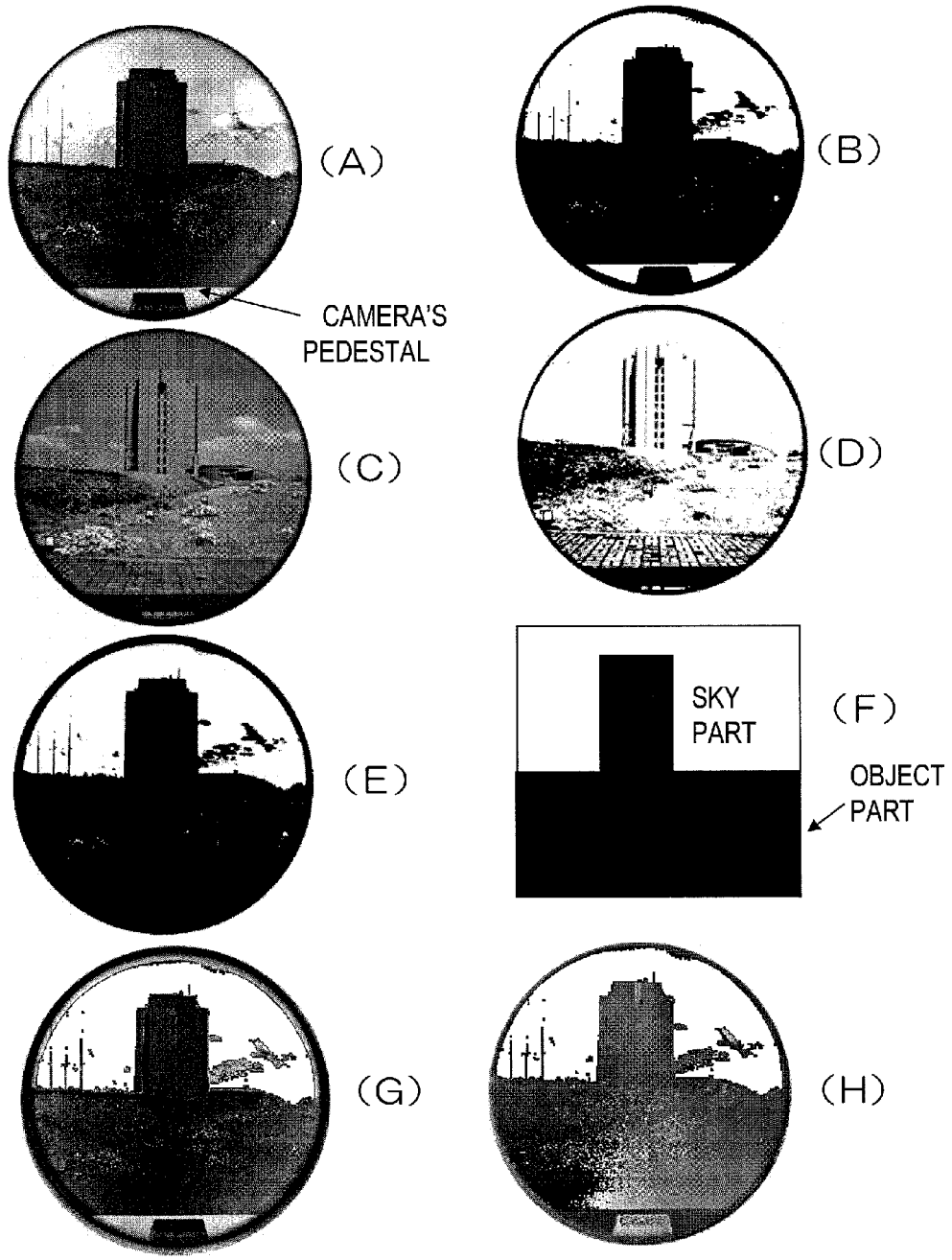

FIG. 12(A) shows a degree of polarization image ρ of a scene image, while FIG. 12(B) shows an image obtained by having the degree of polarization image ρ processed by the degree of polarization binarizing section 901 (where T ρ=0.14). The threshold value of binarization is determined by reference to a degree of polarization histogram. In this scene, the sky part and a view of a terrestrial building and so on form a bimodal distribution in which an area with a high degree of polarization and an area with a low degree of polarization are clearly separated. In this degree of polarization histogram, an intermediate value between its two peaks is supposed to be a threshold value. In FIG. 12(B), if the cloud part on the right-hand side of the building has a low degree of polarization, the cloud part would also be removed. However, only the black camera pedestal is too strongly polarized to remove and would remain even after the degree of polarization binarization.

FIG. 12(C) shows a luminance image obtained by having the color image of the scene image processed by the luminance converting section 1102. On the other hand, FIG. 12(D) shows an image obtained by having the luminance image that has been obtained by luminance conversion processed by the luminance binarizing section 1103 (where TC1=0.4). In this scene, the luminances of the blue sky and the building are so close to each other that it is difficult to separate them from each other according to the luminance. Even so, by setting an appropriate threshold value, dark parts such as the camera pedestal have been removed successfully.

By getting these two kinds of mask images processed by the computing section 1107, only the blue sky part can be separated with the cloud part having a low degree of polarization removed as shown in FIG. 12(E). FIG. 12(F) is a schematic representation representing the mask image as a normal rectangular image and corresponds to the first blue sky part mask 1111 shown in FIG. 11.

Finally, the computing sections 1113 and 1114 executes the logical product of the mask, the degree of polarization image, and the polarization angle image, thereby generating the object degree of polarization image shown in FIG. 12(G) and the object polarization phase image shown in FIG. 12(H).

Next, it will be described with reference to FIG. 13, showing a scene of the eastern sky early in the evening, to what situation the technique described above is not applicable. Specifically, FIGS. 13(A) through 13(D) show a scene degree of polarization image ρ, a binarized version of the scene degree of polarization image, a scene luminance image C, and a binarized version of the scene luminance image, respectively. Eventually, the mask image shown in FIG. 13(E) is obtained, which means that detection of the blue sky has failed.

The detection has failed because in the scene degree of polarization image shown in FIG. 13(A), the sky has too low a degree of polarization and too low luminance. In that case, the degree of polarization determining section 1109 determines, by reference to the degree of polarization histogram of the scene image, whether or not the average degree of polarization is lower than a predetermined threshold value (where Tρ1=0.1). If the answer is YES, then the average degree of polarization is not adopted but a method that uses a color hue and a luminance is used instead. Such processing will be described with reference to FIGS. 11 and 14.

First of all, the hue error converting section 1105 shown in FIG. 11 calculates a hue angle error, representing a difference between the hue angle of the color blue of the sky and that of the color image C, thereby converting the color image C into a hue error image.

In this case, the hue of the sky is supposed to be blue because processing that uses such a color image can be carried out only when the sky has a low degree of polarization and a low luminance. And as such a situation is observed only in the western sky in the morning and in the eastern sky early in the evening, the color of the sky may be regarded as blue.

Suppose the hue angle (in the range of 0 through 360 degrees) of a typical sky blue color is Hsky (=254 degrees) and the hue angle of a given scene is Htest. Using an equation (RGB_to H) for converting a well-known RGB color space into the hue H of an HSV (hue, saturation and lightness) space and considering that one cycle of the hue angle is 360 degrees, the hue error Δ H is calculated by the following Equations (9):

$$Htest = RGB\_to\_H(R,G,B)$$

$$Hmin = min(Htest, Hsky)$$

$$Hmax = max(Htest, Hsky)$$

$$\Delta H = min(Hmax - Hmin, Hmin + 360 - Hmax) \quad (9)$$

By getting this hue error Δ H subjected to threshold value processing by the hue binarizing section 1106 shown in FIG. 11, a blue sky candidate can be obtained from the color image C.

FIG. 14(A) shows a hue error image obtained by getting the same scene image as the ones shown in FIG. 13 converted by the hue error converting section 1105 shown in FIG. 11. FIG. 14(B) shows a mask image obtained by getting this hue error image subjected to hue binarization processing (where TH=220 degrees) by the hue binarizing section 1106. FIG. 14(C) shows an image obtained by getting the luminance binarized with respect to a threshold value (where TC2=0.29) by the luminance binarizing section 1104 shown in FIG. 11. And FIG. 14(D) shows a mask image obtained as a result of computations done by the computing section 1108 shown in FIG. 11. When it is fine, the output selecting section 1110 adopts this mask image portion, thereby generating a fine weather sky part image.

FIG. 15 is a block diagram showing a configuration for the cloudy-weather sky part separating section 205.

According to results of experiments, when it is cloudy, it is highly probable that a part with the highest luminance in a scene is the sky part. For that reason, the color image C is converted by a luminance converting section 1102 into a luminance image, which is then binarized by the luminance binarizing section 1103 to generate a mask. Thereafter, the mask image is provided for computing sections 1113 and 1114, which respectively calculate the logical product of the degree of polarization image and the mask image and the logical product of the polarization angle image and the mask image, thereby generating a cloudy-weather object degree of polarization image ρco and a cloudy-weather object polarization phase image φco, respectively.

FIG. 16 illustrates a scene image, from which the sky part has been separated when it is fine or cloudy and in which a set of planes of the object has been cut out. Using this set, normals to the respective surfaces of the building are estimated. In this scene, the building consists of one side R1 of a roof identified by the reference numeral 1601, another side R2 of the roof identified by the reference numeral 1602, a front wall surface B1 identified by the reference numeral 1603, a side wall surface B2 identified by the reference numeral 1604, and a glass window W on the wall surface B1 as identified by the reference numeral 1605. And all of these parts are supposed to be located on the ground surface G identified by the reference numeral 1606.

Hereinafter, the relation between the polarizations of the sky when it is fine and when it is cloudy, respectively, and the specular reflection phenomenon from the object will be described with reference to FIGS. 17(A) and 17(B).

The results of experiments revealed that when it is fine, the specular reflection from the surface of an outdoor object would depend heavily on the polarization state of incoming light. In FIG. 17(A), the arrow 1701 indicates the polarization direction (i.e., the polarization main axis direction that is parallel to the plane of vibration) of the incoming light and its magnitude, and the rectangle 1702 represents how the energy reflectances of P- and S-waves vary on this object surface. Supposing the refractive index n is 1.4, the energy reflectances of the P- and S-waves are as shown in FIG. 18, in which the S-wave always has a higher reflectance than the P-wave. FIG. 18 shows how the Fresnel reflectance of specular reflected light varies with the angle of incidence.

In this case, since the incoming light is linearly polarized light with only one plane of vibration, the light reflected from that surface is polarized in the direction indicated by the arrow 1703, which is obtained by rotating the polarization phase angle of the incoming polarized light a little. However, the polarization angle has not been rotated so much that the main axis direction of the reflected light points the S-direction. That is to say, if something is illuminated with incoming polarized light, there will be no direct relation anymore between its polarization angle and the surface normal, and no information about the normal can be obtained any longer from the polarization, once the incoming light has been specular reflected. This is a significant difference from the non-polarized illumination to be described later and will be a most important problem when the object is illuminated outdoors with the light falling from the sky. Even so, however, polarization information could still be collected safely in some cases.

As shown in FIG. 18, in the range 1801 in which the angle of incidence is in the vicinity of zero degrees (i.e., the incident light has come from right over the head) and in the range 1802 in which the angle of incidence is in the vicinity of 90 degrees, the reflectances of the P- and S-waves become equal to each other. That is why as for the polarized light that has been specular reflected at an angle falling within any of these ranges 1801 and 1802, its polarization angle never varies as described above but the surface turns into a completely mirror state. As a result, in that case, the reflected light will reflect the polarization state of the sky as it is. That is to say, if a camera receives light that has come either from right behind itself or from the right front of itself, the polarization state of the sky will be reflected as it is, and therefore, can be used as information about the normal.

When it is cloudy, on the other hand, the incoming light is non-polarized. And the non-polarized light can be represented as a wave in which multiple planes of vibration with almost the same amplitude but with mutually different directions are combined together as indicated by the circle 1704 in FIG. 17(B). If such non-polarized light is reflected from the surface of the object, the P- and S-waves, having mutually different energy reflectances, will be modulated as indicated by the rectangle 1702, thus producing elliptical partially polarized luminance 1705. In this case, the main axis direction of the partially polarized light is S-direction and the object' surface normal is included within that plane. As a result, when the object is illuminated with non-polarized light outdoors in a cloudy weather, information about a normal to the object's surface can be obtained from the polarization angle of the light that has been specular reflected from the object's surface.

In view of these considerations, two types of normal estimating processing can be designed in the following manner for a fine weather and a cloudy weather, respectively.

FIG. 19 is a flowchart, and FIG. 20A is a schematic representation of a scene image, showing how the fine weather normal estimating section 206 operates.

First of all, in Step S1901, the degree of polarization and polarization angle of one of the pixels representing the object are obtained. Next, in Step S1902, it is determined whether or not the degree of polarization is lower than a predetermined value ρ1. If the answer is YES, probably that pixel will not be receiving direct sunlight but multi-reflected environmental light. According to results of experiments, when environmental light was received, it was highly probable that the plane faced the camera near the ground. That is why in that case, the normal is set with that pixel supposed to belong to a plane that faces the camera near the ground. In the example illustrated in FIG. 20A, such a plane corresponds to the wall surface B1 that faces the camera forward. In FIG. 20A, the crosses "X" indicate that the degree of polarization is very low.

Thereafter, in Step S1903, the sky polarization map shown in FIG. 9 is searched for a similar polarization angle to that of the pixel and the light source of the light being specular reflected from that pixel is located on the sky. In this case, the reference position of an angular representation of the polarization angle is the local horizon 902 in the shooting range 906 shown in FIGS. 9(A) and 9(B). Thus, supposing the polarization angle φsky (where 0 degrees≤φ sky≤180 degrees) at the sky position coordinates (θL, φL) around the zenith 901 of the sky shown in FIG. 9(B) is determined by this reference to obtain the polarization phase angle φobj (where 0 degrees≤φobj≤180 degrees) of the object (that has been captured with the camera) with respect to the reference horizon, the sky position coordinates (θL, φL) will be calculated so that its minimum values becomes Diffφ calculated by Equation (10).

The G and W ranges shown in FIG. 20A can be searched for by this technique. First of all, suppose that the polarization angle of the G range 1606 (with respect to the horizon) has turned out to be very close to the polarization angle of the polarized light in the whole sky region 2002. In that case, the angle (θL, φL) of that whole sky region 2002 in the camera coordinate system is recorded.

It should be noted that near the camera that faces the object forward, light is also coming from the sky behind the camera and the W range 1605 shown in FIG. 20A will be reflecting the light that has come from the sky region 2003 behind the camera at an angle of incidence of around zero degrees. If the angle of incidence falls within the range 1801 shown in FIG. 18, mirror-like reflection will be produced when the camera faces the object forward, and therefore, the polarization phase of the sky will be inverted horizontally with respect to the horizon. In the example shown in FIG. 20A, to locate the light source of the light that has been incident on the W region 1605, the sky region 2004 in which the polarization angle of the W region 1605 is inverted horizontally will be searched.

The camera of this preferred embodiment includes the object lens section 101 and the wide-angle lens section 102 shown in FIG. 1C, of which the coordinate systems are different from each other. For that reason, some special technique needs to be employed to search for the polarization angle.

FIG. 20B illustrates an object image that has been captured through the object lens. To determine the angle defined by the polarization axis, the horizontal reference line 2010 of the camera needs to be horizontal, i.e., parallel to the horizon of the ground surface. This can be done by using the horizontal situation indicator 103, such as a leveling instrument and there is no need to shoot the horizon with the camera. The polarization angle φ obj of the light reflected from the object is the angle defined with respect to the camera's reference line 2010 shown in FIG. 20B. If this reference line deviated, the angular reference of the polarization angle would be indefinite, thus making the search impossible.

FIG. 20C is a whole sky image that has been captured through a wide-angle lens, which is used to shoot the sky. Hereinafter, it will be described with reference to FIG. 20C how to get coordinate conversion done when the whole sky is searched for the polarization phase.

The direction 2021 is the direction that the object lens of the camera faces. Every polarization angle on the whole sky is defined with respect to the reference line 2022. The range pointed to by the arrow 2021 can be split into a sky region 2023 in front of the camera and a sky region 2024 behind the camera with respect to the reference line 2022.

From the image that has been captured through the object lens, the polarization angle 2011 is extracted from the image capturing range 906 with respect to the local horizon 902 as described above. In this case, the local horizon 902 is parallel to the whole sky polarization angle reference line 2022. That is why when the sky region 2023 in front of the camera is searched for, the polarization angle φsky of the sky in that region (i.e., the region 2025) may be used as it is.

And when the sky region 2024 behind the camera is searched for, the angle needs to be converted so as to be precisely symmetrical to that polarization angle with respect to the reference line 2022. Considering that the polarization angle is originally in the range of 0 through 180 degrees, Diff φ can be represented by the following Equations (10):

1) if the sky region in front of the camera is searched for, $$Diff\phi = |\phi sky - \phi obj| \text{ and}$$

2) if the sky region behind the camera is searched for, $$Diff\phi = |(180° - \phi sky -) - \phi obj|$$

That is why a position on the sky at which Diff φ represented by these Equations (10) becomes minimum may be searched for.

Next, in Step S1905, based on the light source position on the sky, the pixel location on the object image, and the viewpoint of the camera thus obtained, a normal to the object's pixel location is calculated geometrically. FIG. 21 illustrates how to get this processing done. If in a camera's fixed coordinate system, a vector L (2102) corresponding to the sky's light source position coordinates (θL, φL) 2101 and the camera's viewing vector V (2103) are determined, the normal N (2104) can be obtained as a bisector of those two vectors.

In this description, such a method for estimating a normal will be referred to herein as a "normal estimation by geometry", while a method for estimating a normal based on the polarized light that has been produced by specular reflection of non-polarized incoming light from the object's surface will be referred to herein as "normal estimation based on specular reflected polarized light".

Now look at FIG. 19 again.

Next, in Step S1906, the angle of incidence θ is obtained as an index to the degree of confidence of the normal that has been estimated by geometry. This is because even if the object's polarization is similar to the sky's polarization, the mirror-like reflection will be produced only when the angle of incidence θ is around 0 or 90 degrees. That is why if θ is around of 45 degrees, the object's polarization would not reflect the sky's exactly. That is to say, the degree of confidence Conf may be calculated by the following Equation (11)

$$\text{Conf} = \min(\theta, 90 - \theta) \quad (11)$$

If the degree of confidence Conf has been determined in this manner, the close to zero, the higher the degree of confidence Conf. On the other hand, the closer to 45, the lower the degree of confidence Conf.

FIG. 22 illustrates schematically how the angle of incidence θ and the degree of confidence Conf get associated with the normal that has been estimated by geometry. In this case, the G region 2201 that is the ground surface, the B1 region 2202 that is a wall surface facing the camera forward, and the W region that is the glass window also facing the camera forward have a high degree of confidence, which may be zero in this example.

Thereafter, in Step S1907 shown in FIG. 19, the normal is calculated based on the specular reflected polarized light of the non-polarized light. Generally speaking, even when it is fine, the sky also has a non-polarized part due to the presence of local cloud. In that case, the surface normal can be estimated based on the polarization state of the specular reflected light. The normal can be estimated based on the polarizer state of the specular reflected light in the same way as in estimating a normal when it is cloudy.

Next, look at FIG. 23, which shows polarization angle that have been observed in a scene image.

The polarization angle (i.e., the angles within the image plane) at respective points on the object's surface as indicated by the double-headed arrows in FIG. 23 indicate, as a result of the reflection, the directions perpendicular to the main axis of the partial polarization as represented by Equation (7). According to the Fresnel's reflection theory, when specular reflection occurs, an object's normal is included within a plane that is parallel to the direction indicated by the angle. Based on this theory, one of the two degrees of freedom (ψN, θN) of the normal direction can be obtained. That is to say, the direction itself indicated by the polarization angle at each part of the object shown in FIG. 23 becomes one degree of freedom (ψN). Nevertheless, the phase direction has ambiguity of 180 degrees. But such ambiguity can be eliminated by supposing that the roof of the outdoor object is always sloped upward with respect to the camera as shown in FIG. 21.

According to the method disclosed in Patent Document No. 1, the other degree of freedom θN can be determined because the angle of incidence θ and the degree of polarization ρ satisfy the following relation:

$$\rho = \frac{F_S - F_P}{F_S + F} = \frac{2\sin\theta\tan\theta\sqrt{n^2 - \sin^2\theta}}{n^2 - \sin^2\theta + \sin^2\theta\tan^2\theta} \quad (12)$$

This is because if the object's refractive index is n, the angle of incidence θ and the degree of polarization ρ satisfy this relation.

FIG. 24 is a graphic representation of this relation, of which the abscissa represents the angle of incidence θ and the ordinate represents the degree of polarization ρ. In this case, once the degree of polarization ρ has been obtained by observing polarization, the angle θ can be obtained by supposing n to be a typical material constant of 1.4, for example. The problem is that two possible solutions θ1 and θ2 are obtained with the Brewster angle θB (identified by the reference numeral 2402) interposed between them. Thus, according to this preferred embodiment, the candidate solution is limited to the range that is smaller than the Brewster angle (i.e., the range indicated by the arrow 2401) and only one candidate θ1 is selected from that range. This is because if the light is incident on the wall surface of an outdoor building being shot at an angle of incidence of 60 to 70 degrees or more, then it is highly probable that the wall surface will be totally mirror-reflecting due to the light coming from the sky behind it as shown in FIG. 18. That is why the normal estimated by geometry is very likely to be used in that case. Once θ has been fixed, the normal vector is determined using the line-of-sight vector V of the camera.

Next, in Step S1908, the degree of confidence of the normal is calculated based on the specular reflected polarized light that has been just obtained. In this case, the degree of confidence can be obtained by checking the degree of non-polarization of the incoming light, which is supposed to be done when specular reflected polarized light is used. More specifically, a light source vector is obtained based on the normal vector and the viewing vector and the degree of polarization ρ at the corresponding light source position is checked by reference to the whole sky polarization map.

$$\text{Conf} = \rho \quad (13)$$

FIG. 25 illustrates a state in which the two degrees of freedom of the normal have been fixed based on the specular reflected polarized light and also shows their degrees of confidence.

Thereafter, in Step S1909, one of the two candidate normals shown in FIGS. 22 and 25 that has turned out to have the higher degree of confidence Conf (i.e., have a value close to zero) by reference their criteria of evaluation is adopted. Then, either the normal estimated by geometry or the normal estimated based on the specular reflected polarized light thus adopted is stored at that pixel location.

This processing can be done by deleting the normals 2204 and 2205, of which Conf is equal to or greater than 10, as shown in FIG. 22 and also deleting the normals 2501 and 2502, of which Conf is equal to or greater than 0.5, as shown in FIG. 25, for example.

FIG. 26 shows examples of normals, of which the degrees of confidence have been evaluated. It can be seen that in this example, aside from the B1 region, the normals estimated by geometry is adopted in the G and W regions and the normals estimated based on the specular reflected polarized light are adopted in the other R1, R2 and B2 regions.

FIG. 27 is a flowchart showing how to estimate the normal when it is cloudy. The contents of this flowchart are the same as a situation where the fine-weather normal estimating section 206 estimates the normal based on the specular reflected polarized light. When it is cloudy, however, the illumination is supposed to be non-polarized over the whole sky. That is why there is no need to calculate the degree of confidence (i.e., the processing step S1909 shown in FIG. 19).

Hereinafter, the flow shown in FIG. 27 will be described.

First of all, in Step S2701, the degree of polarization and the polarization angle at the location on the object are obtained. Next, in Step S2702, it is determined whether or not the degree of polarization is lower than a predetermined value ρ1. If the answer is YES, the process advances to Step S2703, in which the normal is set on the supposition that the pixel belongs to a plane that faces the camera near the ground. Otherwise, in Step S2704, the normal is calculated based on the specular reflected polarized light by the method described above. Then, in Step S2705, the surface normal thus obtained is stored in a memory.

Next, it will be described how the pseudo 3D image generating section 205 generates a pseudo 3D image based on the normal information obtained as a result of the processing described above.

FIG. 28 is a flowchart showing the flow of the processing to get done by the pseudo 3D image generating section 208. First, in Step S2801, an object normal image is obtained. Next, in Step S2802, similar normals are combined together to form a plane, which is equivalent to recognizing the G, B1, B2, R1 and R2 regions shown in FIG. 16. Then, in Step S2803, the vertices of the respective planes are detected and two-dimensional coordinates (u, v) on their image are extracted. Thereafter, in Step S2804, camera parameters are obtained. The camera parameters consist of internal and external parameters. Specifically, the internal parameters include the focal length f and the center of optical axis (u0, v0) if the lens distortion of the camera is neglected. On the other hand, the external parameters include the translation and rotation matrices of the camera coordinate system and the world coordinate system. Those internal and external parameters of the camera can be obtained by typical computer vision technique, and the description thereof will be omitted herein.

The internal parameters are stored in the camera in advance. The external parameters actually depend on how to carry out shooting. But in this example, the optical axis is supposed to be parallel to, and face, the ground surface for the sake of simplicity. That is to say, the pitch angle and the roll angle of the optical axis are both supposed to be zero degrees.

FIG. 29 shows the relation between the world coordinate system and the camera coordinate system in such a shooting state and illustrates a ground surface plane 2901, an image plane 2902, the center of optical axis 2903, and an object plane 2904. In this example, the camera coordinate system is an (xc, yc, zc) coordinate system, of which the origin is defined by the viewpoint C. On the other hand, the world coordinate system is (Xw, Yw, Zw), of which the origin is set at an arbitrary point on the ground surface. A normal N has been defined with respect to the object plane 2904 and P1W and P2W at the bottom are projected onto the camera to be P1 and P2, respectively.

Then in Step S2805, the ground surface plane is represented by the following Equation (14):

$$Y_W = 0 \tag{14}$$

where h represents the gap along the Y-axis between the camera coordinate system and the world coordinate system on the ground surface plane, i.e., the height of the camera as measured from the ground surface.

Next, in Step S2806, the world coordinates P1W and P2W of P1 and P2, which are intersections between the ground surface plane and the object's bottom, are calculated. Taking P1 as an example, P1 (u, v) and the camera coordinate system (Xc, Yc, Zc) satisfy the following relations:

$$\begin{cases} X_C = \dfrac{u - u_0}{f} Z_C \\ Y_C = \dfrac{v - v_0}{f} Z_C \end{cases} \tag{15}$$

The relation between the camera coordinate system and the world coordinate system is represented this time by the following Equations (16):

$$\begin{cases} X_C = X_W \\ Y_C = Y_W - h \\ Z_C = Z_W \end{cases} \tag{16}$$

Consequently, the world coordinates of P1W are obtained as the intersection between the line 2905 and the ground surface plane 2901 and represented by the following Equations (17):

$$\begin{cases} X_W = \dfrac{-hf(u - u_0)}{v - v_0} \\ Y_W = 0 \\ Z_W = \dfrac{-hf}{v - v_0} \end{cases} \tag{17}$$

Then, in Step S2807, the world coordinates of P2 and other vertices shown in FIG. 30(A) are calculated. These coordinates are obtained by fixing the intersections P1, P2 and P3 with the ground surface plane, defining a plane using the normal N and then finding the intersections between the coordinates on the camera plane and the line drawn from the origin representing the camera's viewpoint as described above.

Finally, in Step S2808, a new camera viewpoint Cnew is set and viewpoint changing is carried out, thereby generating a pseudo 3D image. This processing can be done by creating camera's external parameters (i.e., defining a new equation representing the relation between the world coordinate system and the camera coordinate system that replaces Equation (15)) and projecting the respective vertices P1 through P7 of the world coordinate system onto the camera plane using the camera projection equation (14). As a result, an image is obtained by subjecting the image shown in FIG. 30(A) to viewpoint changing as shown in FIG. 30(B).

It should be noted that the whole sky polarization map getting section does not have to have a mechanism for actually measuring the polarization state of the sky. Instead, the database of the whole sky polarization map may be accessed with the timestamp of shooting and the latitude of the shooting spot to get the whole sky polarization map required from the database, and camera's direction information obtained from a GPS system, as well as the whole sky polarization map, may be used. In that case, the whole sky polarization map getting section 202 does not have to be arranged inside the polarization information obtaining section 200.

In the preferred embodiment shown in FIG. 31, the whole sky polarization map getting section 202 notifies the database 3100 of the shooting timestamp and the latitude of the shooting spot and gets a corresponding whole sky polarization map from the database 3100. In addition, the whole sky polarization map getting section 202 also gets a camera's shooting direction, associated with the whole sky polarization map, from a GPS.

The image processor itself may include the database 310 in its storage device but may also access an external database (not shown) via a telecommunications device 3110 as shown in FIG. 32. Also, the weather determining section 203 does not have to determine the weather based on the output of the color and polarization image capturing section 201 but may be provided with information indicating whether the current weather is fine or cloudy by an external source and may change the methods of estimating the normal according to that information.

Embodiment 2

Hereinafter, a second specific preferred embodiment of an image processor according to the present invention will be described.

The image processor of the first preferred embodiment described above includes a color and polarization image capturing section that can obtain intensity information of multiple different colors. To perform the image processing of the present invention, however, it is not always necessary to capture a color image. Instead, the image processing of the present invention can also be performed using a single-color monochrome luminance image, for example.

FIG. 33 shows a configuration for an image processor as a second preferred embodiment of the present invention. The differences between the configuration shown in FIG. 33 and the first preferred embodiment described above are that the image processor of this preferred embodiment includes a polarization information obtaining section 3300 consisting of polarization image capturing section 3301 and a whole sky polarization map getting section 3302 and that the fine-weather sky part separating section 3303 and the cloudy-weather sky part separating section 3304 included in the normal estimating section 210 work differently from their counterparts of the first preferred embodiment described above.

FIG. 34 shows a configuration for the polarization information obtaining section 3300, which includes a polarization and luminance image capture device 3401 instead of the color and polarization image capture device. The polarization and luminance image capture device 3401 captures a luminance image and a polarization image of a scene in real time. For that purpose, the technique disclosed in Patent Document No. 3 (about a patterned polarizer), for example, may be used.

FIG. 35 illustrates an exemplary configuration for such a polarization and luminance image capture device 3401. In the example illustrated in FIG. 35, a narrow band color filter and a patterned polarizer are stacked one upon the other in front of image capture device's pixels. The incoming light is transmitted through the narrow band color filter and the patterned polarizer to reach the image capture device, where a monochrome luminance is measured by image capture device's pixels. The narrow band color filter may have a transmission range of 500 to 550 nm to select a wavelength range in which the patterned polarizer operates.

In this preferred embodiment, patterned polarizers that have polarization transmission angles of 0, 45, 90 and 135 degrees are provided for every four pixels, which are regarded to form one pixel as the minimum unit of processing. And if the intensities of these pixels are averaged, a monochrome luminance can be calculated by performing the same processing as what is performed on RGB colors by Equation (8).

The image information processing section 3402 shown in FIG. 34 generates a luminance image Y by performing such processing. The polarization information processing section 306 carries out the same processing as what has already been described with respect to Equations (1) through (6). The patterned polarizer of this preferred embodiment may also be a photonic crystal, a film type polarizer, a wire grid type polarizer or a polarizer operating on any other principle.

FIG. 36 is a block diagram illustrating an exemplary configuration for the fine-weather sky part separating section 3303, which receives a degree of polarization image $\rho$ and a luminance image Y, separates a sky part from a given scene, and outputs an object degree of polarization image $\rho$ fo and an object polarization angle image 4) fo. A degree of polarization binarizing section 1101 binarizes the degree of polarization image $\rho$ with a threshold value T$\rho$. Luminance binarizing sections 1103 and 1104 binarize the luminance image with threshold values TC1 and TC2, respectively. A computing section 1107 executes the AND (logical product) of the degree of polarization image that has been binarized by the degree of polarization binarizing section 1101 and the luminance image that has been binarized by the luminance binarizing section 1103.

An object mask choosing section 1110 determines, according to the decision made by the degree of polarization determining section 1109, whether (i) a first blue sky part mask 1111 that has been generated based on the degree of polarization and the luminance or (ii) a second blue sky part mask 3601 that has been generated based on the luminance should be chosen.

Computing sections 1113 and 1114 execute the AND of the object mask image 1115, the degree of polarization image $\rho$ and polarization phase image $\phi$ provided, thereby generating a fine weather object degree of polarization image $\rho$fo and a fine weather object polarization phase image $\phi$fo.

This fine weather sky part separating section 3303 uses only a monochrome luminance image, and therefore, lacks in hue information compared to the first preferred embodiment that uses a color image. That is why as for the eastern sky early in the evening and the western sky in the morning, of which the degree of polarization and luminance are both low, information obtained could be too little to sense the object easily. However, this would not be a big problem because in many applications, outdoor shooting is carried out in the daytime more often than any other time of the day.

FIG. 37 is a block diagram illustrating a configuration for a cloudy weather sky part separating section 3304. When it is cloudy, it is highly probable that a part with the highest luminance in a scene is the sky part. For that reason, the luminance image is binarized by the luminance binarizing section 1103 to generate a mask. Thereafter, the mask image is provided for computing sections 1113 and 1114, which respectively execute the logical product of the degree of polarization image and the mask image and the logical product of the polarization phase image and the mask image, thereby generating a cloudy weather object degree of polarization image ρco and a cloudy weather object polarization phase image φco, respectively.

As the fine weather normal estimating section 206, the cloudy weather normal estimating section 207 and the pseudo 3D image generating section 208 of this preferred embodiment work in quite the same way as their counterparts of the first preferred embodiment, the description thereof will be omitted herein.

INDUSTRIAL APPLICABILITY

According to the present invention, an ordinary two-dimensional still picture or moving picture, which has been just shot outdoors with no depth information, has its three-dimensional shape estimated and is subjected to viewpoint changing, thereby generating a pseudo 3D image. Among other things, since the shape can be estimated passively based on polarization information that has been collected under the light falling from the sky outdoors, even a huge building or an object at a distance can also have their shape estimated and can be observed stereographically effectively enough. The present invention is broadly applicable to consumer cameras, movies, ITS, surveillance cameras, construction industry, and application to provide map information of an outdoor building, to name just a few.

REFERENCE SIGNS LIST

200 polarization information obtaining section
201 color and polarization image capturing section
202 whole sky polarization map getting section
203 weather determining section
204 fine-weather sky part separating section
205 cloudy-weather sky part separating section
206 fine-weather normal estimating section
207 cloudy-weather normal estimating section
208 pseudo 3D image generating section
210 normal estimating section

The invention claimed is:

1. An image processor comprising:
a polarization image capturing section for capturing a polarization image that provides polarization information of multiple pixels;
an object normal estimating section for estimating a normal to the surface of an object, which is located outdoors, by reference to the polarization information contained in the polarization image; and
a whole sky polarization map getting section for getting a whole sky polarization map indicating a relation between a position on the whole sky and polarization information at that position,
wherein the object normal estimating section detects a correspondence between the polarization information of specular reflected light at the object's surface in the polarization image and the polarization information in the whole sky polarization map, thereby estimating the normal to the surface of the object.

2. An image processor comprising:
an image capturing section for capturing a luminance image that provides luminance information of multiple pixels and a polarization image that provides polarization information of the pixels;
a weather determining section for determining whether the weather is currently cloudy or fine;
an object normal estimating section for detecting the polarization information of specular reflected light at the surface of an object, which is located outdoors, based on the polarization image and estimating a normal to the surface of the object by any of multiple different methods that is selected according to the weather determined by the weather determining section; and
a whole sky polarization map getting section for getting a whole sky polarization map indicating a relation between a position on the whole sky and polarization information at that position,
wherein if the weather determining section has determined that the weather is fine currently, the object normal estimating section estimates the normal to the surface of the object using a correspondence between the polarization information of specular reflected light at the surface of the object in the polarization image and the polarization information in the whole sky polarization map.

3. The image processor of claim 2, wherein the image capturing section captures the luminance images for multiple different colors.

4. The image processor of claim 2, wherein the weather determining section determines the weather by the degree of polarization of the sky or the area of a range, of which the degree of polarization is equal to or higher than a reference level.

5. The image processor of claim 4, wherein the weather determining section determines the current weather to be either a cloudy one, in which the degree of polarization of the sky is lower than the predetermined reference level, or a fine one, in which the degree of polarization of the sky is equal to or higher than the reference level.

6. The image processor of claim 4, wherein even if the sky is partially overcast, the weather determining section also determines the weather to be fine.

7. The image processor of claim 2, wherein the weather determining section obtains information about the weather from an external source, thereby determining what the weather is like now.

8. The image processor of claim 2, comprising
a cloudy weather normal estimating section for estimating the normal based on specular reflected polarized light; and
a fine weather normal estimating section for estimating the normal either by geometry or based on the specular reflected polarized light,
wherein in estimating the normal by geometry, the fine weather normal estimating section refers to the correspondence between the polarization information of specular reflected light at the surface of the object in the polarization image and the polarization information in the whole sky polarization map.

9. The image processor of claim 2, wherein the whole sky polarization map getting section gets a whole sky polarization image using a wide-angle lens.

10. The image processor of claim 2, wherein the whole sky polarization map getting section gets data of the whole sky polarization map from an external source.

11. The image processor of claim 2, comprising
a fine-weather sky part separating section for separating a sky part from the image when the weather is fine, and
a cloudy-weather sky part separating section for separating a sky part from the image when the weather is cloudy,
wherein the fine-weather and cloudy-weather sky part separating sections have their modes of operation or outputs changed according to the output of the weather determining section.

12. The image processor of claim 2, wherein the image capturing section comprises:
a color and polarization obtaining section in which a number of polarizers with transmission and polarization planes at different angles are arranged adjacent to each other within multiple pixels of the same color of a single-panel color image capture device that has a color mosaic filter;
a polarization information processing section for approximating measured intensities, which have been provided by multiple polarizers for the same color, to a sinusoidal function and averaging approximation parameters thus obtained between the colors, thereby obtaining integrated polarization information; and
a color information processing section for generating an average color intensity by calculating the average of the measured intensities that have been provided, and
wherein the image capturing section outputs not only (i) a color image but also (ii) a degree-of-polarization image and polarization angle image that have been generated based on the polarization information.

13. The image processor of claim 8, wherein (i) if the angle of incidence of a light source is smaller than a predetermined value, the normal is estimated by geometry, but
(ii) if the degree of polarization of the light source is smaller than a predetermined value, the normal is estimated based on specular reflected polarized light.

14. The image processor of claim 2, wherein if the weather has been determined to be cloudy, the normal is estimated based on the polarization angle and the degree of polarization of the specular reflected light, and
wherein if there are multiple estimated normal vectors around a viewing vector, then one of those normals, of which the vector is upward with respect to a horizontal plane including the viewing vector, is selected, and
wherein if there are multiple estimated normal vectors within an incoming light plane including the viewing vector and incident light, then one of those normals, of which the vector defines an angle of incidence that is smaller than a Brewster angle, is selected.

15. A pseudo 3D image generator comprising:
a plane extracting section for extracting a plane, which is perpendicular to the surface normal of the object that has been estimated by the image processor of claim 2, based on the surface normal, and
a pseudo 3D image generating section for generating a scene image from a different viewpoint by subjecting the plane that has been extracted by the plane extracting section to a viewpoint changing.

16. The pseudo 3D image generator of claim 15, wherein the pseudo 3D image generating section estimates the world coordinates of the vertices of the plane that has been extracted by the plane extracting section.

17. An image processing method comprising the steps of:
capturing a polarization image of an outdoor scene;
getting a whole sky polarization map indicating a relation between a position on the whole sky and polarization information at that position; and
determining what the weather is like now,
wherein the method further includes the step of detecting polarization information of specular reflected light at the surface of an object, which is located outdoors, based on the polarization image and estimating a normal to the surface of the object by any of multiple different methods that is selected according to the weather determined,
wherein if the step of determining has determined that the weather is fine now, the step of estimating estimates the normal to the surface of the object by using a correspondence between the polarization information of specular reflected light at the surface of the object in the polarization image and the polarization information in the whole sky polarization map.

18. The image processing method of claim 17, wherein if the weather has been determined to be fine now, the normal is estimated either by geometry with reference to the correspondence, or based on the specular reflected polarized light.

19. The image processing method of claim 18, wherein if the angle of incidence of a light source is small, the degree of confidence of the normal that has been estimated by geometry is increased, and
wherein if the degree of polarization of the light source is small, the degree of confidence of the normal that has been estimated based on the specular reflected light is increased, and
wherein one of the two normals that has resulted in the higher degree of confidence is adopted.

20. The image processing method of claim 17, wherein if the weather has been determined to be cloudy, the normal is estimated based on the polarization angle and the degree of polarization of the specular reflected light, and
wherein if there are multiple estimated normal vectors around a viewing vector, then one of those normals, of which the vector is upward with respect to a horizontal plane including the viewing vector, is selected, and
wherein if there are multiple estimated normal vectors within an incoming light plane including the viewing vector and incident light, then one of those normals, of which the vector defines an angle of incidence that is smaller than a Brewster angle, is selected.

21. The image processor of claim 1, wherein the object normal estimating section gets the polarization information contained in the polarization image through an object lens section and
the whole sky polarization map getting section gets the whole sky polarization map through a wide-angle lens.

22. The image processor of claim 9, wherein the object normal estimating section gets the polarization information of specular reflected light at the surface of the object in the polarization image through an object lens section.

* * * * *